United States Patent
Nakamura et al.

(10) Patent No.: US 6,835,909 B2
(45) Date of Patent: Dec. 28, 2004

(54) METHOD AND APPARATUS OF ASSEMBLING VEHICULAR BODY

(75) Inventors: Setsuo Nakamura, Kanagawa (JP); Takeshi Yanagisawa, Yokohama (JP); Kimihiro Nishimura, Kanagawa (JP); Tomohiro Ichikawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 163 days.

(21) Appl. No.: 10/237,616

(22) Filed: Sep. 10, 2002

(65) Prior Publication Data

US 2003/0057256 A1 Mar. 27, 2003

(30) Foreign Application Priority Data

Sep. 26, 2001 (JP) .......................................... 2001-292800
May 10, 2002 (JP) .......................................... 2002-134937

(51) Int. Cl.$^7$ ............................................... B23K 37/02
(52) U.S. Cl. .................................... 219/86.7; 228/212
(58) Field of Search .................................. 219/148, 86.24, 219/86.25, 80, 161, 86.7; 228/212, 213, 49.1, 44.3, 4.1, 6.1, 47.1; 29/430, 331 S, 824, 281.1, 281.4, 469; 901/41, 42; 269/289 R, 303

(56) References Cited

U.S. PATENT DOCUMENTS

| 4,538,044 A | | 8/1985 | Kadowaki et al. | |
| 4,759,489 A | * | 7/1988 | Pigott | 228/102 |
| 4,761,533 A | * | 8/1988 | Naruse et al. | 219/86.7 |
| 5,005,277 A | | 4/1991 | Uemura et al. | |
| 5,010,634 A | | 4/1991 | Uemura et al. | |
| 5,123,161 A | * | 6/1992 | Kubo et al. | 29/784 |
| 5,943,768 A | * | 8/1999 | Ray | 29/822 |
| 6,153,853 A | * | 11/2000 | Maruyama et al. | 219/121.63 |
| 6,293,454 B1 | * | 9/2001 | Zhang et al. | 228/4.1 |
| 6,339,204 B1 | * | 1/2002 | Kato et al. | 219/86.7 |
| 6,344,629 B1 | * | 2/2002 | Kato et al. | 219/148 |
| 6,389,698 B1 | * | 5/2002 | Malatier | 29/897.2 |
| 6,421,893 B1 | * | 7/2002 | Katayama et al. | 29/33 K |

FOREIGN PATENT DOCUMENTS

| GB | 2353503 A | 2/2001 |
| JP | 2745841 B2 | 2/1998 |

* cited by examiner

Primary Examiner—Kiley Stoner
Assistant Examiner—Jonathan Johnson
(74) Attorney, Agent, or Firm—Foley & Lardner LLP

(57) ABSTRACT

A method of assembling a vehicular body includes the following operations:

positioning a floor main and making a relative positioning between the floor main and a body side's lower section, by using a three-dimension general locator device standing on a floor, and positioning each of a right body side, a left body side and a roof rail and making the relative positioning between the body side's upper section and the roof rail, by using a front body side upper section locator jig and a rear body side upper section locator jig which are disposed on a ceiling and independent of each other in a forward-and-rearward direction of the vehicular body, and each of which is replaceable in accordance with a type of vehicle.

5 Claims, 44 Drawing Sheets

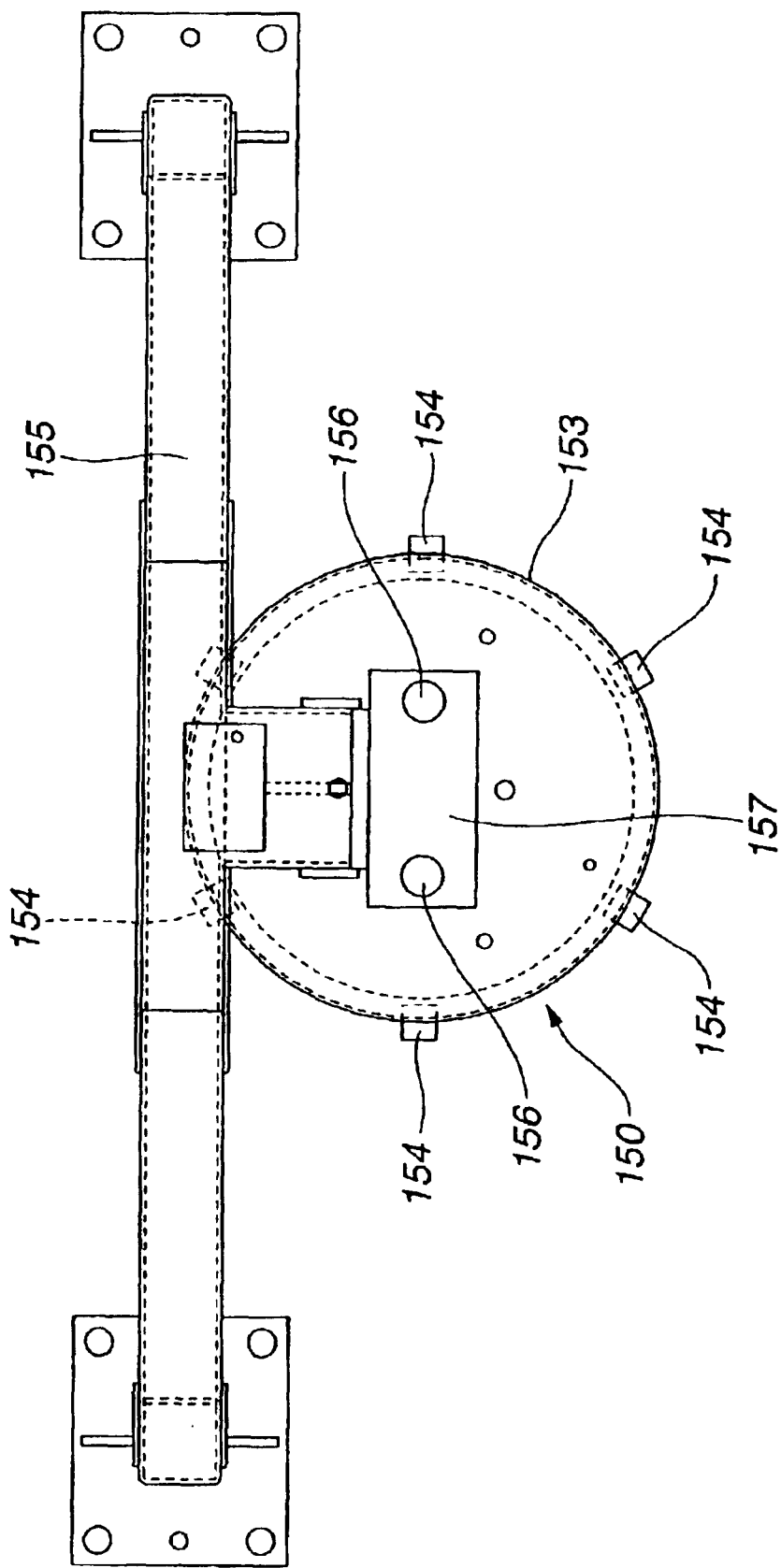

ial parts

METHOD AND APPARATUS OF ASSEMBLING VEHICULAR BODY

BACKGROUND OF THE INVENTION

The present invention relates to a method and an apparatus of assembling a vehicular body. More specifically, the method and the apparatus under the present invention are those which are preferable for a pre-tack welding operation by making a relative positioning between main components including a floor main, a right body side, a left body side, a roof rail and the like.

A mixed production has a line for assembling in common various types of vehicular bodies. A body main pre-tack welding operation is included in the mixed production.

U.S. Pat. No. 5,005,277 {equivalent of Japanese Patent Examined Publication No. Heisei 8(1996)-15876} and U.S. Pat. No. 5,010,634 {equivalent of Japanese Patent Examined Publication No. Heisei 8(1996)-15877} disclose the body main pre-tack welding operation where a body main is pre-tacked by making a relative positioning between a floor main, a right body side, a left body side, a roof rail and the like which constitute a skeleton of a vehicular body.

SUMMARY OF THE INVENTION

It is an object of the present invention to provide such a method and an apparatus of assembling a vehicular body that any complicated relative jig arrangement (i.e., jigs for locating body side upper section, roof rail and the like) outside a body side can be prevented, by using a front jig and a rear jig which are disposed respectively on a front side and a rear side of the vehicular body (to be assembled) and are independent of each other on a ceiling.

It is another object of the present invention to provide the method and the apparatus for assembling with ease the vehicular bodies having remarkable variations in panel configuration, by allowing a general welding robot to approach the body side from outside.

According to a first aspect of the present invention, there is provided a method of assembling a vehicular body wherein a pre-tack welding operation is carried out by positioning each of a floor main, a right body side, a left body side and a roof rail which constitute a body main component of a vehicle while by making a relative positioning between the floor main, the right body side, the left body side and the roof rail. The method comprises the following operations:

positioning the floor main and making the relative positioning between the floor main and the body side's lower section, by using a three-dimension general locator device standing on a floor, and positioning each of the right body side, the left body side and the roof rail and making the relative positioning between the body side's upper section and the roof rail, by using a front body side upper section locator jig and a rear body side upper section locator jig which are disposed on a ceiling and independent of each other in a forward-and-rearward direction of the vehicular body, and each of which is replaceable in accordance with a type of the vehicle.

According to a second aspect of the present invention, there is provided an apparatus of assembling a vehicular body, comprising:

a three-dimension general locator device standing on a floor, and a front body side upper section locator jig and a rear body side upper section locator jig.

According to a third aspect of the present invention, there is provided a method of assembling a vehicular body, comprising the following operations:

a temporary assembling operation of temporarily making a relative positioning between a floor main, a right body side, a left body side and a roof rail which constitute a body main component of a vehicle, a pre-tack welding operation by positioning each of the floor main, the right body side, the left body side and the roof rail while by making the relative positioning between the floor main, the right body side, the left body side and the roof rail, and an additional welding operation of the body main after the pre-tack welding operation.

Hereinabove, the body main component is conveyed between the operations in such a manner that the body main component is carried on a pallet having such a function as to position and clamp the floor main. In the pre-tack welding operation, a three-dimension general locator device standing on a floor lifts up the body main component including the floor main and makes the positioning, thereby implementing the pre-tack welding operation with the body main component separated from the pallet. Moreover, in the additional welding operation, the pallet is positioned in a pallet positioning apparatus, and the body main which is positioned and clamped by the pallet is subjected to the additional welding operation.

The other objects and features of the present invention will become understood from the following description with reference to the accompanying drawings.

BRIEF DESCRIPTION OF THE SEVERAL VIEWS OF THE DRAWINGS

FIG. 46 is a plan view of FIG. 44.

DETAILED DESCRIPTION OF THE EMBODIMENT

In the following, various embodiments of the present invention will be described in detail with reference to the accompanying drawings.

For ease of understanding, the following description will contain various directional terms, such as, left, right, upper, lower and the like. However, such terms are to be understood with respect to only a drawing or drawings on which the corresponding part of element is illustrated.

Figure 1:
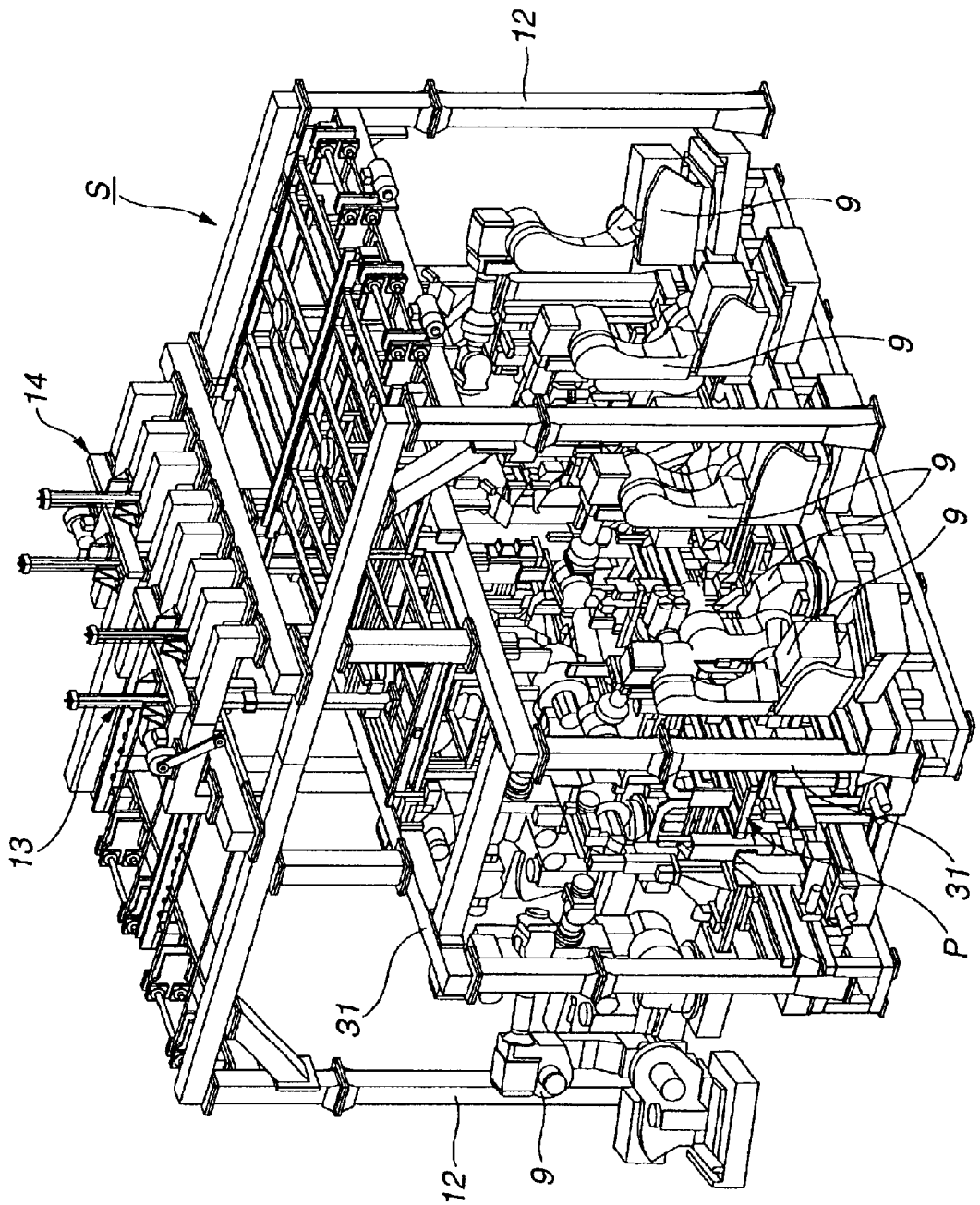
FIG. 1 is an overall view of a site for a body main pre-tack welding operation S, according to an embodiment of the present invention.
Figure 2:
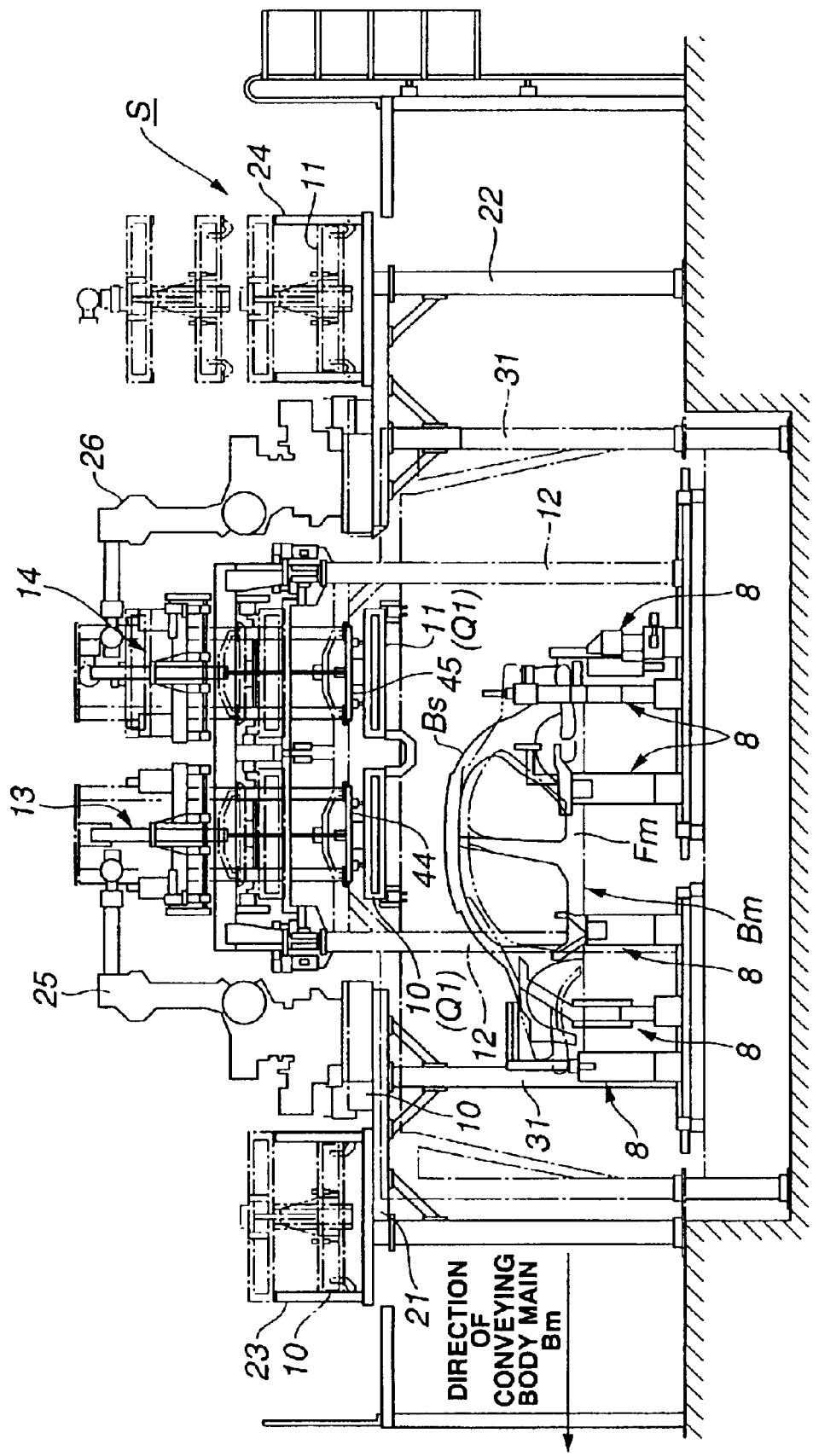
FIG. 2 is a right side view of the site for body main pre-tack welding operation S in FIG. 1.
Figure 3:
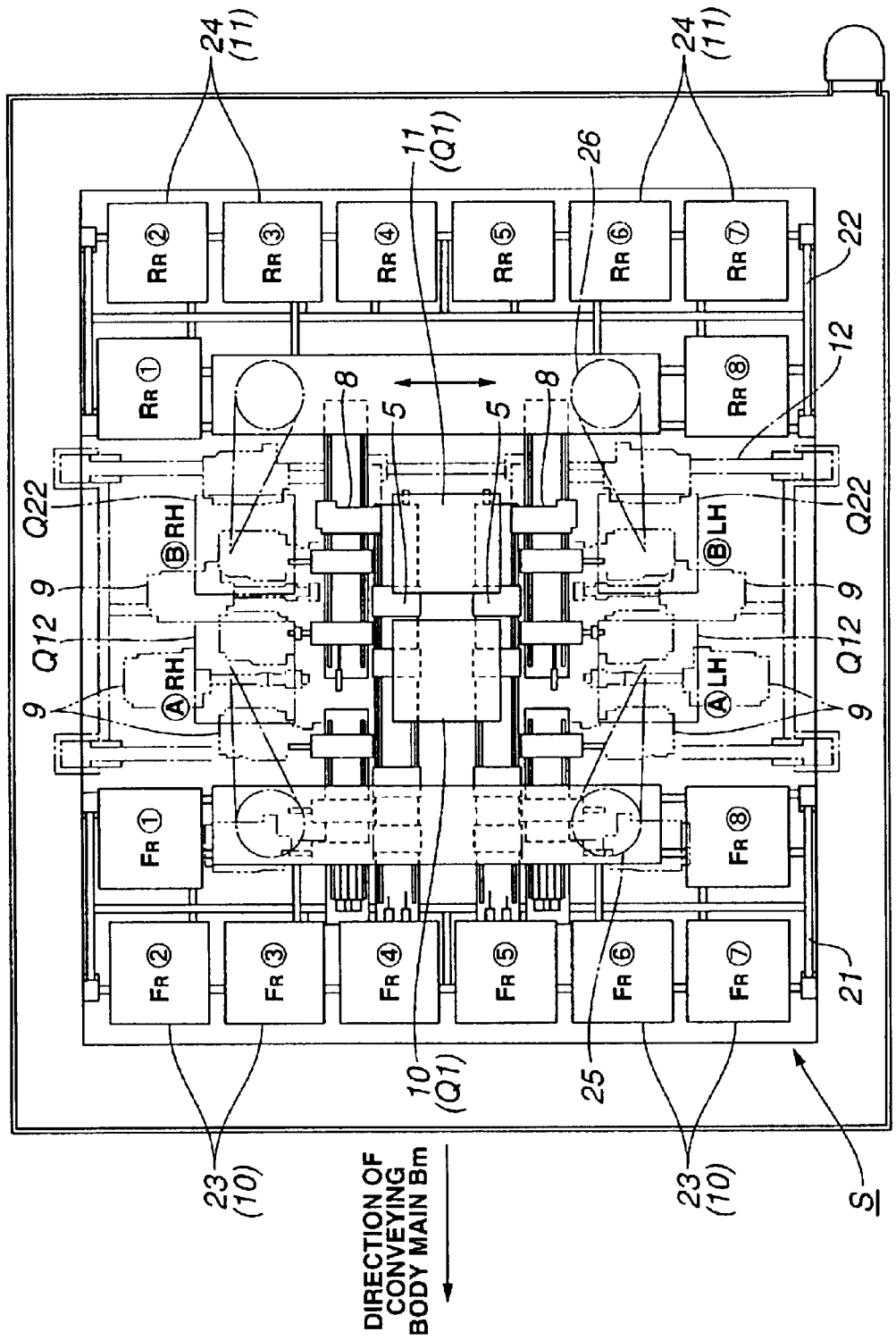
FIG. 3 is a plan view of the site for body main pre-tack welding operation S in FIG. 1.
Figure 4:
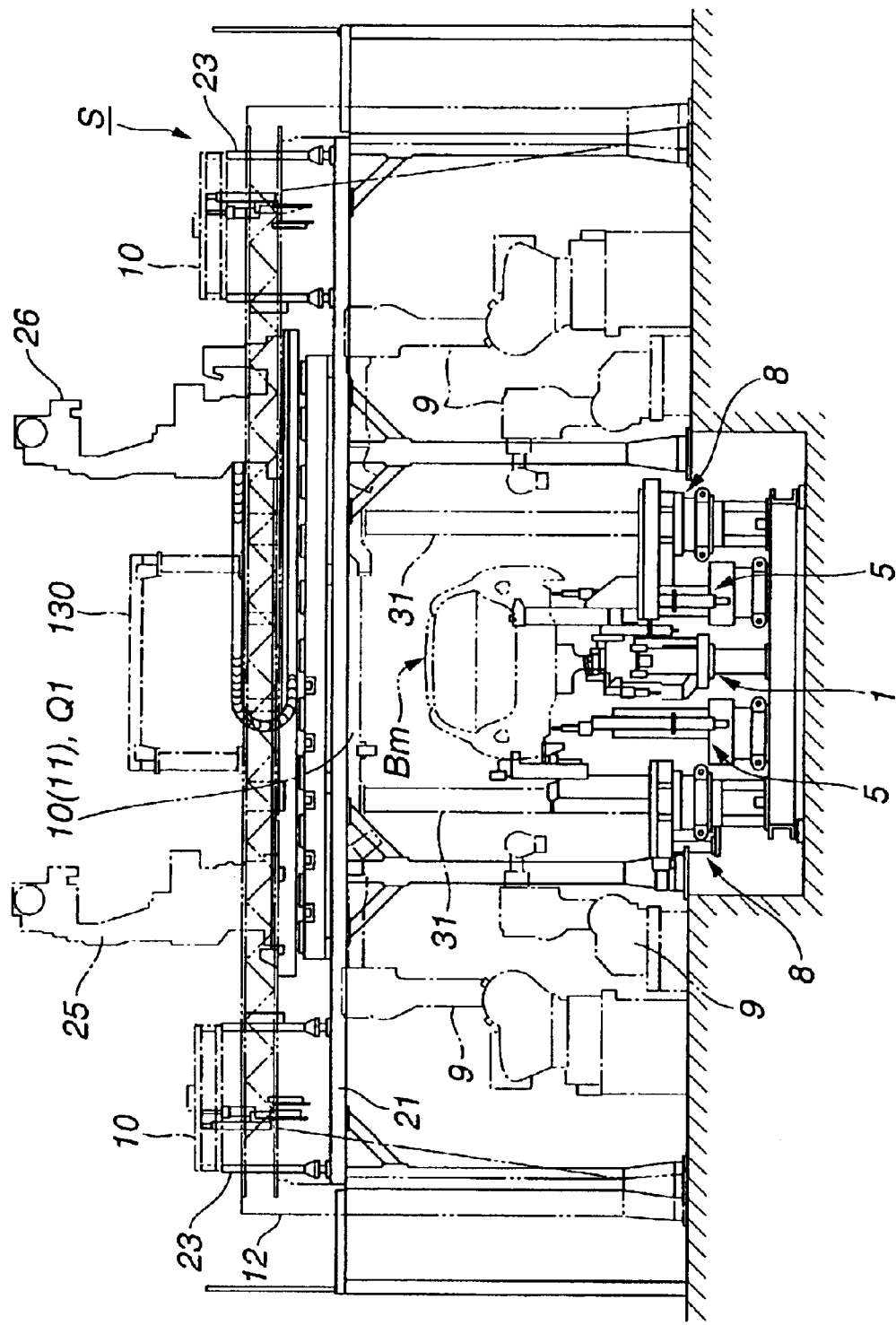
FIG. 4 is a front view of the site for body main pre-tack welding operation S in FIG. 1.
Figure 5:
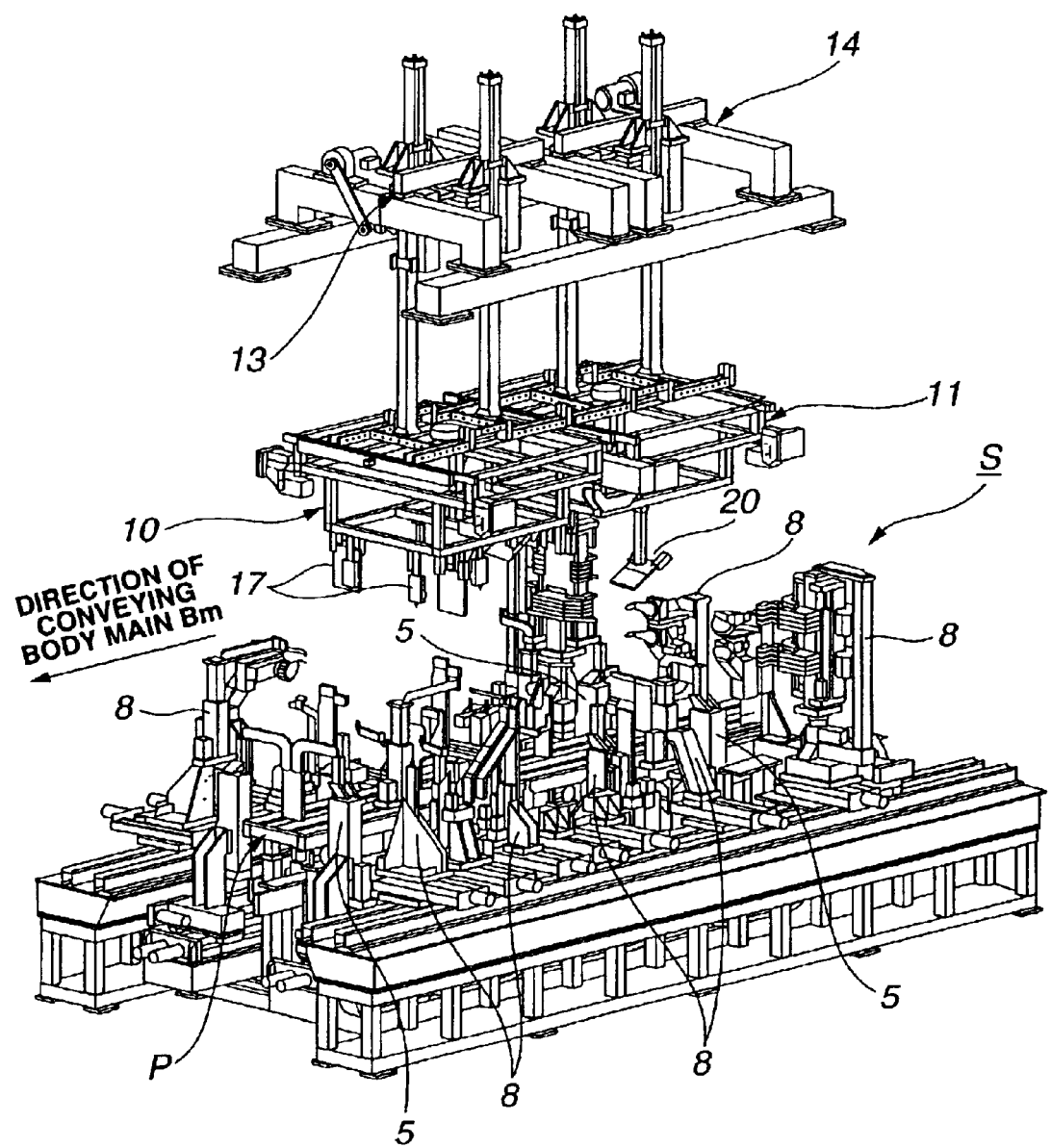
FIG. 5 is an enlarged perspective view of essential parts of the site for body main pre-tack welding operation S in FIG. 1.

As is seen in FIG. 1 to FIG. 5, there is provided an overall construction of an apparatus of assembling a vehicular body which is subjected to a body main pre-track welding operation, according to an embodiment of the present invention. More specifically, FIG. 1 is a perspective view of the overall apparatus. FIG. 2 is a right side view of FIG. 1. FIG. 3 is a plan view of FIG. 1. FIG. 4 is a front view of FIG. 1, viewed from a front side. FIG. 5 is an enlarged perspective view of essential parts in FIG. 1.

Described at first is a basic concept of assembling the vehicular body, according to the embodiment of the present invention. Conventionally, positioning a body side itself and positioning the body side relative to mating parts were carried out by a jig and the like that are disposed outside the body side, and such jig and the like are concentrated therearound.

Figure 6:
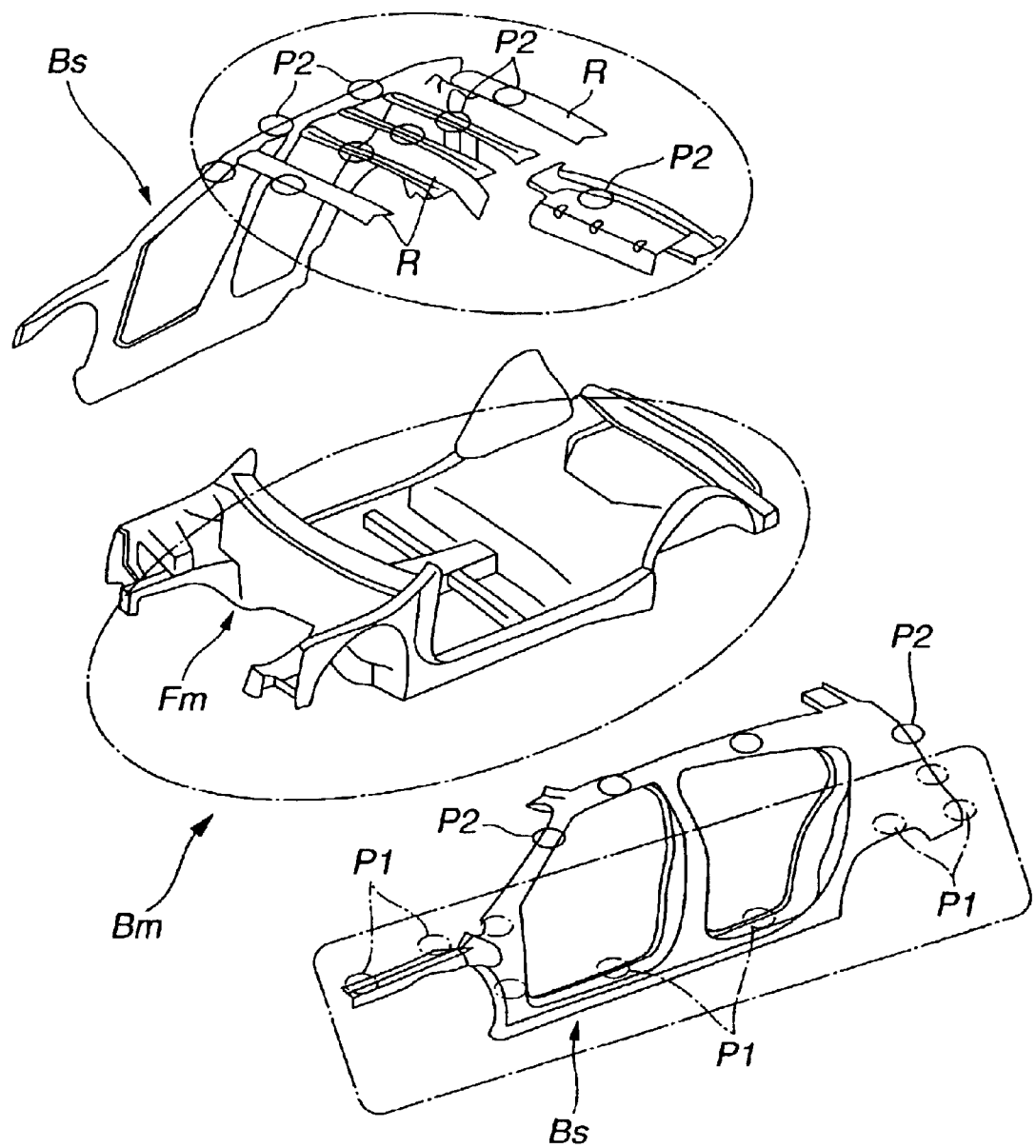
FIG. 6 is an exploded perspective view of basic concept of a method of assembling a vehicular body, according to the embodiment of the present invention.

According to the embodiment of the present invention, however, a body side Bs is divided into two sides, namely, a lower side (lower than what is called a waist line) and an upper side (upper than the waist line), as is seen in FIG. 6.

Like the conventional method, relative positioning of a portion P1 (which is a locator on the lower side of body side Bs) according to the embodiment of the present invention is carried out by a jig and the like that are disposed outside body side Bs.

Unlike the conventional method, relative positioning of a portion P2 (which is a locator on the upper side of body side Bs including a roof section) according to the embodiment of the present invention is not carried out by the jig and the like that are disposed outside body side Bs, instead, by a front jig and a rear jig that are disposed otherwise on a ceiling. As a result, the jigs and the like can be less concentrated and less complicated outside body side Bs, thus allowing a welding robot to approach from outside body outside Bs for the pre-track welding operation.

More specifically described as below, considering relative positioning between body main components, as is seen in FIG. 6. A floor main Fm which is a matrix of body main Bm has in itself comparatively a little likelihood to vary in shape with difference in vehicle type. For positioning and supporting floor main Fm, for example, a three-dimension general locator device can be generally used that has a three-dimensional mobility (on three orthogonal axes) and a peak end featuring a clamping function.

Likewise, the lower side (lower than what is called the waist line) of body side Bs has a portion (subjected to the jig) defining a cross section which has comparatively close similarity in shape despite difference in vehicle type. In this case, the above three-dimension general locator device is also useful for generalization.

On the other hand, the upper side (upper than what is called the waist line) of body side Bs is likely to show a great variation in shape with difference in vehicle type. More specifically, it is a variation in panel configuration in molding. The upper side of body side Bs is, therefore, required of great flexibility. Taking sedan for example as a "basic" vehicle type, coupe and wagon can be regarded as "derivatives" of sedan. Making a comparison between the sedan, coupe and wagon, a front side of the upper side (including the roof section) of body side Bs has comparatively a little likelihood to vary in shape, while a rear side of the upper side of body side Bs is likely to vary in shape due to above "basic-to-derivative" difference.

According to the embodiment of the present invention, the following jigs for positioning the upper side of body side Bs are rendered independent of each other: One is the front jig assigned to the front side which has comparatively a little likelihood to vary in shape with difference in vehicle type, and the other is the rear jig assigned to the rear side which is likely to vary in shape with difference in vehicle type. Especially, the rear jig is to be adopted aggressively for variation by various vehicle types.

Figure 7:
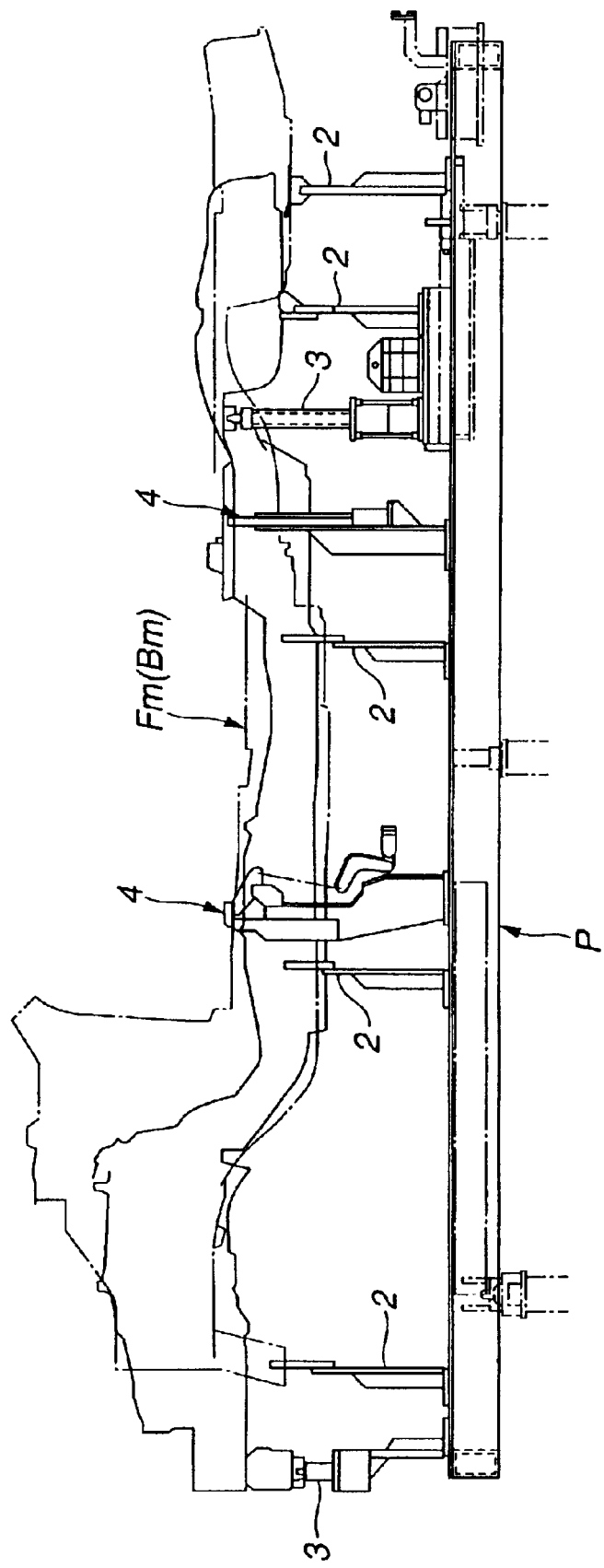
FIG. 7 is a side view of a pallet P for conveying a body main Bm.
Figure 8:
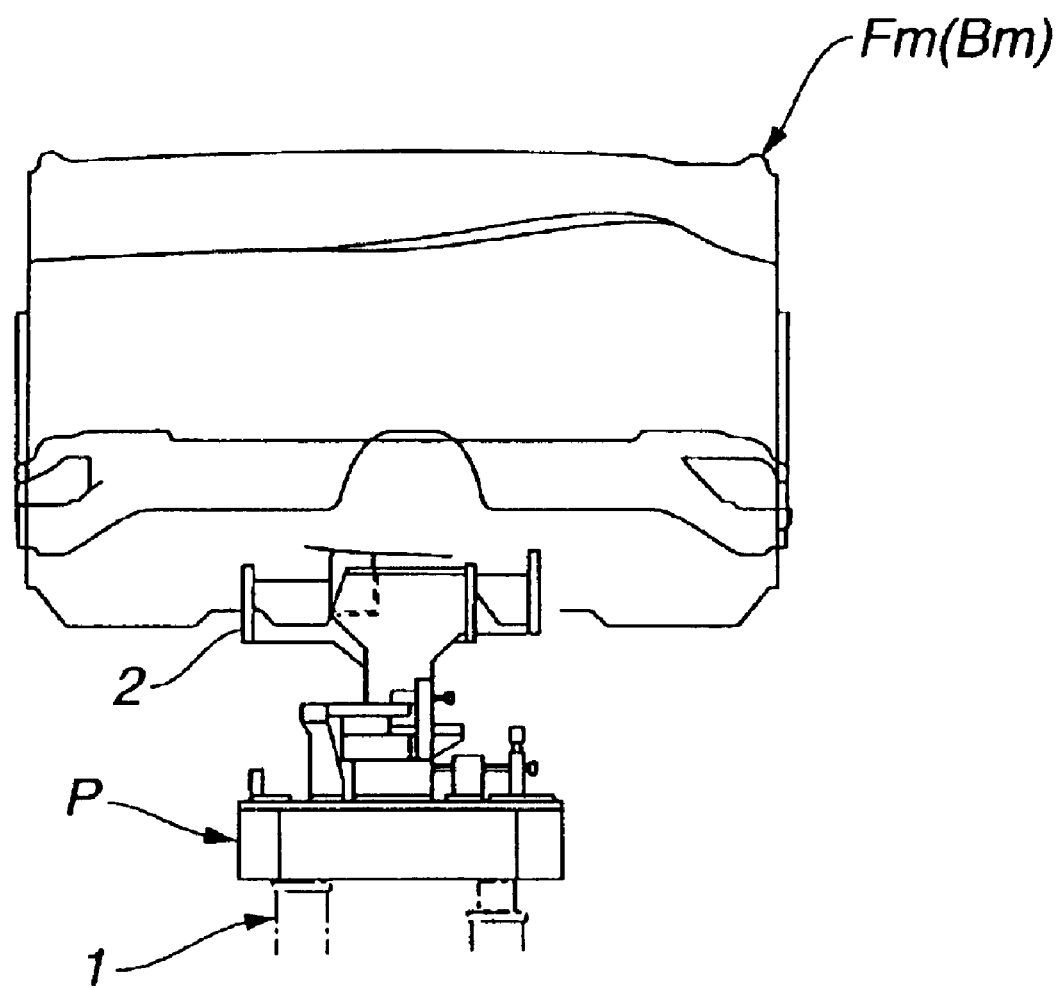
FIG. 8 is a front view of pallet P and body main Bm in FIG. 7.

In a previous operation, body main Bm is temporarily assembled. More specifically, body main components including right body side Bs, left body side Bs, roof rail R and the like are assembled to each other with floor main Fm as a matrix, as is seen in FIG. 1, FIG. 2, FIG. 5 and FIG. 6. Then, the thus temporarily assembled body main Bm is positioned and clamped to a pallet P and conveyed to a site for a body main pre-tack welding operation S, as is seen in FIG. 7 and FIG. 8 (showing floor main Fm only). Pallet P can be positioned by means of a pallet positioning apparatus 1 (FIG. 4). Hereinabove, the temporary assembly can be defined as below:

The body main components are temporarily positioned relative to each other, leaving freedom for final relative positioning.

As is seen in FIG. 7 and FIG. 8, there are provided a plurality of gauges 2 for stably supporting each part of floor main Fm of body main Bm (in other words, gauges 2 can receive configuration). Also provided are a locator pin unit 3 (featuring clamping function) and a clamp device 4. Body main Bm supported by the plurality of gauges 2 is positioned at locator pin unit 3, and clamped securely with locator pin unit 3 and clamp device 4. Hereinabove, locator pin unit 3 (featuring clamping function) and clamp device 4 are not provided with actuator. Therefore, clamping and unclamping can be carried out by turning screws (which are attached respectively to locator pin unit 3 and clamp device 4) with an external operating means. During movement of pallet P, the above clamping state can be self-maintained.

Figure 9:
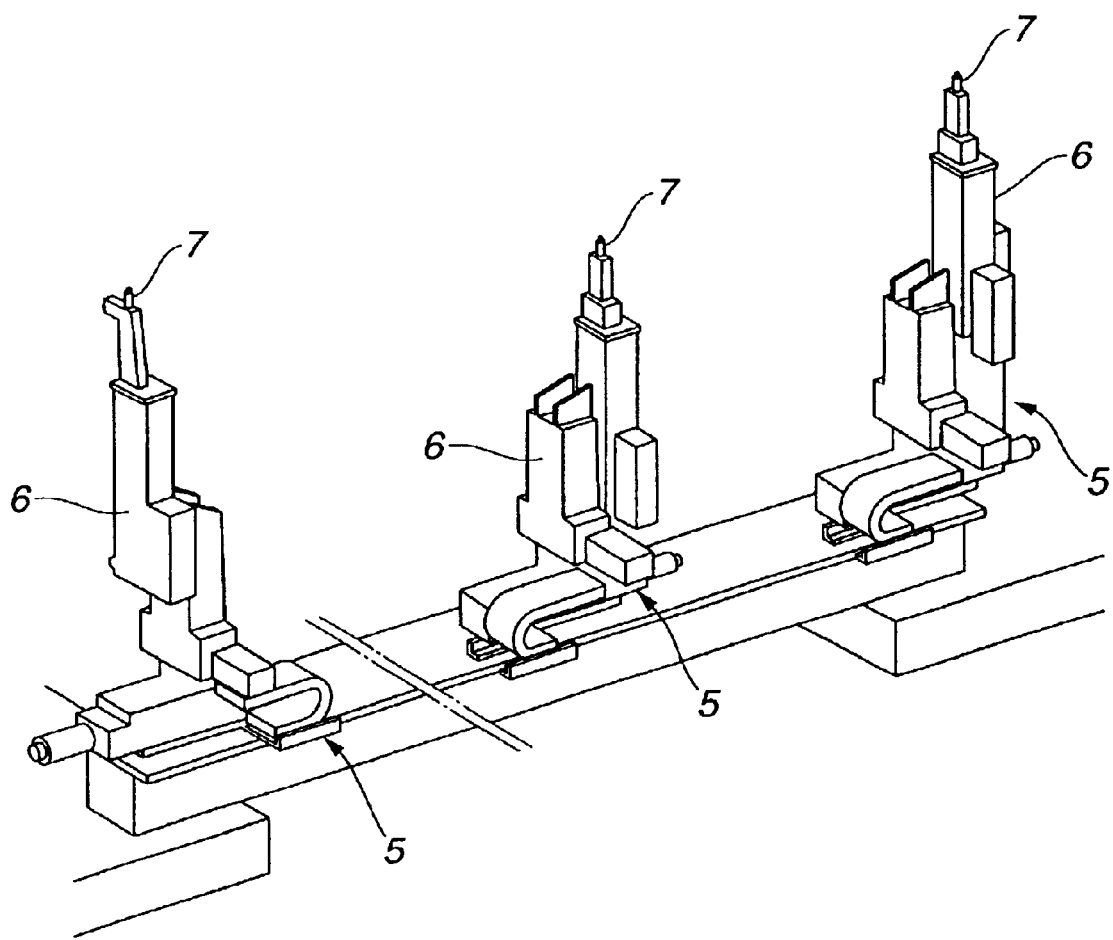
FIG. 9 is a perspective view of a schematic of a three-dimension general locator jig 5 for locating a floor main Fm.

As is seen in FIG. 1, FIG. 2, FIG. 3, FIG. 4 and FIG. 5, body main pre-tack operation S is carried out on a floor which is provided with a plurality of three-dimension general locator jigs 5 standing on a right side and a left side of the pallet positioning apparatus 1 (see FIG. 4). Three-dimension general locator jig 5 can locate floor main Fm. FIG. 9 is an overall view of the three-dimension general locator jigs 5 each of which includes a locator body 6 and a locator pin unit 7. Locator body 6 is shaped substantially into a robot which is mobile on three orthogonal axes. Moreover, locator body 6 has a peak end provided with locator pin unit 7 featuring clamping function.

Japanese Patent Publication No. 2745841 {equivalent of Japanese Patent Unexamined Publication No. Heisei 4(1992)-283034 [JP4283034]} discloses a locator pin unit which is similar to locator pin unit 7 according to the embodiment of the present invention.

Pallet P carrying the temporarily assembled body main components is conveyed to the site for body main pre-tack welding operation S. After pallet P is positioned, clamp device 4 on pallet P unclamps the body main components. In place of clamp device 4, three-dimension general locator jig 5 for positioning floor main Fm in body main pre-tack welding operation S moves locator pin unit 7 in accordance with the vehicle type. Then, three-dimension general locator jig 5 lifts up floor main Fm (as a support point) of the body main components. Substantially simultaneously with this, three-dimension general locator jig 5 also positions and clamps floor main Fm at a predetermined height. In sum, the body main components are separated from pallet P in body main pre-tack welding operation S.

Outside three-dimension general locator jigs 5 for positioning floor main Fm on the site for body main pre-tack welding operation S, there are provided a plurality of three-dimension general locator jigs 8 for positioning lower section of body side Bs. Like three-dimension general locator jig 5, three-dimension general locator jig 8 includes a locator body which is shaped substantially into a robot mobile on three orthogonal axes and which has a peak end fitted with various gauges (for receiving configuration) and clamp devices. With the above construction, three-dimension general locator jig 8 can three-dimensionally position body side Bs itself, and also make relative positioning between body side Bs and floor main Fm. Of the body main components that are positioned and clamped by means of three-dimension general locator jigs 5, three-dimension general locator jigs 8 can approach the lower section of body side Bs. Then, three-dimension general locator jigs 8 can carry out three-dimensional positioning and clamping of body side Bs itself, and relative positioning between body side Bs and floor main Fm.

Outside three-dimension general locator jigs 8, there are provided a plurality of general-purpose welding robots 9, as is seen in FIG. 1. Welding robots 9 can approach body main Bm from between three-dimension general locator jigs 8, so as to carry out a spot welding (as a pre-tack welding operation) to a junction between the body main components after the relative positioning.

In a space above body main Bm on the site for body main pre-tack welding operation S, there are provided a front body side upper section locator jig 10 and a rear body side upper section locator jig 11, as is seen in FIG. 2 and FIG. 5. Front body side upper section locator jig 10 and rear body side upper section locator jig 11 are disposed on the ceiling, and are independent of each other at front side and rear side of the vehicular body respectively. Each of front body side upper section locator jig 10 and rear body side upper section locator jig 11 is exclusive to a single vehicle type or plural vehicle types, and can be replaced in accordance with the type of body main Bm which is subjected to body main pre-tack welding operation S—to be described afterward.

Figure 10:
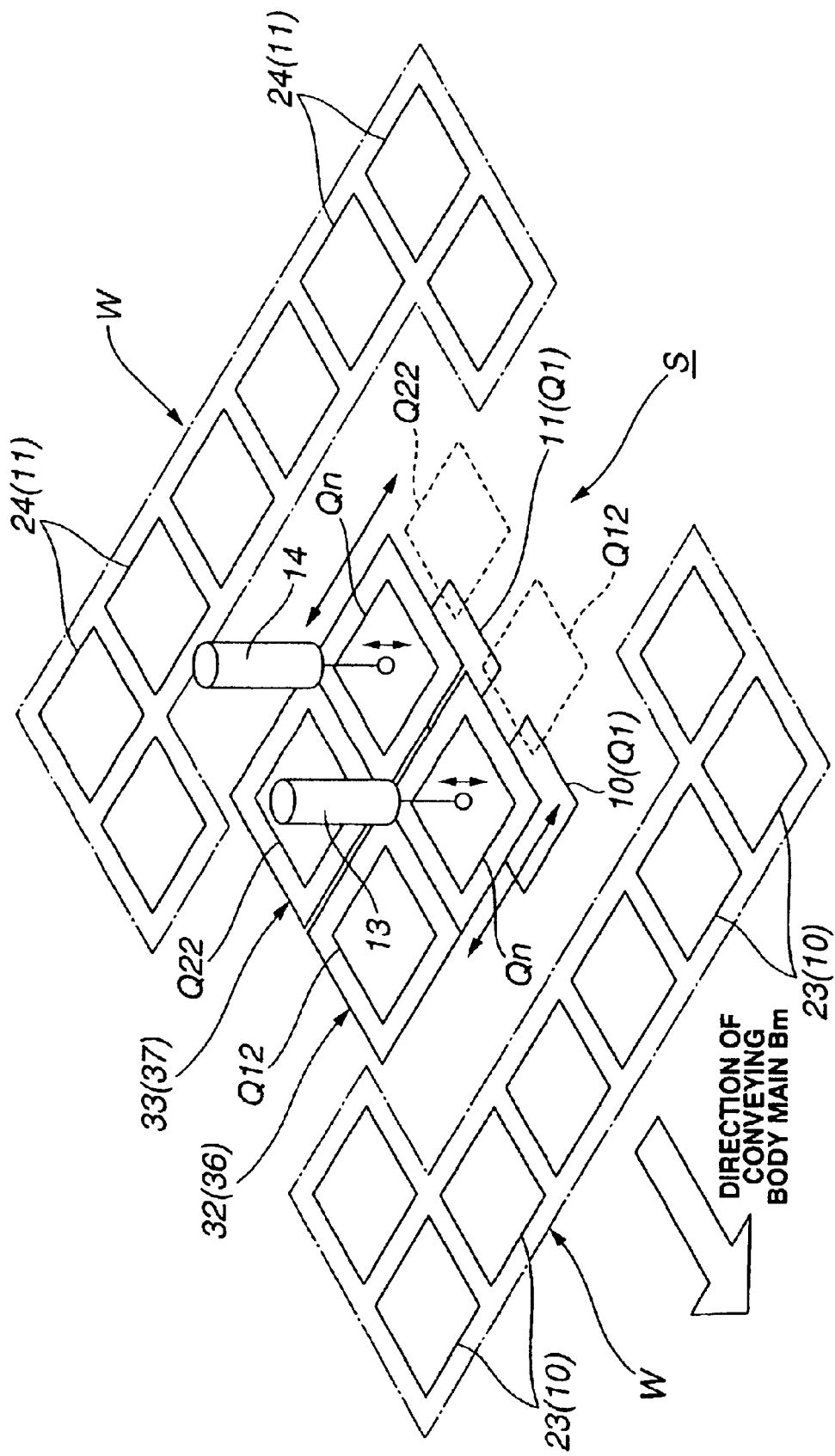
FIG. 10 is a perspective view of a schematic showing a section concerning replacement of a front body side upper section locator jig 10 and a rear body side upper section locator jig 11 shown in FIG. 2.

FIG. 10 shows a schematic of a portion (in FIG. 3) that relates only to front body side upper section locator jig 10 and rear body side upper section locator jig 11. As is obvious from FIG. 10, an operating position Q1 is defined as a position where each of front body side upper section locator jig 10 and rear body side upper section locator jig 11 is to be disposed. A soon-to-be replaced position Qn is defined above operating position Q1. Front body side upper section locator jig 10 conveyed to soon-to-be replaced position Qn is interposed between a pair of front standby positions Q12 (right and left) disposed substantially level with soon-to-be replaced position Qn, while rear body side upper section locator jig 11 conveyed to soon-to-be replaced position Qn is interposed between a pair of rear standby positions Q22 (right and left) disposed substantially level with soon-to-be replaced position Qn. As a storage area W, a plurality of front jig receivers 23 are disposed on a front side of front body side upper section locator jig 10, while a plurality of rear jig receivers 24 are disposed on a rear side of rear body side upper section locator jig 11.

Figure 11:
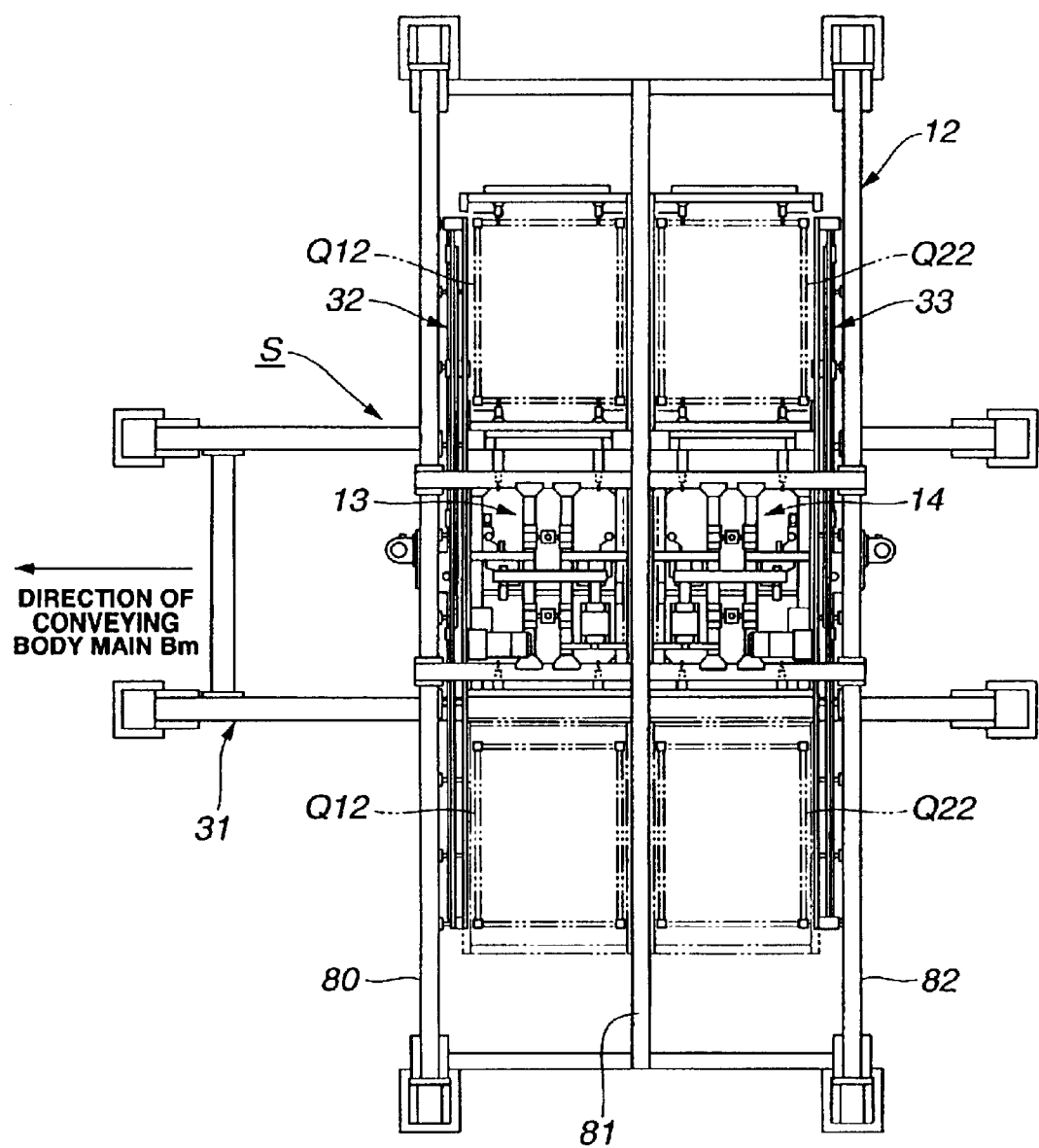
FIG. 11 is a plan view of essential parts in FIG. 1.
Figure 12:
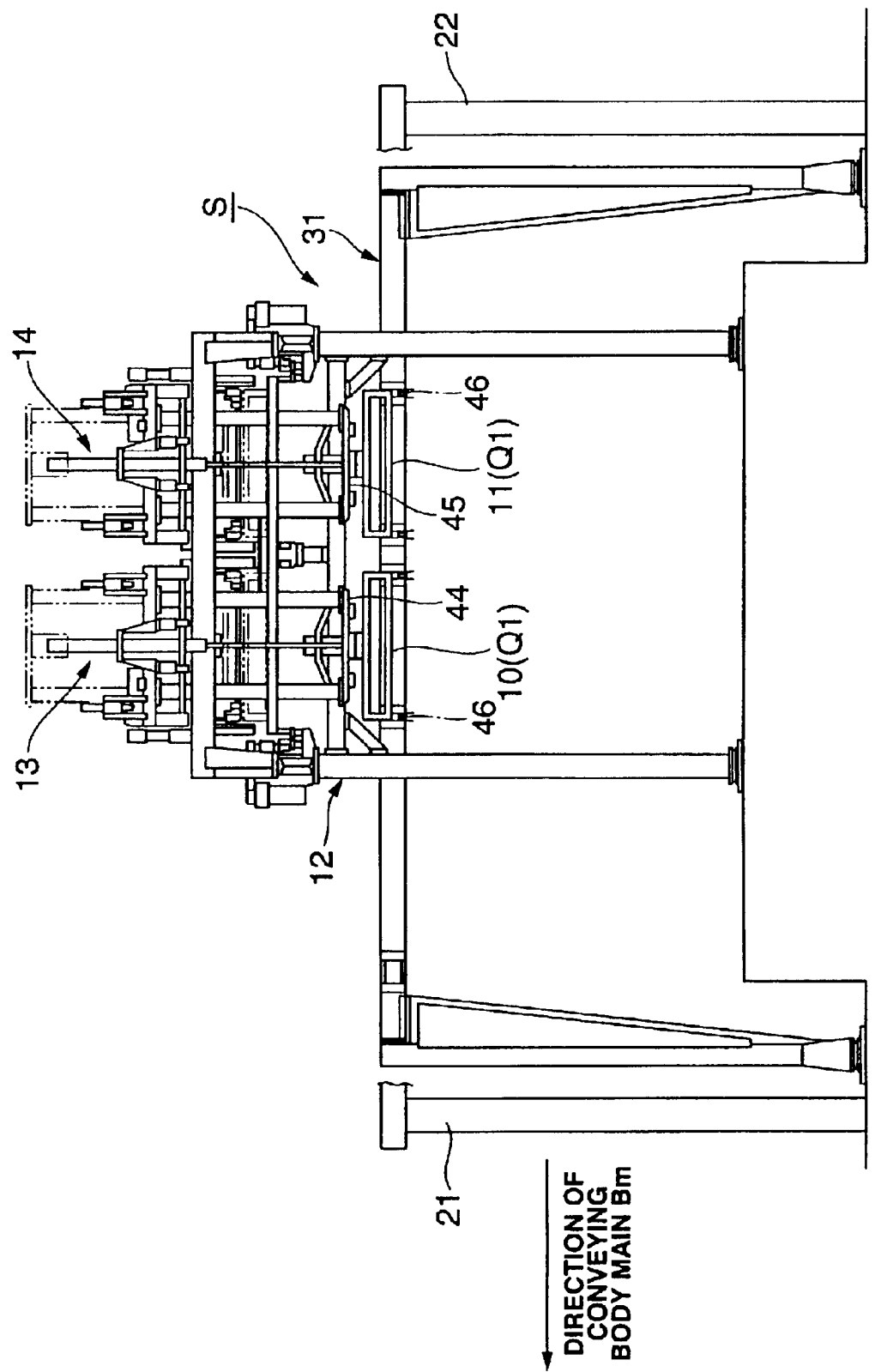
FIG. 12 is a right side view of FIG. 11.
Figure 13:
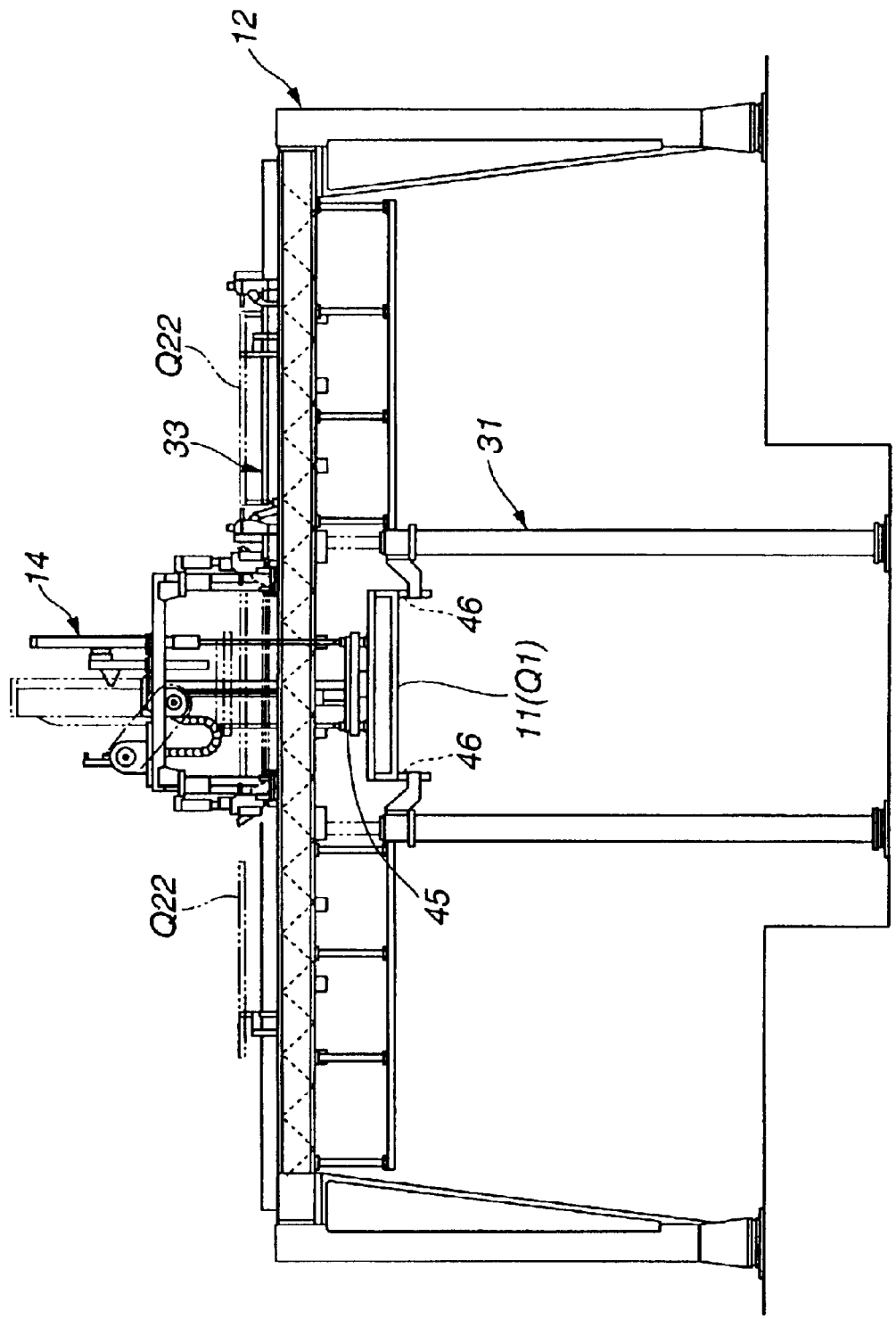
FIG. 13 is a front view of FIG. 11.

As is seen in FIG. 1, FIG. 2 and FIG. 4, and more specifically seen in FIG. 11, FIG. 12 and FIG. 13, on the site for body main pre-tack welding operation S, there are provided a pair of frames 31 extending forward and rearward relative to the vehicular body. Other than frames 31, there is provided a frame 12 standing on the floor and extending sideward (rightward and leftward) relative to the vehicular body, in such a manner as to stride over frames 31. As is seen in FIG. 11, on frame 12, there are provided a front carriage slider 32 and a rear carriage slider 33 each of which acts as a secondary jig replacing means (one of three jig replacing means). Also provided above frame 12 in FIG. 12 are a front lifter 13 and a rear lifter 14 each of which acts as a final jig replacing means (one of the three jig replacing means).

As is seen in FIG. 10, front carriage slider 32 can replace front body side upper section locator jig 10 between soon-to-be replaced position Qn (disposed above operating position Q1) and front standby positions Q12 (disposed on right side and left side of soon-to-be replaced position Qn), while rear carriage slider 33 can replace rear body side upper section locator jig 11 between soon-to-be replaced position Qn (disposed above operating position Q1) and rear standby positions Q22 (disposed on right side and left side of soon-to-be replaced position Qn).

On the other hand, in upward-and-downward direction, front lifter 13 is located in a position corresponding to soon-to-be replaced position Qn and operating position Q1, to thereby replace front body side upper section locator jig 10 between soon-to-be replaced position Qn and operating position Q1, while rear lifter 14 is also located in the position corresponding to soon-to-be replaced position Qn and operating position Q1, to thereby replace rear body side upper section locator jig 11 between soon-to-be replaced position Qn and operating position Q1.

Figure 14:
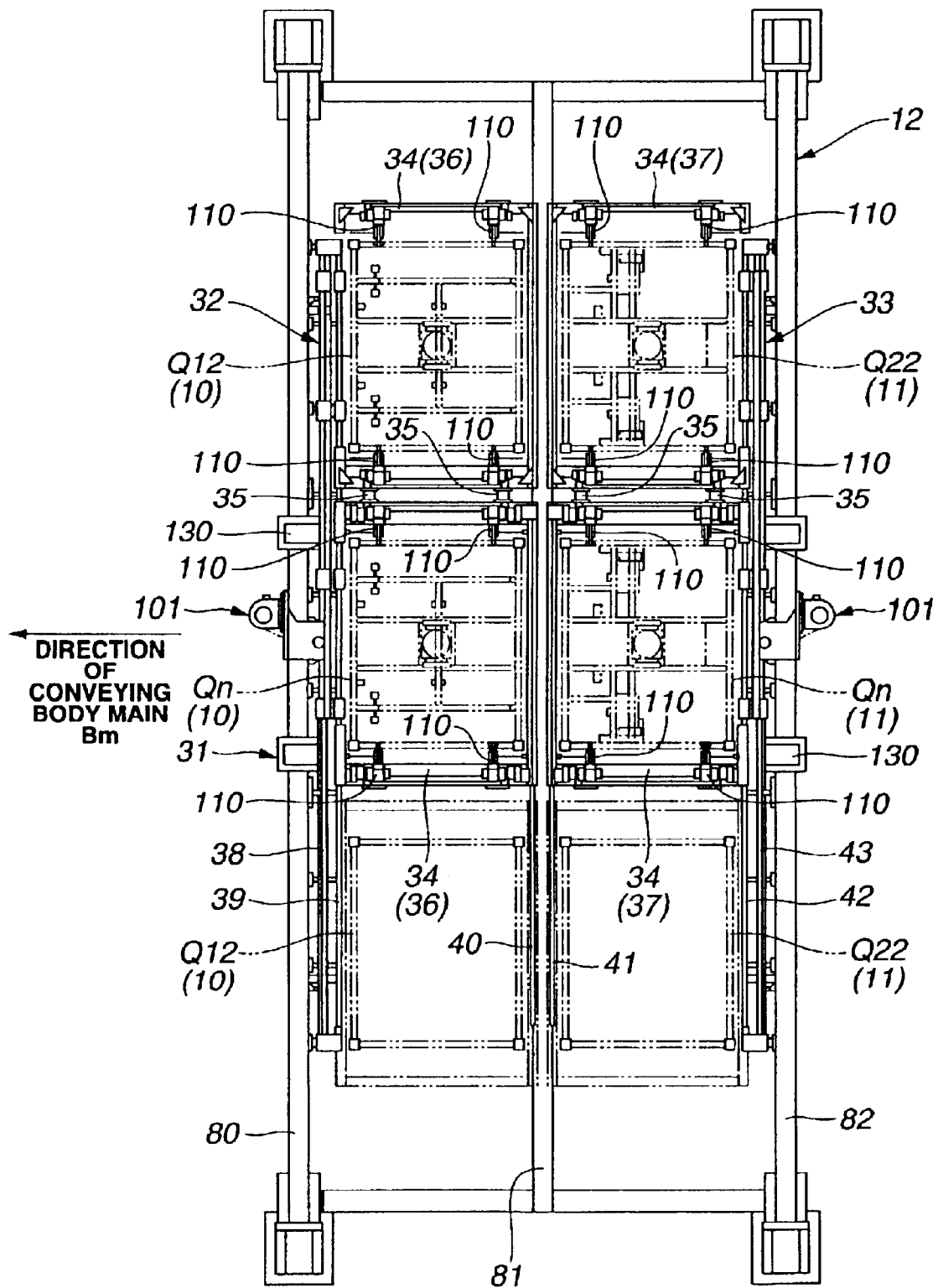
FIG. 14 is an enlarge view of essential parts in FIG. 11.
Figure 15:
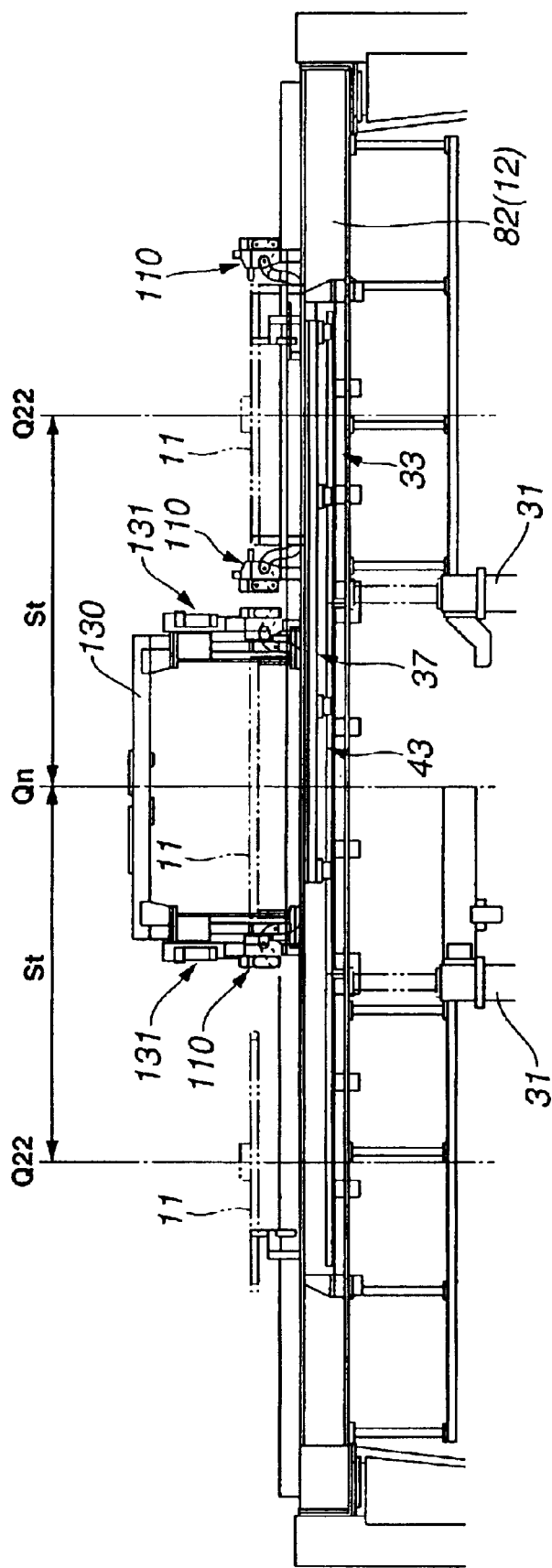
FIG. 15 is a left side view of FIG. 14.

As is seen in FIG. 11, FIG. 14 and FIG. 15, there are provided a pair of a right carriage frame 34 and a left carriage frame 34 which are arranged sideward (cross direction of the vehicle, or upward and downward in FIG. 14) as a jig carrying area, and are coupled with each other by means of spacers 35, thus constituting a front conveyer 36. Likewise, a rear conveyer 37 can be constituted of the pair of right carriage frame 34 and left carriage frame 34 coupled with each other by means of spacers 35. In sum, each of the pair of front conveyer 36 and rear conveyer 37 can slidably move on frame 12 sideward (cross direction of the vehicle, or upward and downward in FIG. 14) in a range defined by a stroke St in FIG. 15. Front conveyer 36 and rear conveyer 37 can make a round trip alternately, and independently of each other. More specifically, front conveyer 36 can independently move between soon-to-be replaced position Qn and front standby positions Q12 (disposed on right side and left side of soon-to-be replaced position Qn), while rear conveyer 37 can independently move between soon-to-be replaced position Qn and rear standby positions Q22 (disposed on right side and left side of soon-to-be replaced position Qn). On frame 12, front conveyer 36 is provided with a combination of three linear motion bearings, namely, a linear motion bearing 38, a linear motion 39 and a linear motion 40, while rear conveyer 37 is provided with a combination of three linear motion bearings, namely, a linear motion bearing 41, a linear motion bearing 42 and a linear motion bearing 43. Linear motion bearing 38, linear motion bearing 39, linear motion bearing 40, linear motion bearing 41, linear motion bearing 42 and linear motion bearing 43 (each of which is also referred to as LM guide [branded by Japanese manufacturer THK CO., LTD, where LM stands for "linear motion"] or a linear guide) are arranged sequentially from front side to rear side, and extend comparatively long—to be described afterward. Front conveyer 36 can move guided by linear motion bearing 38, linear motion bearing 39 and linear motion bearing 40, while rear conveyer 37 can move guided by linear motion bearing 41, linear motion bearing 42 and linear motion bearing 43.

Front conveyer 36 for replacing front body side upper section locator jig 10 is independent of rear conveyer 37 for replacing rear body side upper section locator jig 11. Being carried on one of carriage frames 34 of front conveyer 36, each front body side upper section locator jig 10 can be positioned and caught by a jig catcher 110 (to be described afterward). Independently of front body side upper section locator jig 10, each rear body side upper section locator jig 11 can be positioned and caught by the jig catcher 110, being carried on one of carriage frames 34 of rear conveyer 37. When one of right carriage frame 34 and left carriage frame 34 constituting front conveyer 36 is disposed in soon-to-be replaced position Qn, the other of right carriage frame 34 and left carriage frame 34 is disposed in either front standby position Q12 (right) or front standby position Q12 (left). Likewise, when one of right carriage frame 34 and left carriage frame 34 constituting rear conveyer 37 is disposed in soon-to-be replaced position Qn, the other of right carriage frame 34 and left carriage frame 34 is disposed in either rear standby position Q22 (right) or rear standby position Q22 (left).

Herein, each carriage frame 34 as the jig carrying area of one of front conveyer 36 and rear conveyer 37 is greater in shape (outline) than front body side upper section locator jig 10 and rear body side upper section locator jig 11. Thereby, each of front body side upper section locator jig 10 and rear body side upper section locator jig 11 can be shifted from soon-to-be replaced position Qn downward to operating position Q1 through carriage frame 34—to be described afterward. As is seen in FIG. 10, front body side upper section locator jig 10 can be replaced between soon-to-be replaced position Qn and front standby positions Q12 (disposed on right side and left side of soon-to-be replaced position Qn) in accordance with shift of front conveyer 36, while rear body side upper section locator jig 11 can be replaced between soon-to-be replaced position Qn and rear standby positions Q22 (disposed on right side and left side of soon-to-be replaced position Qn) in accordance with shift of rear conveyer 37. Moreover, as is seen in FIG. 10, front body side upper section locator jig 10 can be replaced between soon-to-be replaced position Qn and operating position Q1 in accordance with upward-and-downward shift of front lifter 13, while rear body side upper section locator jig 11 can be replaced between soon-to-be replaced position Qn and operating position Q1 in accordance with upward-and-downward shift of rear lifter 14—to be described afterward. Details of front carriage slider 32, rear carriage slider 33, front conveyer 36 and rear conveyer 37 are to be described afterward.

As is seen in FIG. 2, FIG. 5, FIG. 12 and FIG. 13, front lifter 13 has a peak end fitted with a front jig changer 44 as a jig gripping means, while rear lifter 14 has a peak end fitted with a rear jig changer 45 as a jig gripping means. Each of front jig changer 44 and rear jig changer 45 can move upward and downward in a predetermined stroke.

Front body side upper section locator jig 10 carried by front conveyer 36 (carriage frame 34) is conveyed to soon-to-be replaced position Qn in a state that front jig changer 44 is disposed at an uppermost position. Then, front body side upper section locator jig 10 can autonomously engage with a part of front jig changer 44 of front lifter 13, in such a manner that front body side upper section locator jig 10 is also carried by front jig changer 44. Then, jig catcher 110 (see FIG. 14) of front conveyer 36 may release front body side upper section locator jig 10, to thereby allow front lifter 13 to lower front body side upper section locator jig 10 to operating position Q1—to be described afterward.

Likewise, rear body side upper section locator jig 11 carried by rear conveyer 37 (carriage frame 34) is conveyed to soon-to-be replaced position Qn in a state that rear jig changer 45 is disposed in an uppermost position. Then, rear body side upper section locator jig 11 can autonomously engage with a part of rear jig changer 45 of rear lifter 14, in such a manner that rear body side upper section locator jig 11 is also carried by rear jig changer 45. Then, jig catcher 110 (see FIG. 14) of rear conveyer 37 may release rear body side upper section locator jig 11, to thereby allow rear lifter 14 to lower rear body side upper section locator jig 11 to operating position Q1—to be described afterward.

In sum, front jig changer 44 at the peak end of front lifter 13 attachably and removably carries front body side upper section locator jig 10, while rear jig changer 45 at the peak end of rear lifter 14 attachably and removably carries rear body side upper section locator jig 11. In an ordinary assembling operation, front lifter 13 and rear lifter 14 stand by in a state that each of front body side upper section locator jig 10 and rear body side upper section locator jig 11 is located in operating position Q1 in the middle by means of a locator pin 46 (see FIG. 12, FIG. 13, FIG. 40 and FIG. 41) on frame 31. Hereinabove, locator pin 46 acts as a reference member. Details of front lifter 13 and rear lifter 14 are to be described afterward.

Figure 16:
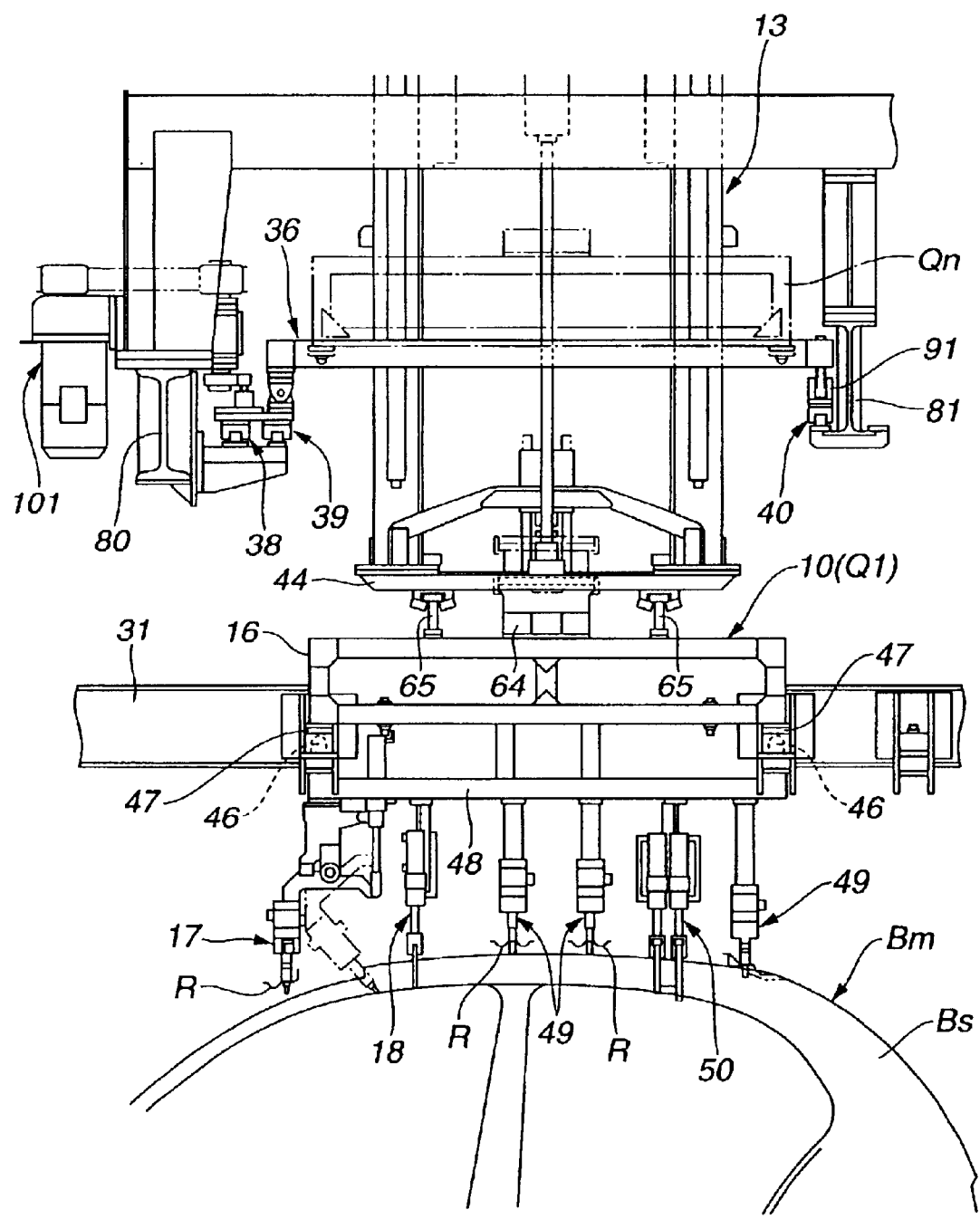
FIG. 16 is a side view of front body side upper section locator jig 10 shown in detail.
Figure 17:
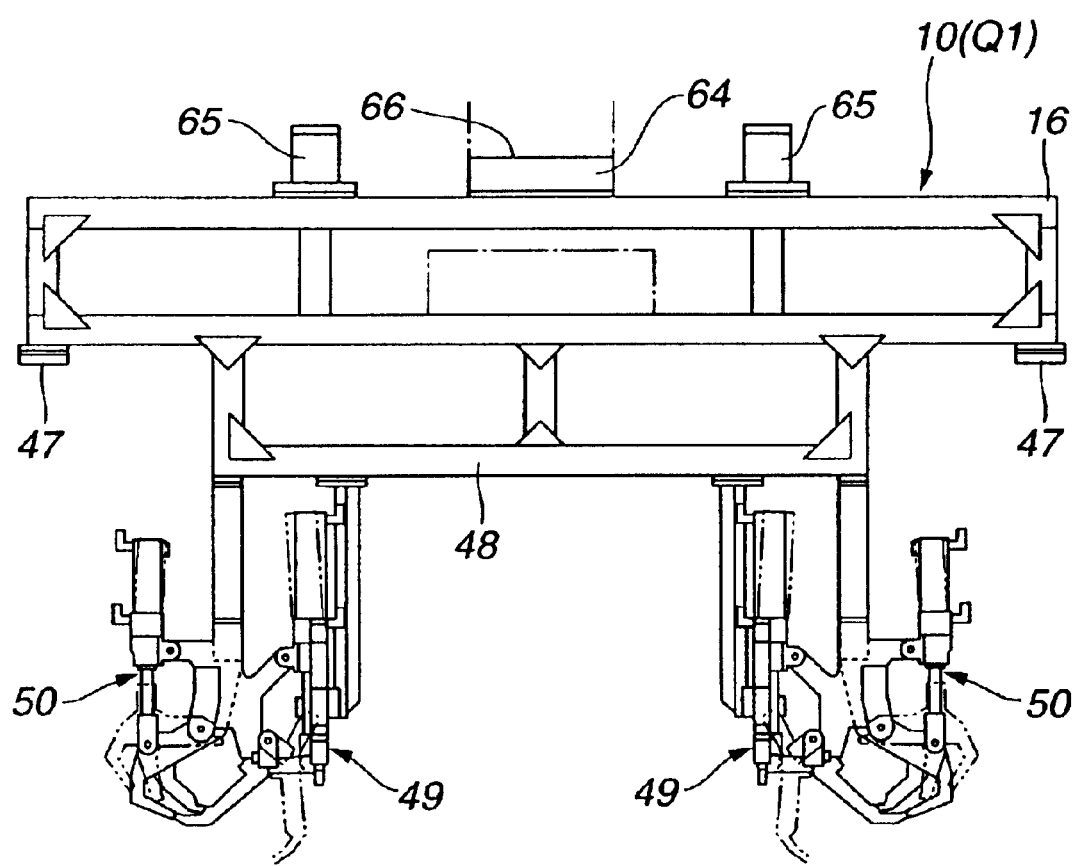
FIG. 17 is a front view of front body side upper section locator jig 10 shown in detail.

As is seen in FIG. 16 and FIG. 17, front lifter 13 can lower front body side upper section locator jig 10 to a lowermost position. At this point in time, in other words, when front body side upper section locator jig 10 is transferred from soon-to-be replaced position Qn to operating position Q1, locator pin 46 (see FIG. 40 and FIG. 41) works as the reference member to locate front body side upper section locator jig 10 on frame 31.

As is seen in FIG. 17, a front jig body 16 shaped substantially into a rectangle defines four lower corners each of which is formed with a locator sleeve 47 fitting over locator pin 46. In addition, there is provided a front auxiliary frame 48 extending downward from front jig body 16. Front auxiliary frame 48 suspends a plurality of locator pin units 17 and locator pin units 49 (actuated by an air cylinder, and featuring clamping function). Also suspended from front auxiliary frame 48 include a clamp device 18 and a clamp device 50 (actuated by the air cylinder, and featuring clamping function). Locator pin unit 17, locator pin unit 49, clamp device 18 and clamp device 50 can locate and clamp the upper section of body side Bs (namely, a section in the vicinity of the roof), roof rail R, and the like. Moreover, locator pin unit 17, locator pin unit 49, clamp device 18 and clamp device 50 can make a relative positioning between the upper section of body side Bs, temporarily assembled roof rail R, and the like.

Figure 18:
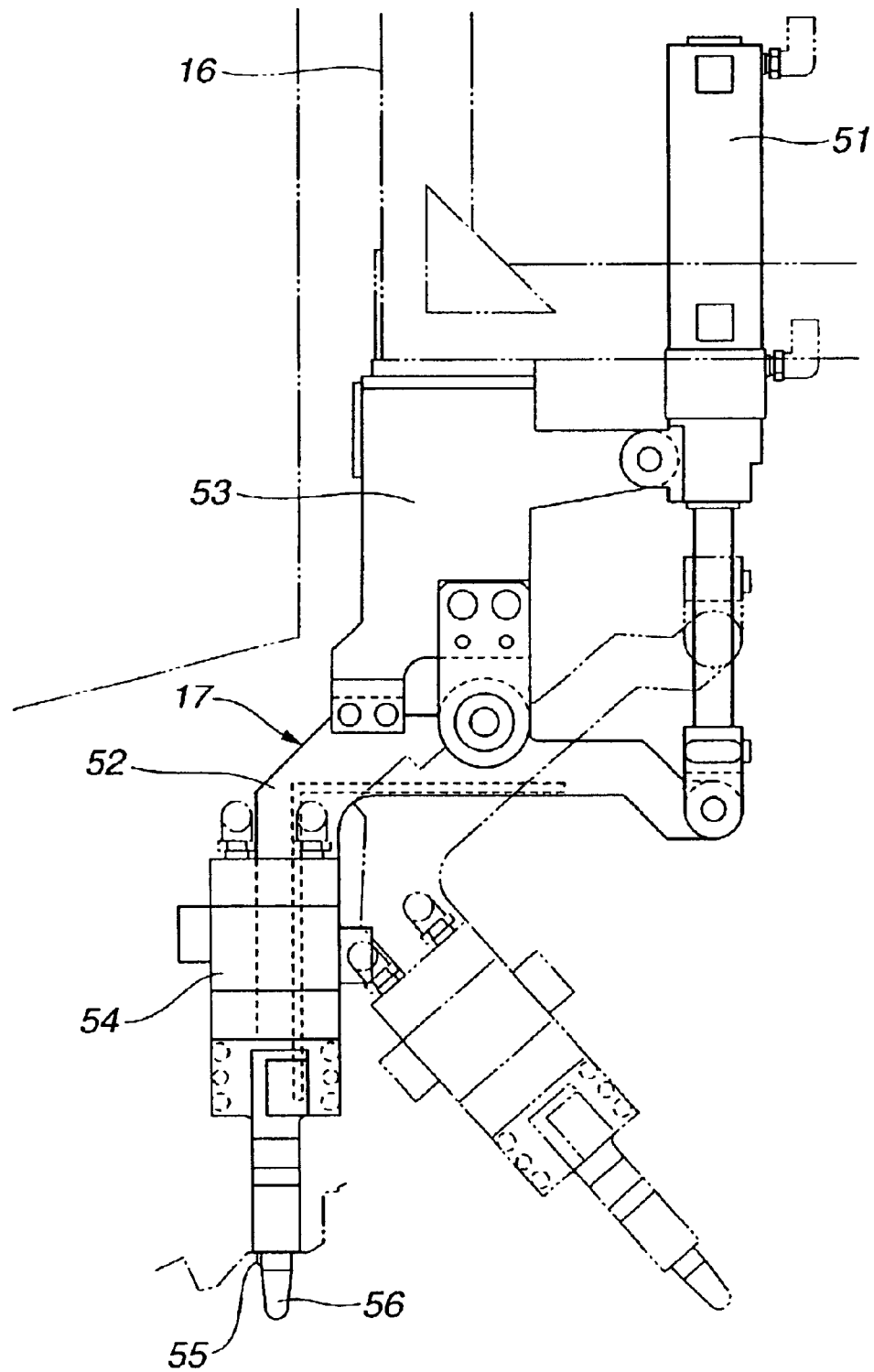
FIG. 18 is an enlarged view of a locator pin unit 17 shown in FIG. 16.
Figure 19:
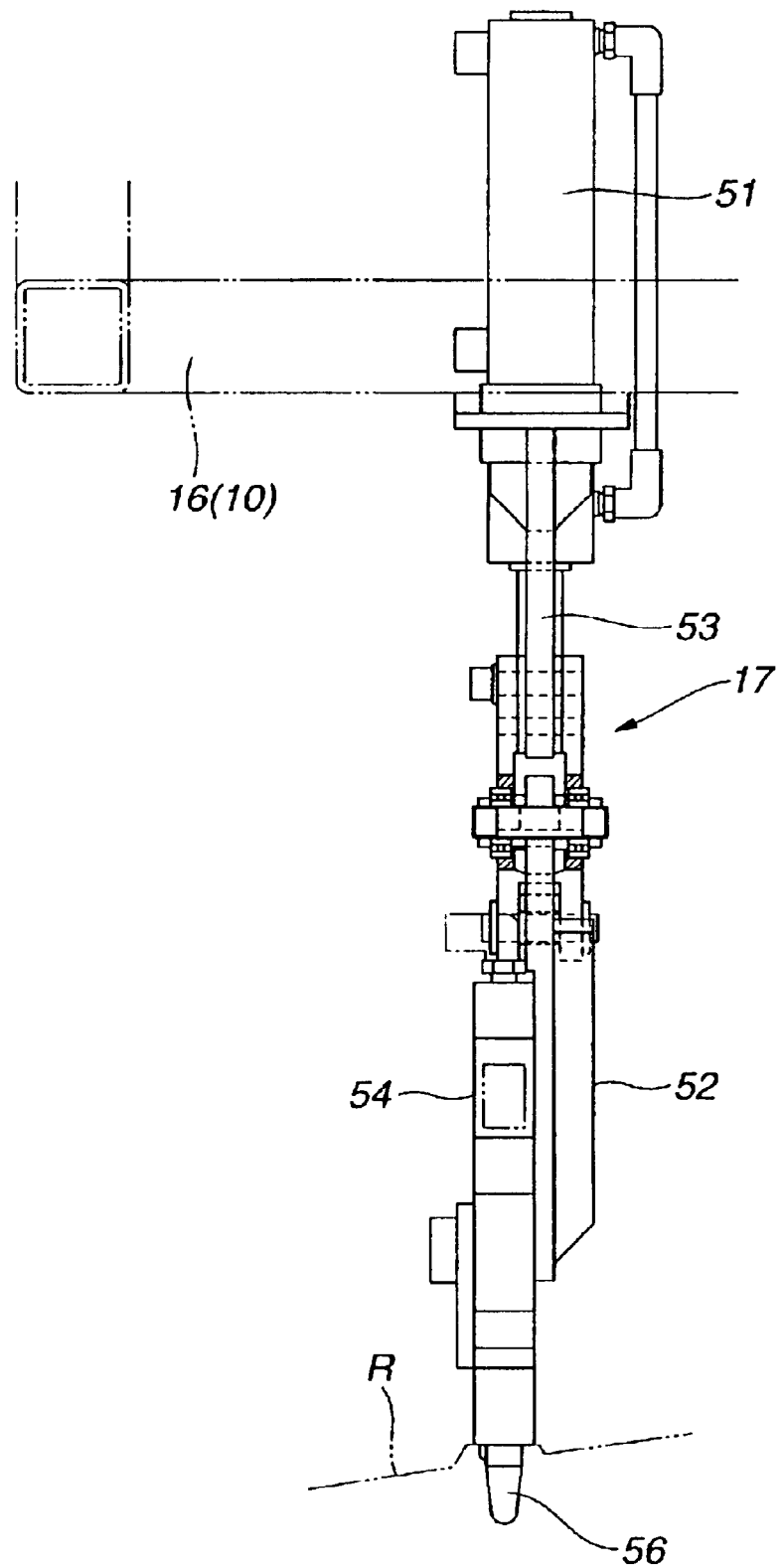
FIG. 19 is a side view of locator pin unit 17 in FIG. 18.

More specifically described as below. As is seen in FIG. 18 and FIG. 19, there is provided a bracket 53 equipped with a swing arm 52 which is swingable by means of an air cylinder 51. Swing arm 52 has a peak end fitted with a locator pin 56 having a clamp finger 55. Air cylinder 54 can allow clamping and unclamping operations of locator pin 56. When swing arm 52 moves to a position indicated by actual lines in FIG. 18, locator pin 56 is inserted into a locator hole defined in front roof rail R. Then, the clamp finger 55 can implement clamping and unclamping operations, referring to locator pin 56 which is located as reference point.

Unlike locator pin unit 17 in FIG. 18 and FIG. 19, locator pin unit 49 in FIG. 16 with no swing arm 52 is not swingable. Locator pin unit 49 is, however, the same as locator pin unit 17 in FIG. 18 and FIG. 19 in other constructive aspects, and can locate and clamp members including a roof rail reinforce, a roof reinforce center and the like.

Figure 20:
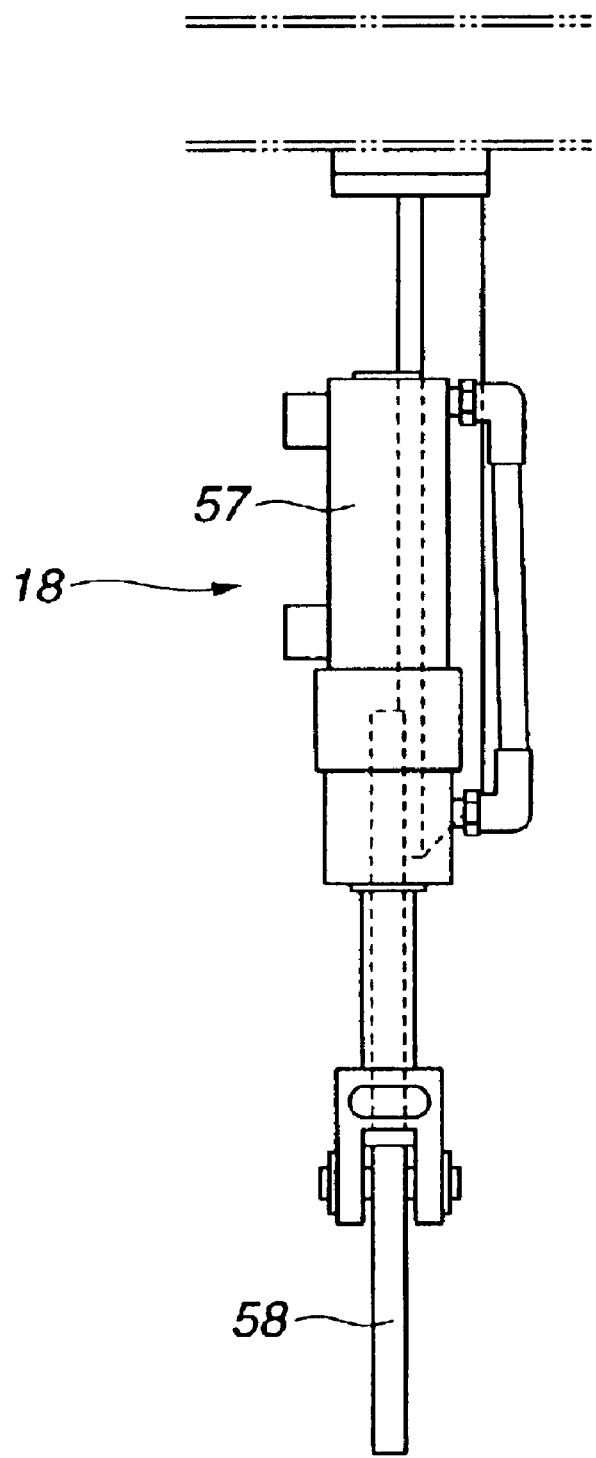
FIG. 20 is an enlarged view of a clamp device 18 shown in FIG. 16.
Figure 21:
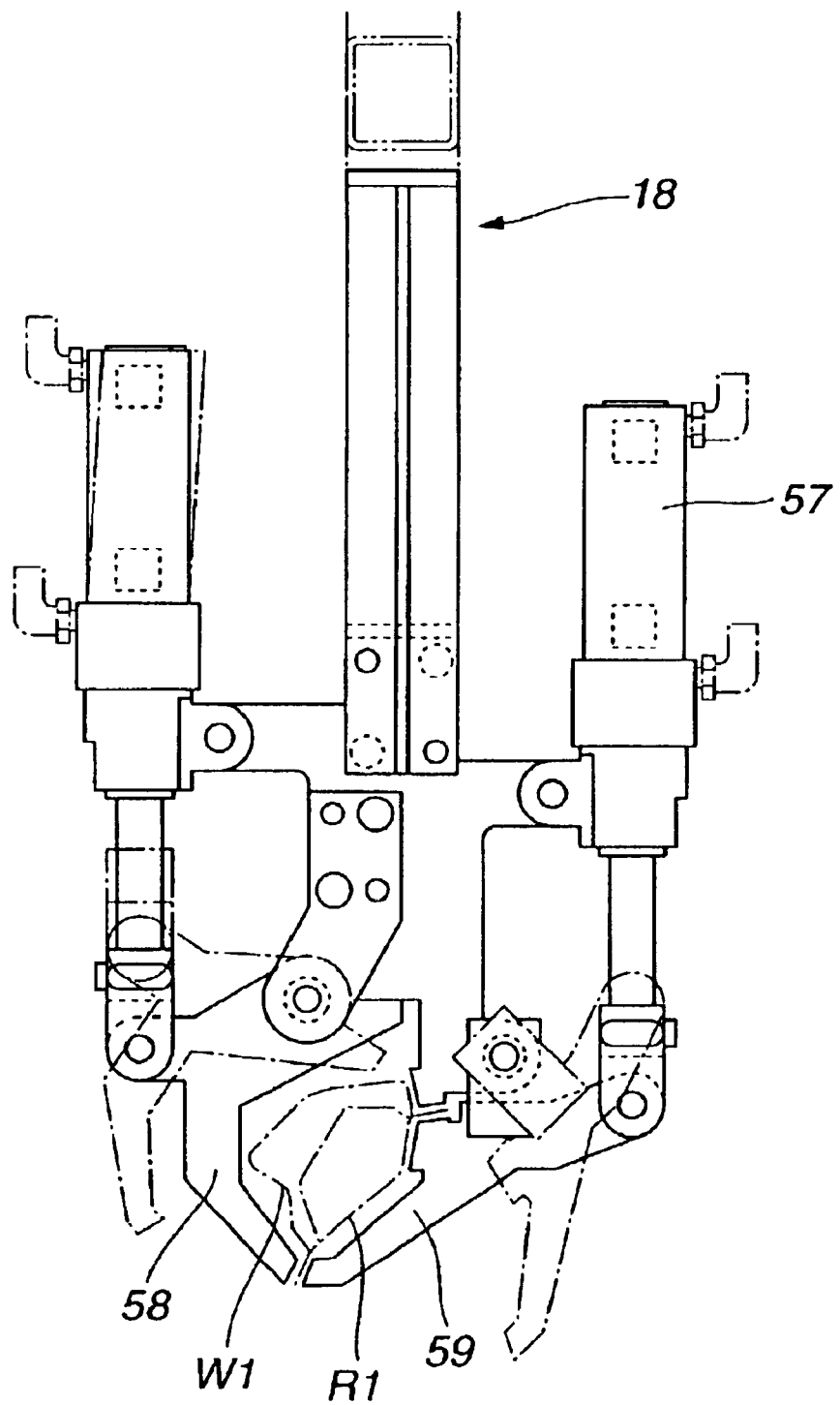
FIG. 21 is a side view of clamp device 18 shown in FIG. 20.
Figure 22:
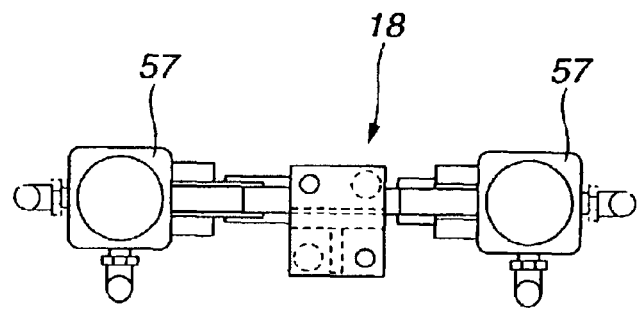
FIG. 22 is a plan view of clamp device 18 shown in FIG. 21.
Figure 23:
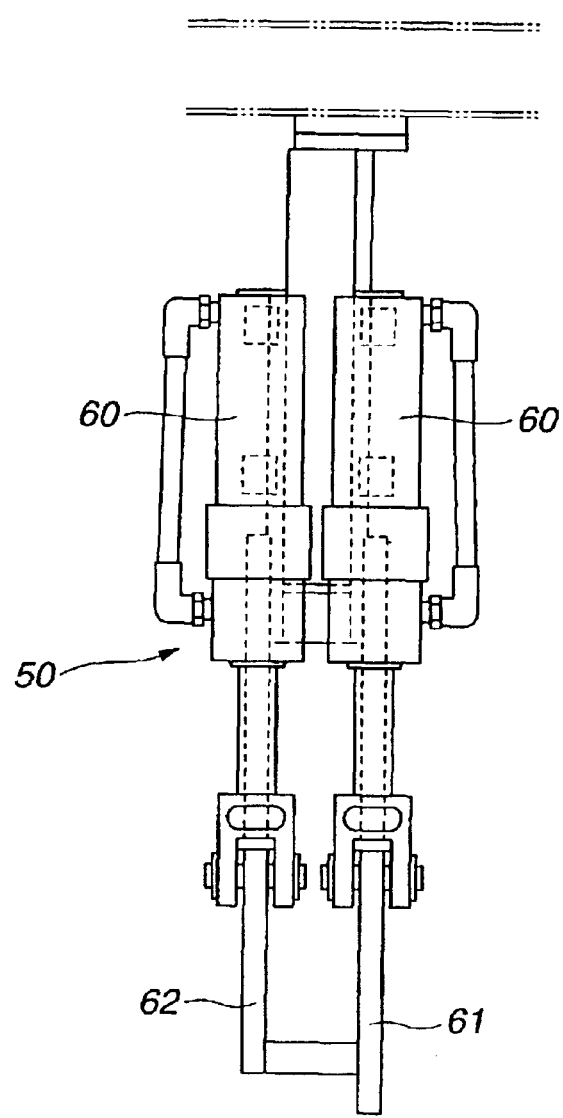
FIG. 23 is an enlarged view of another clamp device 50 shown in FIG. 16.
Figure 24:
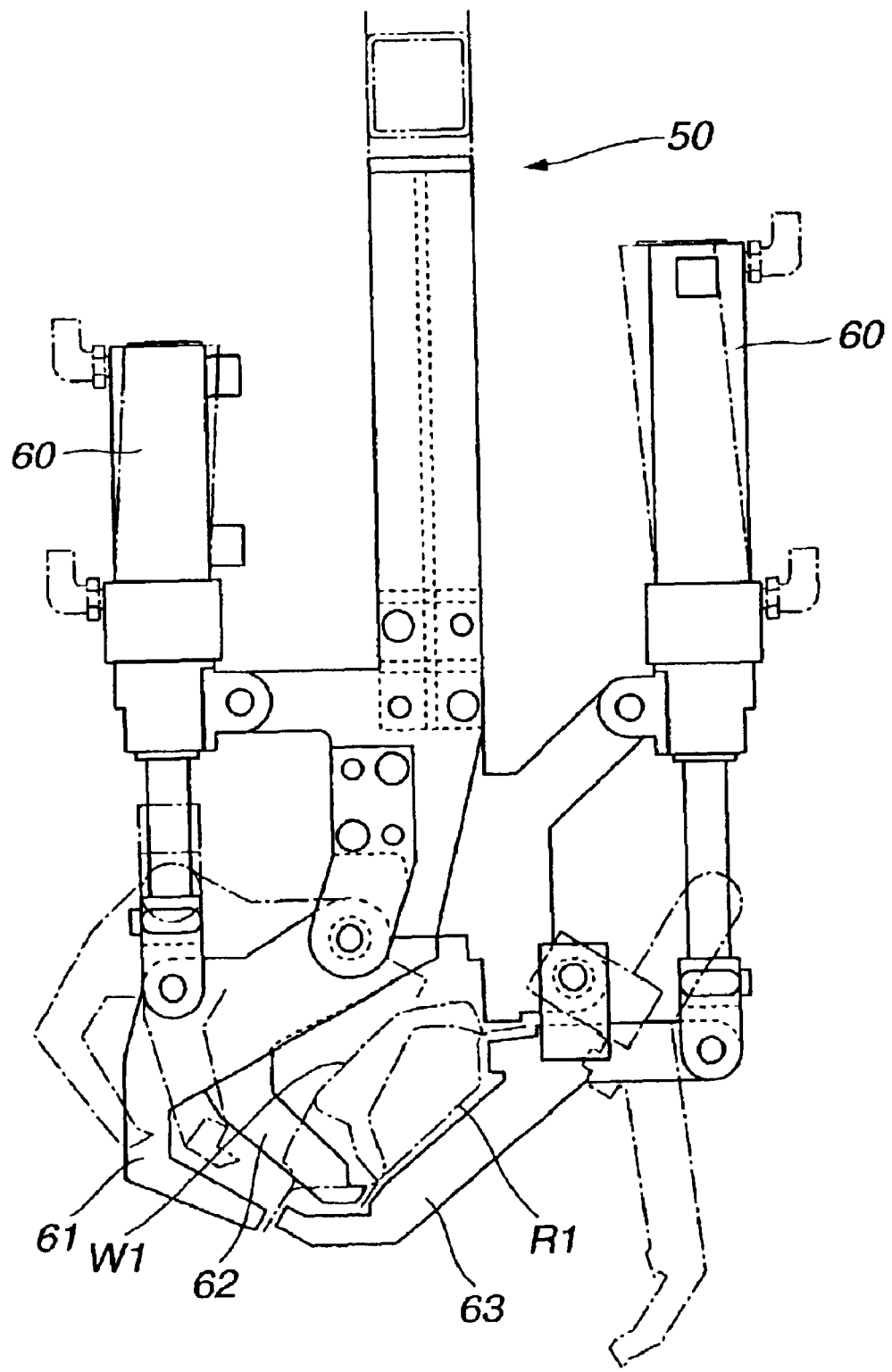
FIG. 24 is a side view of clamp device 50 shown in FIG. 23.
Figure 25:
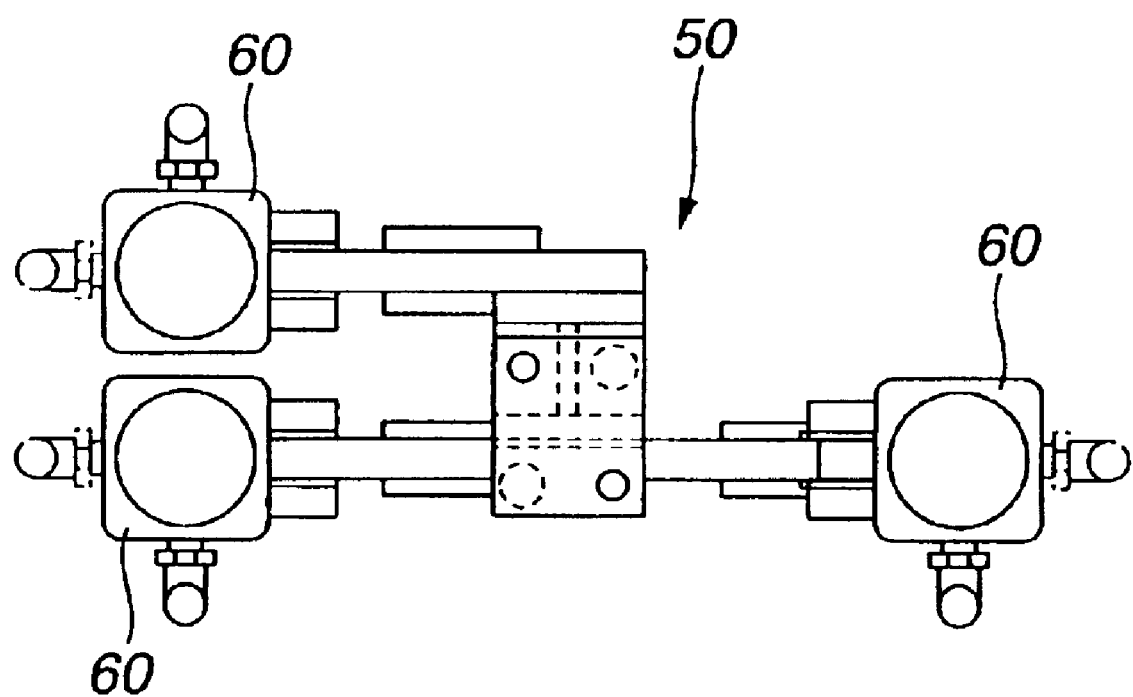
FIG. 25 is a plan view of clamp device 50 shown in FIG. 24.

On the other hand, clamp device 18 is fitted with a pair of a clamp lever 58 and a clamp lever 59 which are independent of each other, as is seen in FIG. 20 to FIG. 22. Each of clamp lever 58 and clamp lever 59 can be driven by an air cylinder 57. Clamp lever 58 and clamp lever 59 have a function of clamping, for example, a body side outer W1 and a roof side rail R1 together.

Moreover, as is seen in FIG. 16, and FIG. 17, there is provided a coupler 64 in the middle on an upper face of front jig body 16 of front body side upper section locator jig 10. Coupler 64 has a first side formed with a pair of hooks 65 having a cross section formed substantially into an alphabetical T, and a second side formed with the same pair of hooks 65. Coupler 64 is an aggregation of connectors which supply compressed air (hydraulic energy) to the air cylinders (actuator) of locator pin unit 17, locator pin unit 49, clamp device 18, clamp device 50 and the like. Coupler 64 is also an aggregation of connectors which supply electric power to various pieces of electronic equipment attached to front jig body 16 and which receive signals from various sensors.

Figure 44:
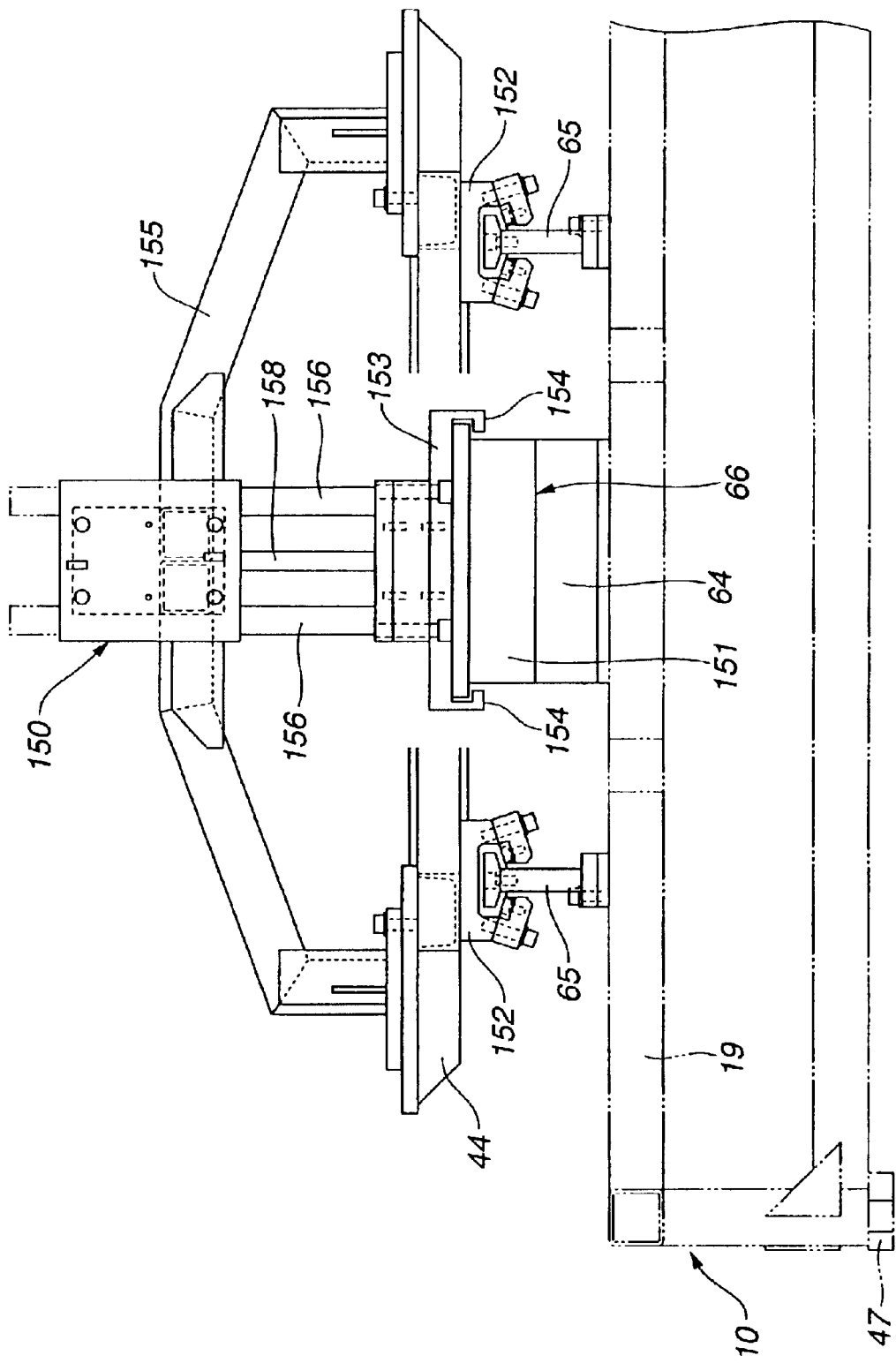
FIG. 44 is an enlarged view of essential parts of a front jig changer 44 shown in FIG. 40.

When front body side upper section locator jig 10 (to be located in operating position Q1) in soon-to-be replaced position Qn is moved from front conveyer 36 to front jig changer 44 of front lifter 13, a coupler 151 of front lifter 13 can couple with coupler 64 via a coupler mating face 66, as is seen in FIG. 44—to be described afterward.

Hook 65 acts as a mechanical connection between front body side upper section locator jig 10 and front jig changer 44 of front lifter 13, when front body side upper section locator jig 10 is conveyed to soon-to-be replaced position Qn—to be described afterward. As is seen in FIG. 16, in a period when front body side upper section locator jig 10 supported by front conveyer 36 is transferred from front standby position Q12 to soon-to-be replaced position Qn, hook 65 can autonomously mate in a hook rail 152 of front jig changer 44. Thereby, hook 65 can be guided and supported by hook rail 152.

Figure 26:
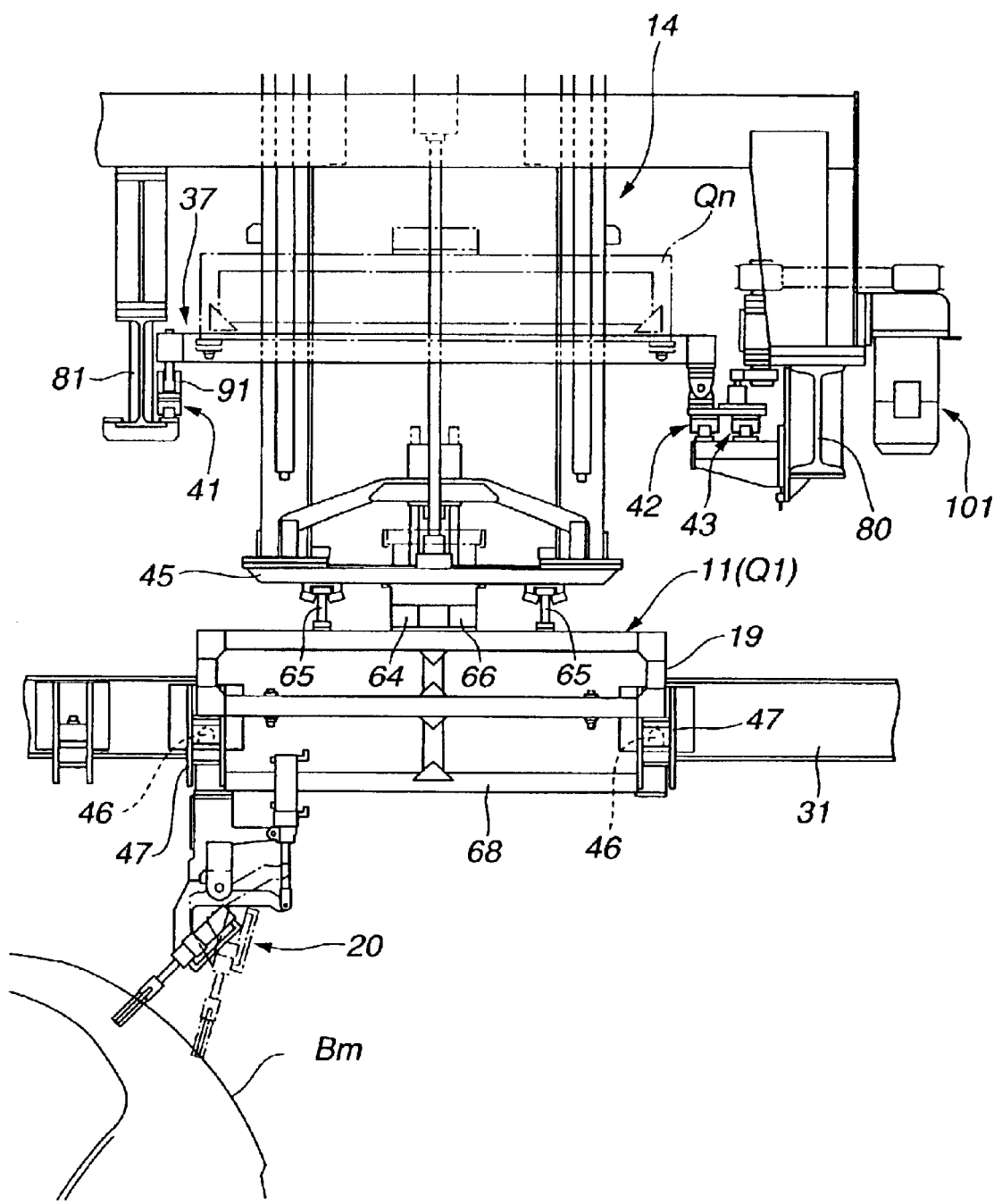
FIG. 26 is a side view of rear body side upper section locator jig 11 shown in detail.
Figure 27:
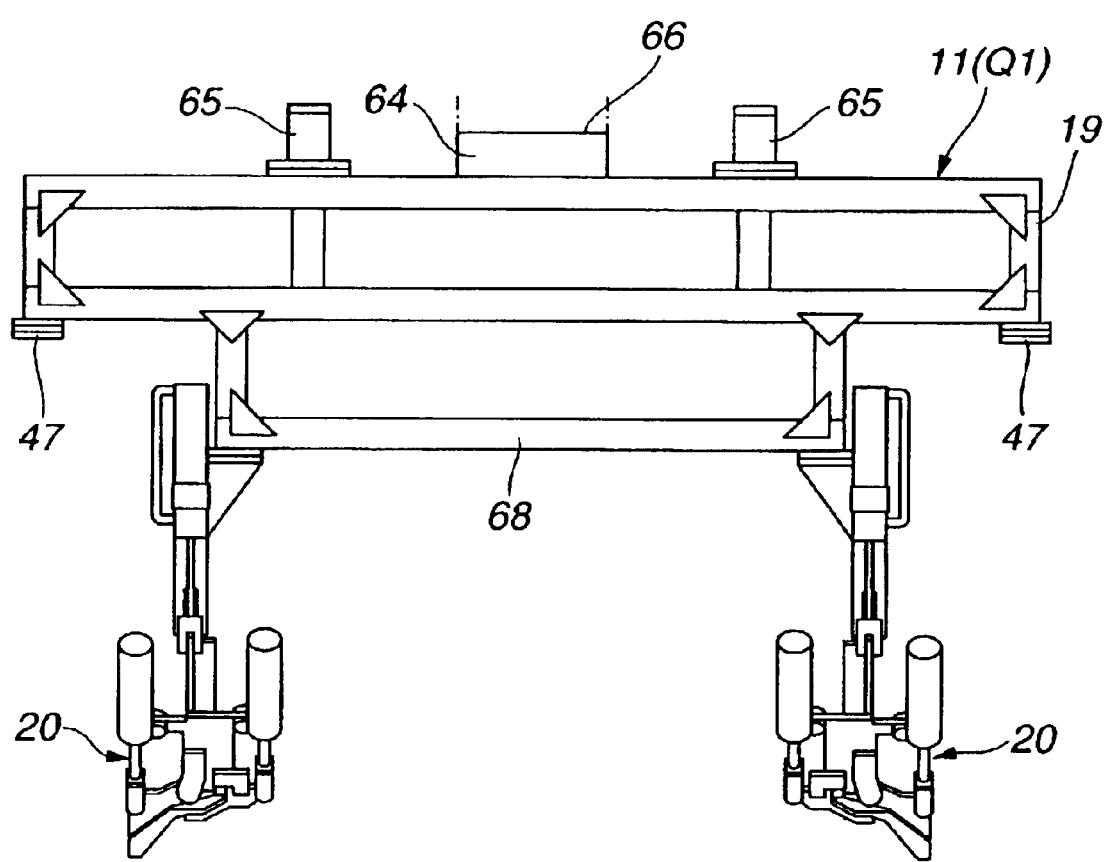
FIG. 27 is a front view of rear body side upper section locator jig 11 shown in detail.

On the other hand, fundamental construction of rear body side upper section locator jig 11 is substantially the same as that of front body side upper section locator jig 10. As is seen in FIG. 26 and FIG. 27, for example, there is provided a rear auxiliary frame 68 disposed below a rear jig body 19. A plurality of clamp devices 20 driven by an air cylinder are secured to rear auxiliary frame 68. Clamp devices 20 locate and clamp body side Bs. Moreover, clamp devices 20 make relative positioning between body side Bs and rear pillar. Rear body side upper section locator jig 11 is also provided with locator sleeve 47, coupler 64, hook 65 and the like which are the same as those of front body side upper section locator jig 10.

Figure 28:
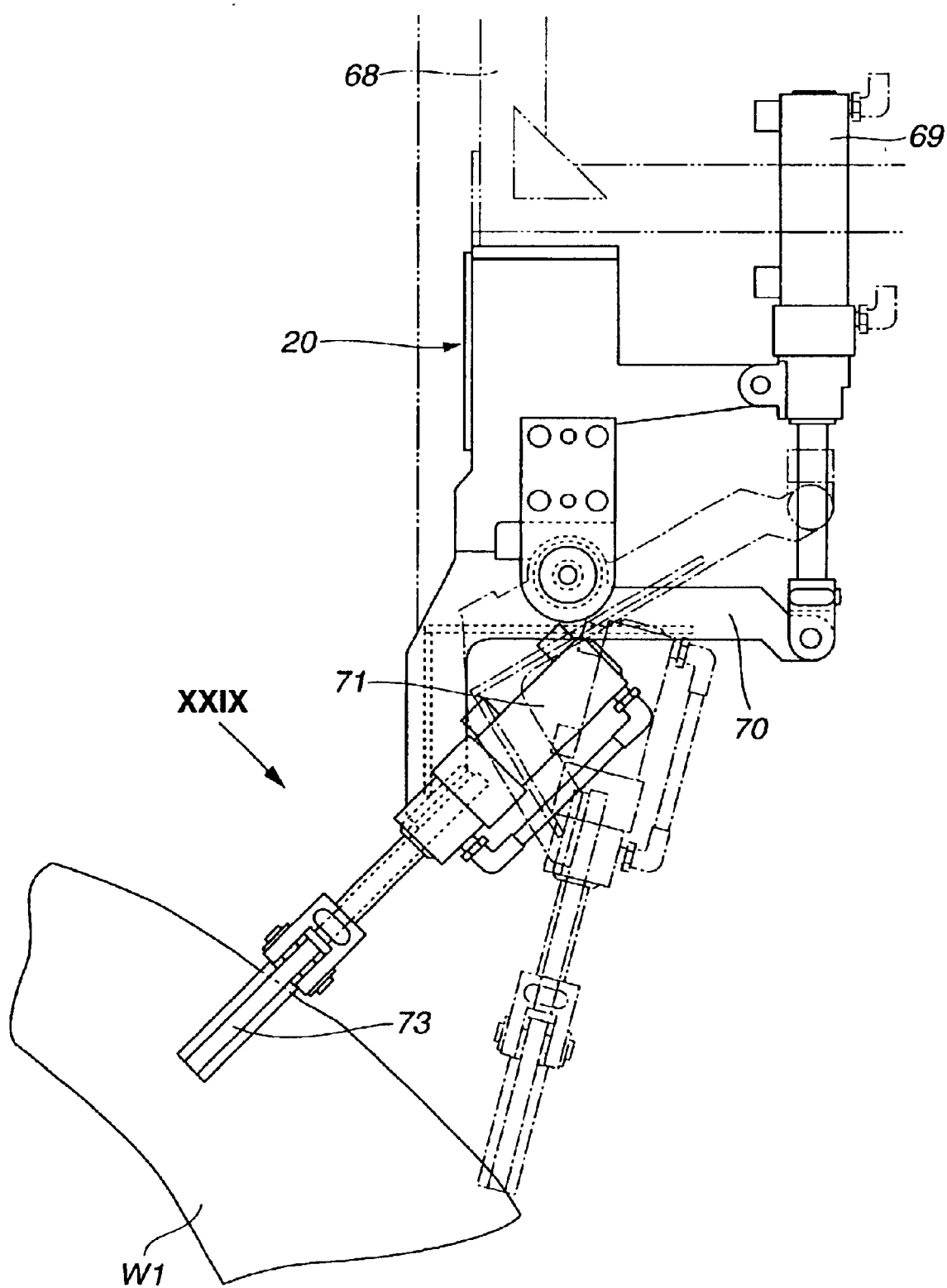
FIG. 28 is an enlarged view of a clamp device 20 shown in FIG. 26.
Figure 29:
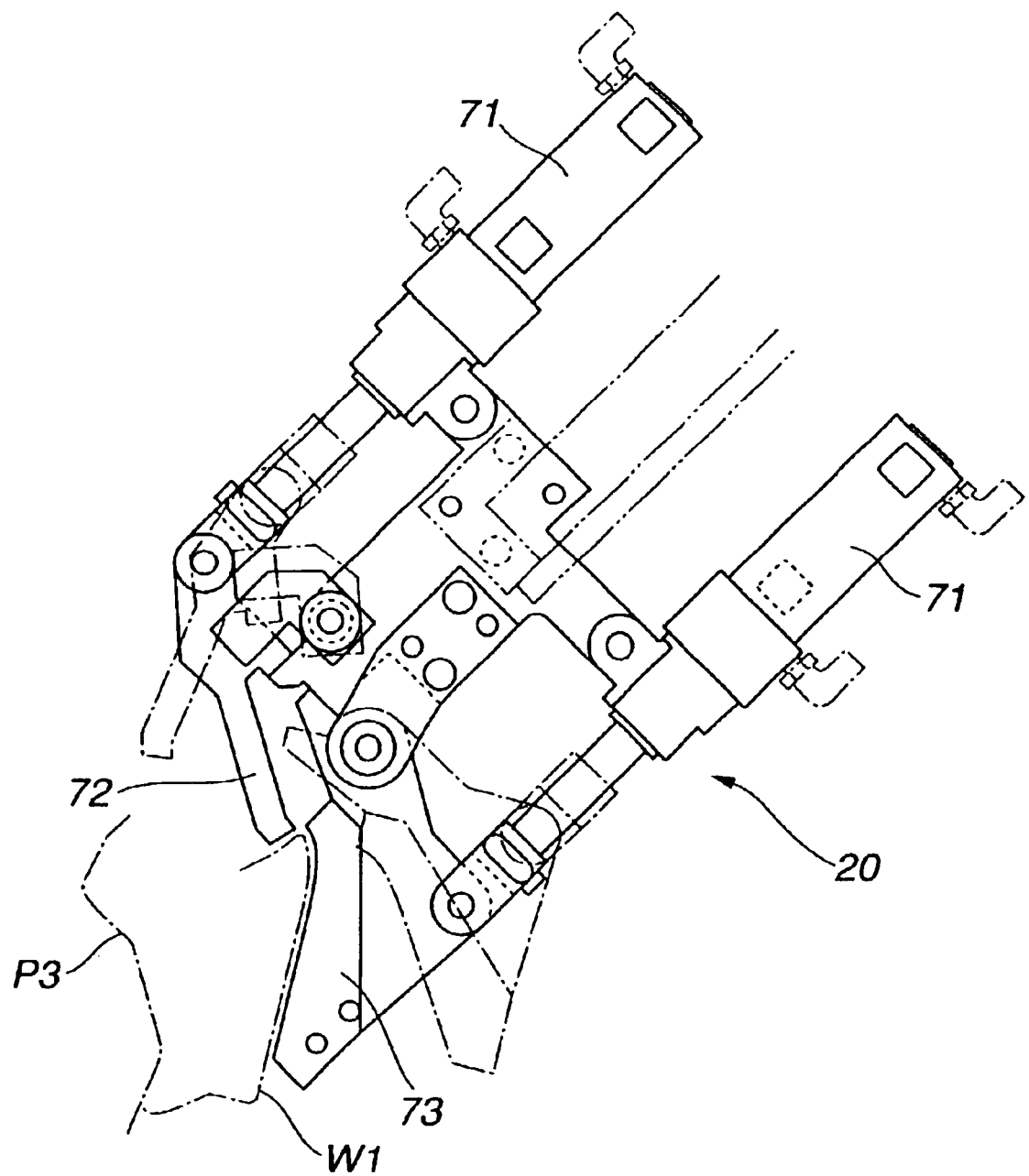
FIG. 29 shows clamp device 20 viewed in a direction XXIX in FIG. 28.
Figure 30:
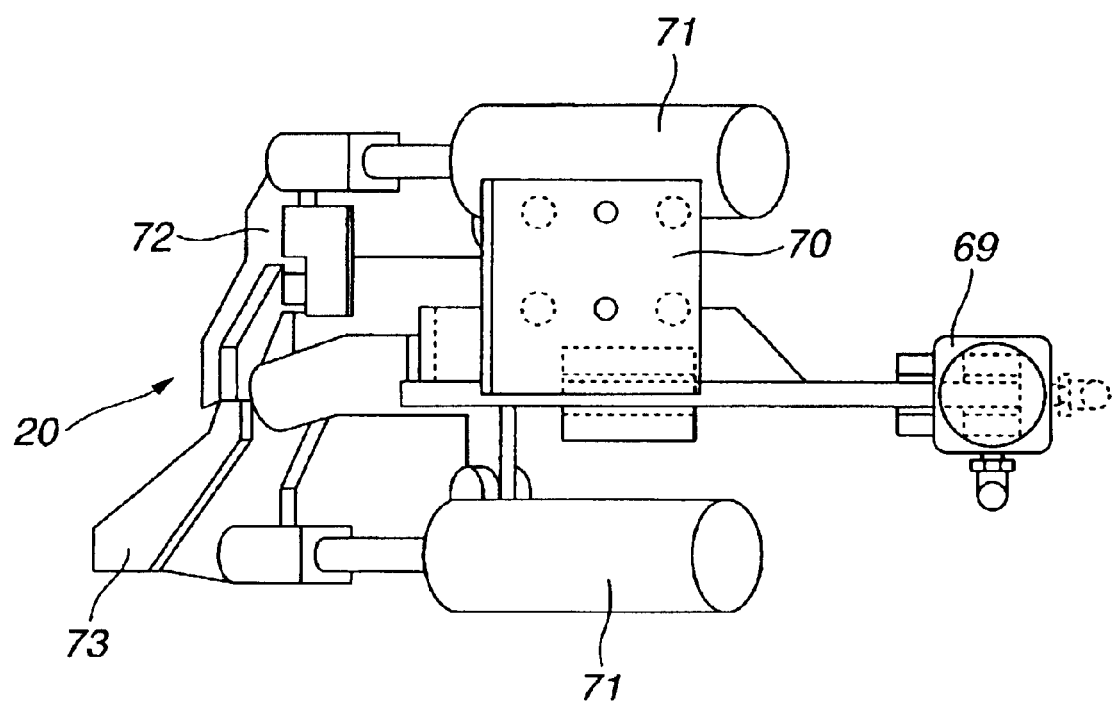
FIG. 30 is a plan view of clamp device 20 shown in FIG. 28.

As is seen in FIG. 28 to FIG. 30, clamp device 20 is fitted with a swing frame 70 swingable by means of an air cylinder 69, and a pair of a right clamp lever 72 and a left clamp lever 73 swingable respectively by means of air cylinders 71. Clamp device 20 can make a relative positioning between body side outer W1 and a rear pillar inner P3.

As is seen in FIG. 2, FIG. 3, FIG. 4 and FIG. 12, there are provided a front extended frame 21 on front side of frame 12 and a rear extended frame 22 on rear side of frame 12. Front extended frame 21 is provided with totally eight front jig receivers 23 as storage area W for storing eight types of front body side upper section locator jigs 10, as is seen in FIG. 10. Likewise, rear extended frame 22 is provided with totally eight rear jig receivers 24 as storage area W for storing eight types of rear body side upper section locator jigs 11, as is seen in FIG. 10.

In the vicinity of each of the storage areas W (namely, eight front jig receivers 23 and eight rear jig receivers 24), there are provided respectively a front jig replacing robot 25 and a rear jig replacing robot 26. Each of front jig replacing robot 25 and rear jig replacing robot 26 acts as a primary jig replacing means (one of the three jig replacing means) and is mobile sideward. Front jig replacing robot 25 has its own liberty as well as above sideward mobility, thereby replacing front body side upper section locator jig 10 between storage area W (eight front jig receivers 23) and front standby position Q12 (right or left). Likewise, rear jig replacing robot 26 has its own liberty as well as above sideward mobility, thereby replacing rear body side upper section locator jig 11 between storage area W (eight rear jig receivers 24) and rear standby position Q22 (right or left).

Hereinafter described in detail is replacement of rear body side upper section locator jig 11. The storage position of each of eight rear body side upper section locator jigs 11 is predetermined (numbered) by the number of the one of the eight rear jig receivers 24. When rear body side upper section locator jig 11 for one vehicle type is disposed in operating position Q1, one of eight rear jig receivers 24 (rear storage area W) is left vacant. Moreover, in the state described in the former sentence, rear body side upper section locator jig 11 is absent from soon-to-be replaced position Qn and rear standby positions Q22 (right and left), although rear conveyer 37 is positioned in such a manner as to stride over operating position Q1 and one rear standby position Q22 (either right or left).

More specifically described as below: "One" of the pair of right carriage frame 34 and left carriage frame 34 (constituting rear conveyer 37) that was previously responsible for carrying rear body side upper section locator jig 11 disposed in operating position Q1 still stands by in soon-to-be replaced position Qn. Therefore, the "other" of the pair of right carriage frame 34 and left carriage frame 34 is assuredly located in one of rear standby position Q22 (right side of soon-to-be replaced position Qn) and rear standby position Q22 (left side of soon-to-be replaced position Qn).

As described above, rear conveyer 37 constituted of the pair of carriage frames 34 makes the repeated round trips in stroke St (see FIG. 15). Therefore, a control system can determine in advance which of rear standby position Q22 (right side of soon-to-be replaced position Qn) and rear standby position Q22 (left side of soon-to-be replaced position Qn) is prepared for the "other (see former paragraph)" of the pair of carriage frames 34 when the "one (see former paragraph)" of carriage frames 34 is standing by in soon-to-be replaced position Qn.

Then, an upper-level production instructor gives instruction to rear jig replacing robot 26 of information on vehicle type of body main Bm which is subjected to the next pre-tack welding operation S. Then, rear jig replacing robot 26 can select one of rear body side upper section locator jigs 11 stored in the storage area (rear jig receivers 24). Then, rear jig replacing robot 26 transfers thus selected rear body side upper section locator jig 11 to carriage frame 34 that is disposed in one of rear standby position Q22 (right side of soon-to-be replaced position Qn) and rear standby position Q22 (left side of soon-to-be replaced position Qn).

Thereafter, when pre-tack welding of body main Bm (which is at present subjected to body main pre-tack welding operation S) is completed, rear lifter 14 may lift up rear body side upper section locator jig 11 which so far operated in operation position Q1. Then, rear lifter 14 may put rear body side upper section locator jig 11 on the carriage frame 34 that is standing by in soon-to be replaced position Qn, and may locate and support rear body side upper section locator jig 11 in soon-to be replaced position Qn. Herein, rear body side upper section locator jig 11 thus transferred to carriage frame 34 is, at this point in time, still (also) carried by rear jig changer 45 of rear lifter 14. In sum, one of carriage frames 34 of rear conveyer 37 carries 'used' rear body side upper section locator jig 11 while the other of carriage frames 34 of rear conveyer 37 carries 'to-be-used' rear body side upper section locator jig 11. Rear lifter 14 is to be described in detail afterward.

When rear conveyer 37 moves to one of rear standby position Q22 (right side of soon-to-be replaced position Qn) and rear standby position Q22 (left side of soon-to-be replaced position Qn) whichever is vacant, the above 'used' rear body side upper section locator jig 11 can be autonomously released from rear jig changer 45 of rear lifter 14 in accordance with the movement of rear conveyer 37. In place of the 'used' rear body side upper section locator jig 11, the above 'to-be-used' rear body side upper section locator jig 11 can autonomously and mechanically engage with rear jig changer 45 of rear lifter 14.

With this, the 'used' rear body side upper section locator jig 11 which was so far in soon-to-be replaced position Qn can be ejected to one of rear standby position Q22 (right side of soon-to-be replaced position Qn) and rear standby position Q22 (left side of soon-to-be replaced position Qn), while the 'to-be-used' rear body side upper section locator jig 11 which so far kept standing by in the other of rear standby position Q22 (right side of soon-to-be replaced position Qn) and rear standby position Q22 (left side of soon-to-be replaced position Qn) can be conveyed to and positioned in soon-to-be replaced position Qn. Thus conveyed and positioned fresh ('to-be-used') rear body side upper section locator jig 11 is moved from soon-to-be replaced position Qn down to operating position Q1.

With rear body side upper section locator jig 11 thus replaced, the routine conveys the next type of body main Bm to the site for body main pre-tack welding operation S. Then, positioning operation can soon be started for the thus conveyed next type of body main Bm. Simultaneously with this (or in parallel with the above positioning operation), rear jig replacing robot 26 may return the 'used' rear body side upper section locator jig 11 (which is standing by in rear standby position Q22) to rear jig receiver 24 (storage area W). Basically, the above jig replacing operation of rear body side upper section locator jig 11 can be carried out likewise for front body side upper section locator jig 10.

Herein, front body side upper section locator jig 10 and rear body side upper section locator jig 11 are independent of each other for the following causes:

The upper side of body side Bs (including roof section) is likely to show a great variation in shape with difference in vehicle type. More specifically, it is a variation in panel configuration in molding. The upper side of body side Bs is, therefore, required of great flexibility. Taking sedan for example as a "basic" vehicle type, coupe and wagon can be regarded as "derivatives" of sedan. Making a comparison between the sedan, coupe and wagon, a front side of the upper side (including the roof section) of body side Bs is has comparatively a little likelihood to vary in shape, while a rear side of the upper side of body side Bs is likely to vary in shape due to above "basic-to-derivative" difference. Positioning the upper side of body side Bs with only a single jig will, therefore, involve entire jig replacement for the vehicle type change.

According to the embodiment of the present invention, a maximum of eight types of front body side upper section locator jigs 10 and a maximum of eight types of rear body side upper section locator jigs 11 can be stored. Front body side upper section locator jig 10 is, however, commonly used for various vehicle types, as described above. Generally, front body side upper section locator jig 10 can be smaller in number than rear body side upper section locator jig 11, for working sufficiently for a mixed production.

Hereinafter described are detailed constructions of front carriage slider 32, rear carriage slider 33, front conveyer 36, rear conveyer 37, front lifter 13, rear lifter 14 and the like which constitute basic components of the apparatus of assembling the vehicular body.

As is seen in FIG. 11, FIG. 14 and FIG. 15, frame 12 used for body main pre-tack welding operation S is fitted with three beams, that is, a beam 80, a beam 81, a beam 82 which are in parallel with each other and extend in a sideward direction (substantially orthogonal to a direction of conveying body main Bm) of body main Bm to be assembled. Linear motion bearing 38 and linear motion bearing 39 extend long and are laid on beam 80, linear motion bearing 40 and linear motion bearing 41 extend long and are laid on beam 81, linear motion bearing 42, and linear motion bearing 43 extend long and are laid on beam 82. As is seen in FIG. 14, front beams including linear motion bearing 38, linear motion bearing 39 and linear motion bearing 40 function as a slide guide of front conveyer 36 for front body side upper section locator jig 10, while rear beams including linear motion bearing 41, linear motion bearing 42 and linear motion bearing 43 function as a slide guide of rear conveyer 37 for rear body side upper section locator jig 11. FIG. 14 shows a basic construction having a lateral symmetry, and therefore parts and sections substantially the same are denoted by the same numerals in right and left.

Figure 33:
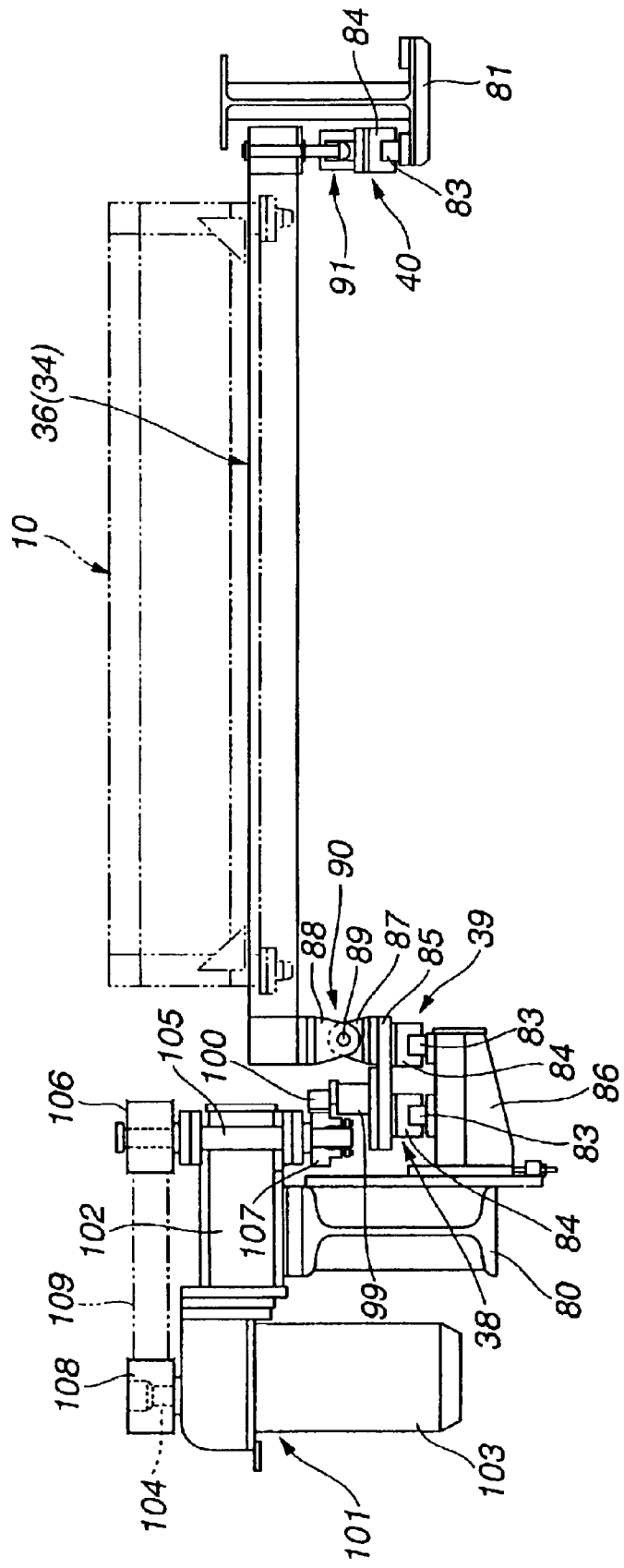
FIG. 33 is an enlarged view of a cross section taken along lines XXXIII—XXXIII in FIG. 31.

As is seen in FIG. 33 (and assumed from FIG. 33), each of linear motion bearing 38, linear motion bearing 39 and linear motion bearing 40 (and, linear motion bearing 41, linear motion bearing 42 and linear motion bearing 43) is constituted of a long guide rail 83 (guide way) and a slider 84. Guide rails 83 are fixed to respective beam 80, beam 81 and beam 82 each of which has a cross section shaped substantially into an alphabetical I. Slider 84 is slidably guided by guide rail 83. Slider 84 of each of linear motion bearing 38, linear motion bearing 39 and linear motion bearing 40 (front side) can couple with front conveyer 36 (carriage frame 34), while slider 84 of each of linear motion bearing 41, linear motion bearing 42 and linear motion bearing 43 (rear side) can couple with rear conveyer 37 (carriage frame 34). Two middle linear motion bearings, that is, linear motion bearing 40 and linear motion bearing 41 are independent of each other. More specifically, linear motion bearing 40 is for front conveyer 36, while linear motion bearing 41 is for rear conveyer 37. Contrary to the independence of the two middle linear motion bearings, two front linear motion bearings act as an integrated member, while two rear linear motion bearings act as an integrated member. More specifically, as is seen in FIG. 33, slider 84 of linear motion bearing 38 couples with slider 84 of linear motion bearing 39 by way of a coupler plate 85, while as can be assumed from FIG. 33, slider 84 of linear motion bearing 42 couples with slider 84 of linear motion bearing 43 by way of coupler plate 85.

Figure 31:
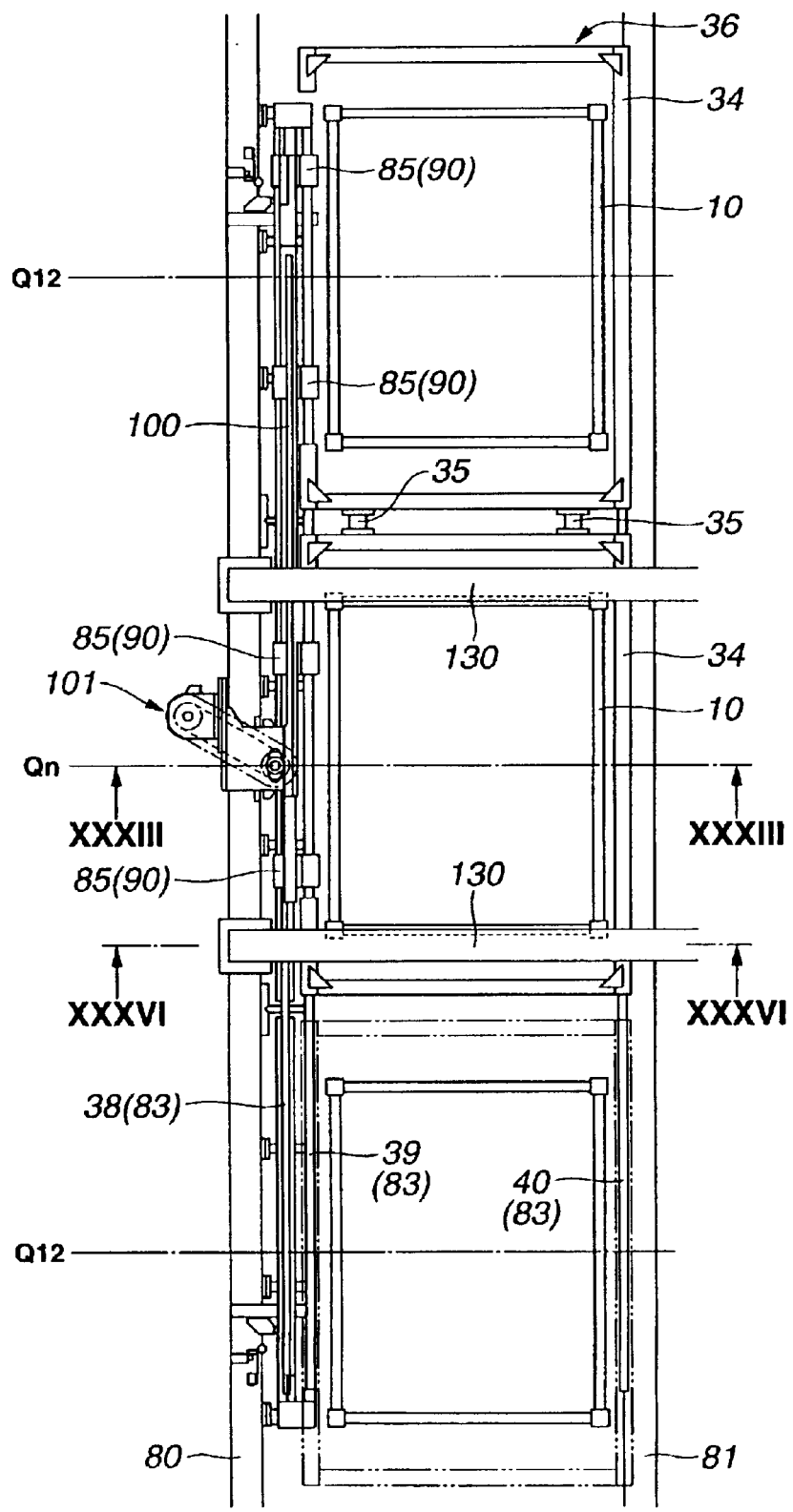
FIG. 31 is an enlarged view of essential parts in FIG. 14.
Figure 32:
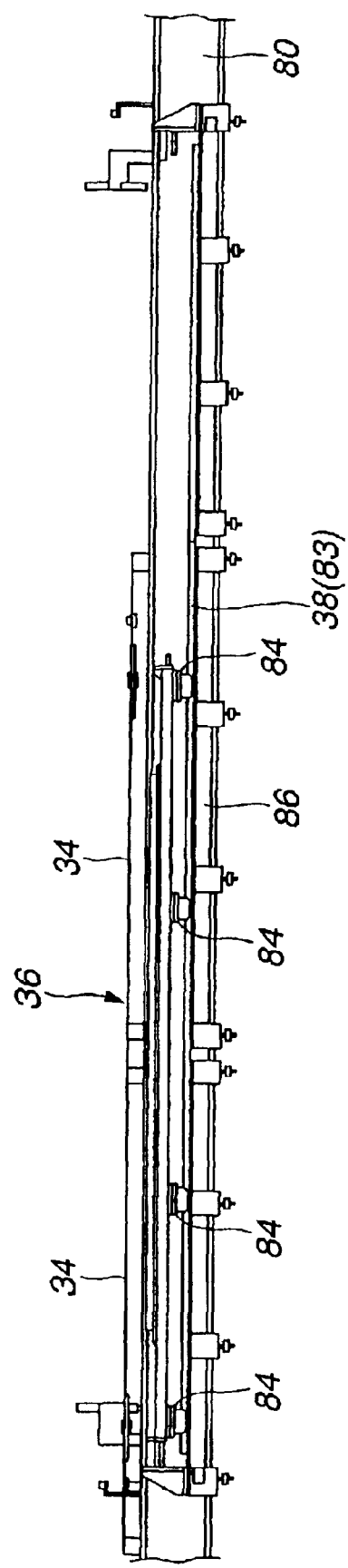
FIG. 32 is a left side view of FIG. 31.

Shown in detail in FIG. 31 to FIG. 33 is front conveyer 36 in FIG. 14 to FIG. 15. An auxiliary rail 86 is fixed to a side section of beam 80. Fixed on auxiliary rail 86 are guide rails 83 of respective two front linear motion bearings, that is, linear motion bearing 38 and linear motion bearing 39. In FIG. 33, there is provided a plurality of hinges 90 interposed between coupler plate 85 (coupling sliders 84 of respective linear motion bearing 38 and linear motion bearing 39) and a front end of carriage frame 34. Hinge 90 has a hinge pin 89 which is arranged in parallel with a direction of front conveyer 36's travel, and couples a pair of a hinge bracket 87 and a hinge bracket 88. Hinge bracket 87 couples with coupler plate 85, while hinge bracket 88 couples with carriage frame 34 on front conveyer 36. With the construction described above, front conveyer 36 can be slidably guided by three linear motion bearings, that is, linear motion bearing 38, linear motion bearing 39 and linear motion bearing 40, and thereby front conveyer 36 is pivotal or swingable around hinge pin 89.

Figure 34:
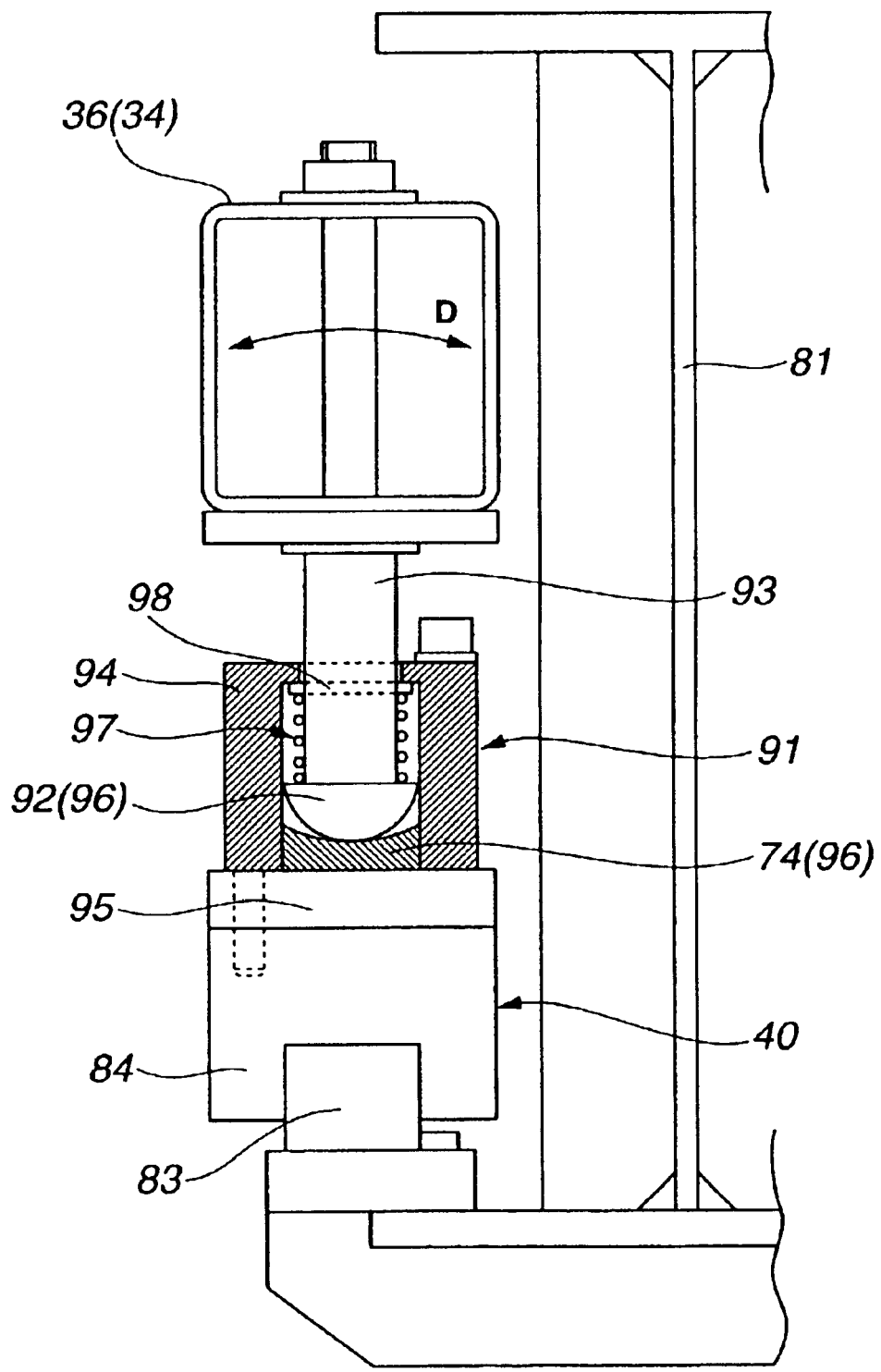
FIG. 34 is an enlarged view of a cross section of a floating mechanism 91 in FIG. 33.
Figure 35:
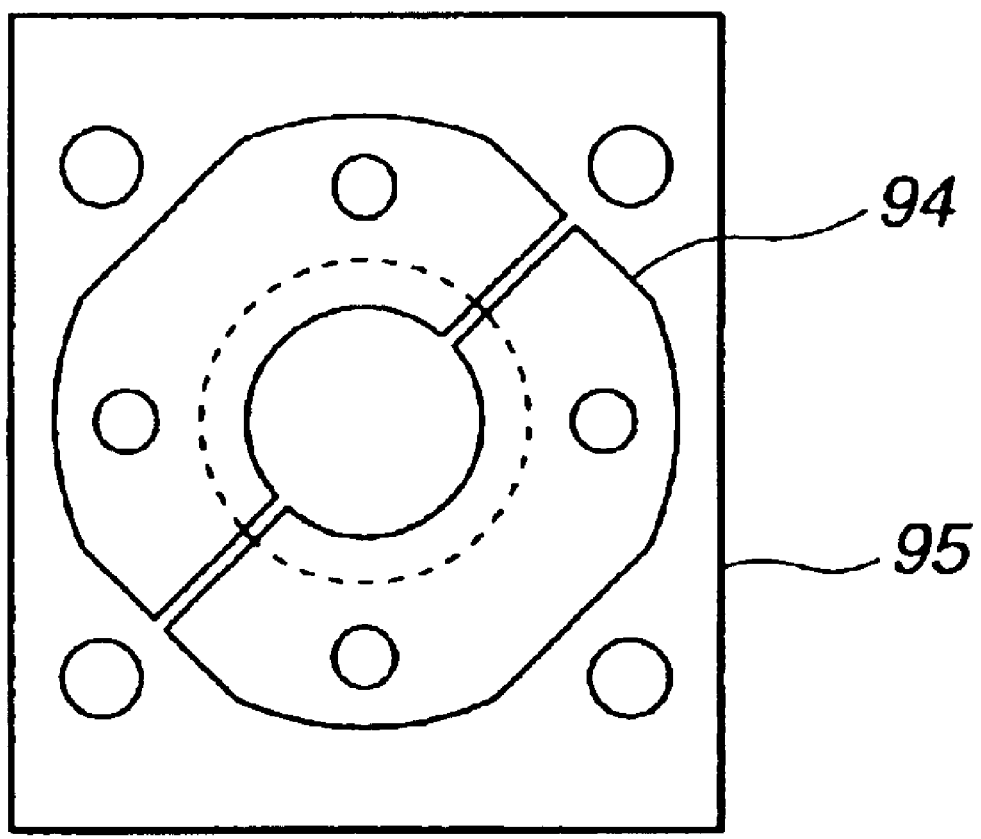
FIG. 35 is a plan view of a base plate 95 (a holder 94) in FIG. 34.

On the other hand, there is provided a floating mechanism 91 interposed between linear motion bearing 40 (rear side in FIG. 33) and rear end of front conveyer 36 (carriage frame 34). As is seen in FIG. 34 and FIG. 35, floating mechanism 91 has a pin 93 defining an end formed with a substantially hemispherical section 92. Pin 93 protrudes downward from carriage frame 34. Moreover, a holder 94 receiving hemispherical section 92 with clearance is fixed to slider 84 of linear motion bearing 40 together with base plate 95. As is seen in FIG. 35, holder 94 is divided into two halves. Inside holder 94, there is provided a concave spherical plate 74 abutting spherically on hemispherical section 92, to thereby form a spherical bearing 96. Also inside holder 94, there are provided a compression coil spring 97 and a washer 98. Compression coil spring 97 biases pin 93 downward, to thereby press hemispherical section 92 to spherical plate 74.

With the construction described above, pin 93 can be elastically sustained in such a manner as to move upward and downward relative to slider 84 of linear motion bearing 40. In addition, pin 93 can be inclined and swingable, as indicated by an arrow D in FIG. 34. As a result, entire part of front conveyer 36 can be displaceable upward and downward at least on linear motion bearing 40's side, and simultaneously with this, is pivotal or swingable around hinge pin 89, thus causing a floating state (floatability) where the entire part of front conveyer 36 is swingable on a flat face substantially orthogonal to the direction of front conveyer 36's travel. Hereinabove, compression coil spring 97 in holder 94 can also act as a return spring for returning pin 93 to its neutral position autonomously, in addition to the floatability brought about as described above.

As is seen in FIG. 33, by way of an auxiliary beam 99, there is provided a rack 100 fixed on coupler plate 85 and extending in the direction of front conveyer 36's travel. Auxiliary beam 99 also extends in the direction of front conveyer 36's travel. In the vicinity of rack 100, there is provided a travel drive mechanism 101 (for driving front conveyer 36) on beam 80. Travel drive mechanism 101 has such a construction that an upright drive motor 103 which is rotatable forward and reward is mounted on a bracket 102 on beam 80. A follower shaft 105 in parallel with a motor revolution shaft 104 is born by bracket 102. Moreover, at an upper end of follower shaft 105, there is provided a driven pulley 106; while at a lower end of follower shaft 105, there is provided a pinion 107 meshing with rack 100. Moreover, motor revolution shaft 104 is fitted with a drive pulley 108. A timing belt 109 winds in an area between drive pulley 108 and driven pulley 106. Driving drive motor 103 allows pinion 107 to rotate in its given position. Rack 100 meshing with thus rotated pinion 107 can move front conveyer 36 in predetermined stroke St.

Hereinabove, linear motion bearing 38, linear motion bearing 39 and linear motion bearing 40 of front conveyer 36 are basically the same in construction as their counterparts of rear conveyer 37 in FIG. 14 and FIG. 15. Also the same in construction include front conveyer 36 itself, travel drive mechanism 101 and the like.

Described below is the reason why linear motion bearing 38, linear motion bearing 39, linear motion bearing 40, linear motion bearing 41, linear motion bearing 42 and linear motion bearing 43 (referred to as LM guide [branded by Japanese manufacturer THK CO., LTD, where LM stands for "linear motion"], linear guide and the like for commercial use) described above are used as a slide guide mechanism, despite comparatively long stroke St of each of front conveyer 36 and rear conveyer 37.

Each of linear motion bearing 38, linear motion bearing 39, linear motion bearing 40, linear motion bearing 41, linear motion bearing 42 and linear motion bearing 43 itself is a guide mechanism having a ball or a roll for guiding an object making a linear travel. The above construction of the linear motion bearings can reduce noise or vibration to a minimum (which may be caused during travel of front conveyer 36 and rear conveyer 37), lower frictional force and prevent stick slip, thereby bringing about advantages such as accurate positioning in a stationary position.

On the other hand, the above apparatus of assembling vehicular body has a special feature in terms of construction as described below:

Travel direction of front conveyer 36 and rear conveyer 37 intersecting with upward-and-downward direction of front lifter 13 and rear lifter 14 allows beam 80, beam 81 and beam 82 (for carrying respective two linear motion bearings, that is linear motion bearing 38 and linear motion bearing 39, linear motion bearing 40 and linear motion bearing 41, and linear motion bearing 42 and linear motion bearing 43) to be free from any coupling, excluding those defined at lengthwise two ends thereof (upper end and lower end in FIG. 14). Taking front conveyer 36 for example, guide rails 83 (sliders 84) of respective two front linear motion bearings (linear motion bearing 38 and linear motion bearing 39) and guide rail 83 (slider 84) of one rear linear motion bearing (linear motion bearing 40) are not coupled at all, thus forming a complete opening, as is seen in FIG. 33. With the thus formed complete opening, relative positioning between the two front direct bearings (linear motion bearing 38 and linear motion bearing 39) and the one rear direct bearing (linear motion bearing 40) may not necessarily be accurate in terms of parallelism, flatness and the like. However, such relative positioning (inaccurate and erroneous) between the two front direct bearings (linear motion bearing 38 and/or linear motion bearing 39) and the one rear direct bearing (linear motion bearing 40) can be absorbed by the floating mechanism of front conveyer 36 itself relative to the two front direct bearings (linear motion bearing 38 and linear motion bearing 39) and the one rear direct bearing (linear motion bearing 40), to thereby secure travel stability of front conveyer 36.

Figure 36:
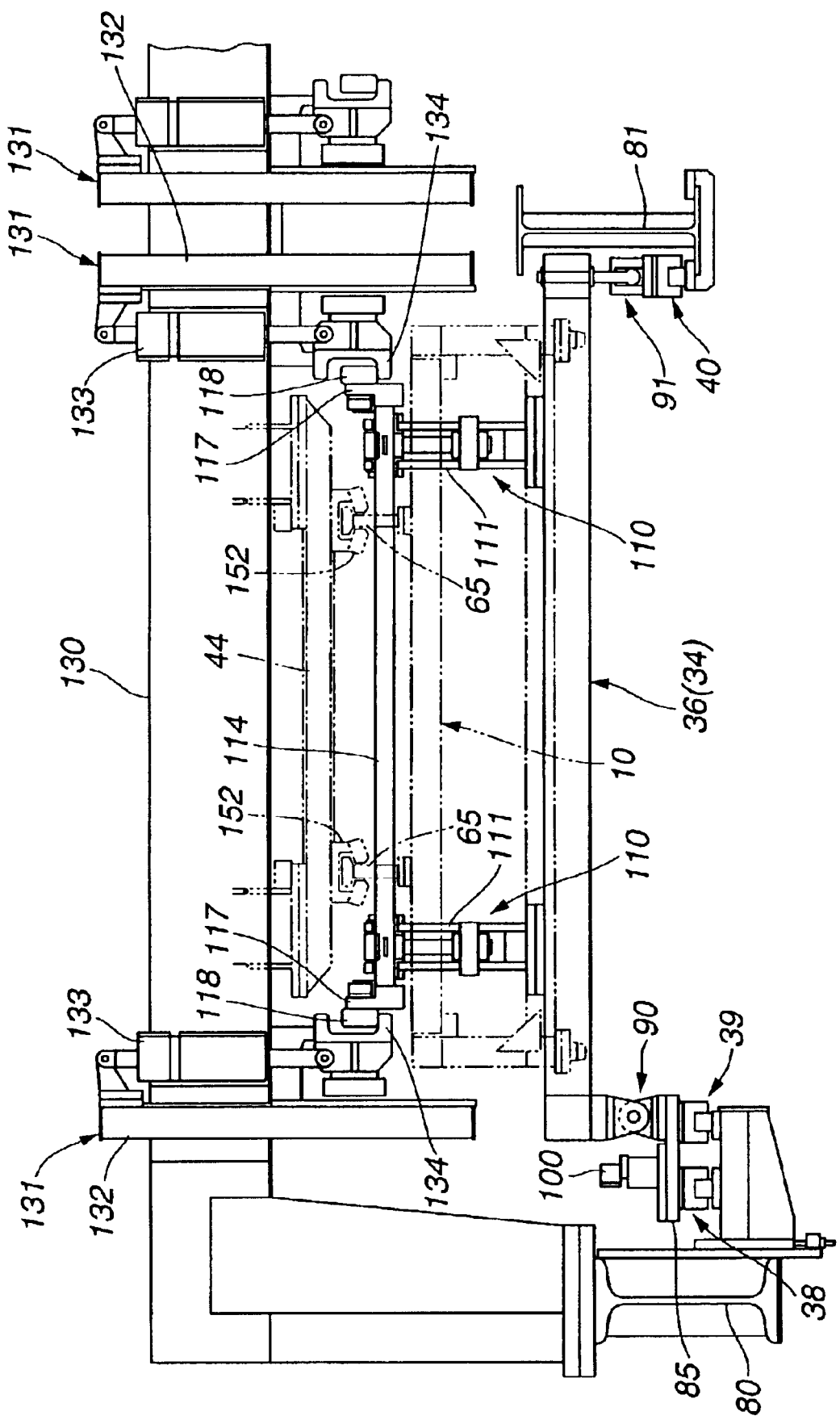
FIG. 36 is an enlarged view of a cross section taken along lines XXXVI—XXXVI in FIG. 31.
Figure 37:
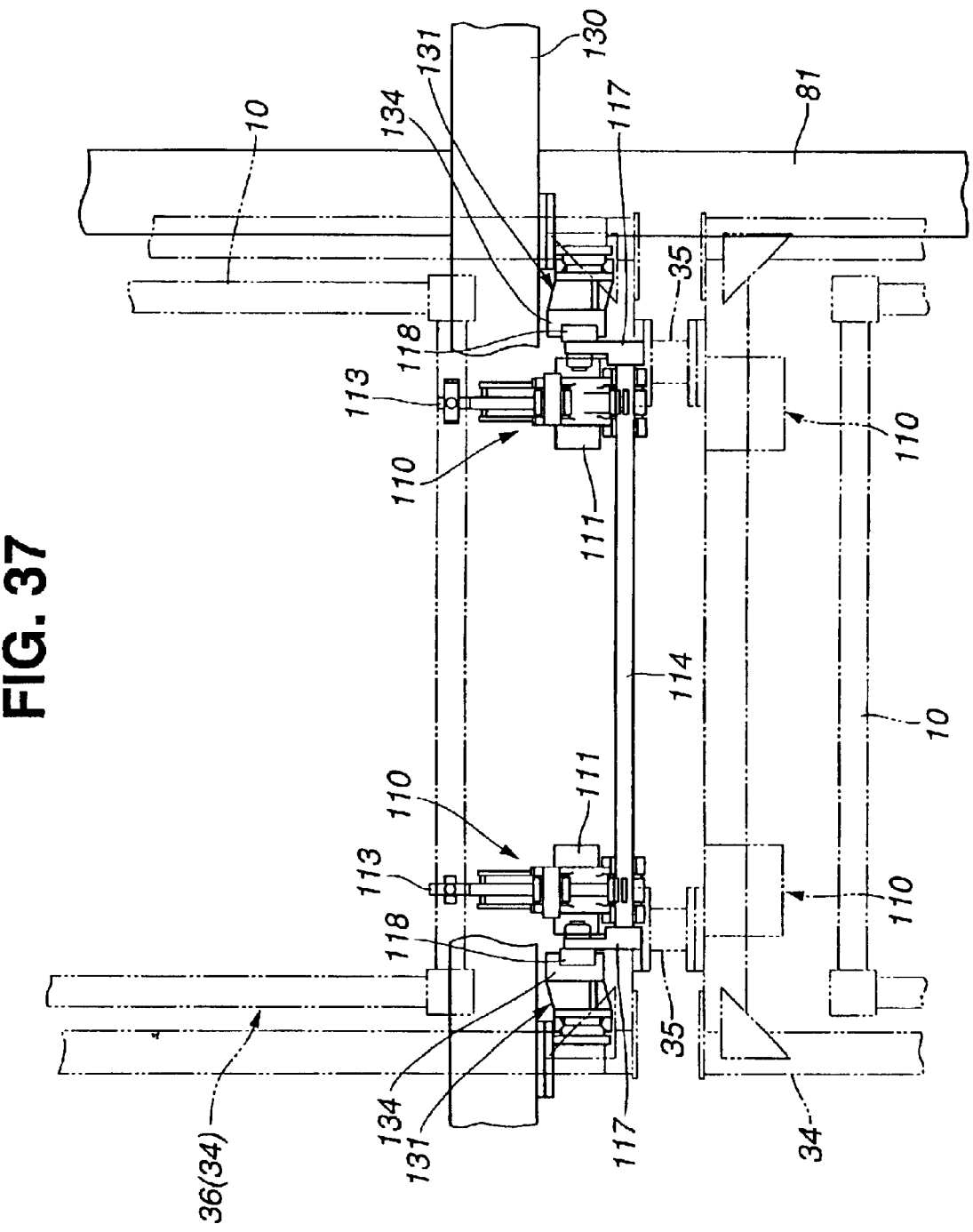
FIG. 37 is a plan view of FIG. 36.
Figure 38:
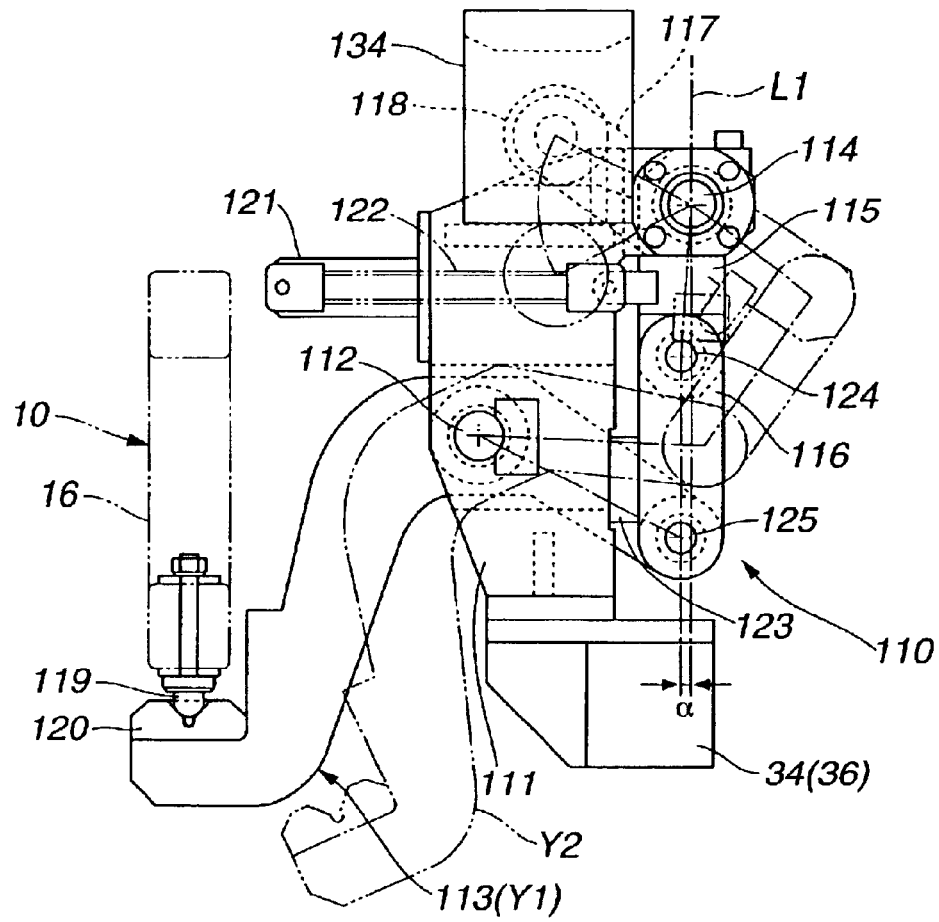
FIG. 38 is an enlarged side view of a jig catcher 110 shown in FIG. 36 and FIG. 37.

FIG. 36 to FIG. 38 show details of front conveyer 36. As is seen FIG. 31 and FIG. 33, and also FIG. 36 to FIG. 38, front conveyer 36 is so constituted that two carriage frames 34 for carrying front body side upper section locator jigs 10 are coupled with each other by way of spacers 35, as described above. A pair of jig catchers 110 are disposed on two opposing sides of each of carriage frames 34. Hereinabove, jig catcher 110 is of a toggle type, and directly positions and catches front body side upper section locator jig 10.

Figure 39:
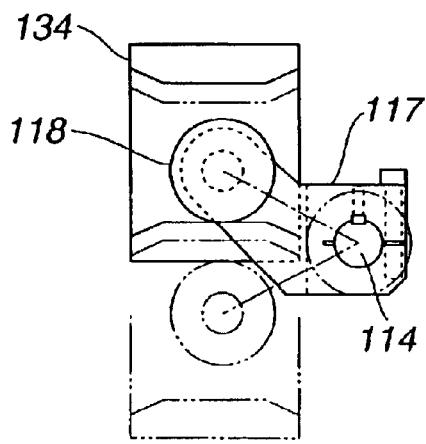
FIG. 39 shows essential parts in FIG. 38.

Jig catcher 110 is constituted of a jig support arm 113, a synchronous shaft 114, a link 115, an intermediary link 116, a cam follower lever 117 and a cam follower roller 118. Jig support arm 113 acts as a member for supporting front body side upper section locator jig 10 and rear body side upper section locator jig 11, and is shaped substantially into a bell crank. Moreover, jig support arm 113 is rotatably supported to a bracket 111 of carriage frame 34 by way of a hinge pin 112. Synchronous shaft 114 is long and rotatably supported to bracket 111. Link 115 coaxially and unitedly couples with synchronous shaft 114, in such a manner as to form a key. Intermediary link 116 links jig support arm 113 with link 115. As is seen in FIG. 37 and FIG. 39, cam follower lever 117 is coaxial and united with both two ends of synchronous shaft 114, in such a manner as to form a key. Cam follower roller 118 is rotatably fitted to cam follower lever 117.

At a peak end of jig support arm 113, there is provided a seat 120 for receiving a seat pad 119 which is disposed on carriage frame 34's side, as is seen in FIG. 38. Self-locating and/or centering, a function(s) brought about by abutment of seat pad 119 on seat 120, contribute(s) to positioning front jig body 16 of front body side upper section locator jig 10. Jig support arm 113 is pivotal between a jig positioning area Y1 (depicted by actual lines in FIG. 38 and an escape area Y2 (depicted by dotted lines in FIG. 38). As described above and seen in FIG. 37, adjacent jig catchers 110 share a single synchronous shaft 114, so that jig support arms 113 of adjacent jig catchers 110 can move synchronously with each other.

On bracket 111's side, there is provided a tensile coil spring 122 between a projection 121 and link 115 in such a manner as to tense projection 121 and link 115. Tensile coil spring 122 continuously biases jig support arm 113 toward jig positioning area Y1, as is seen in FIG. 38. In a state where no external force is applied to cam follower lever 117, as is seen in FIG. 38, biasing force by tensile coil spring 122 allows intermediary link 116 to abut on a stopper section 123 which is formed on an end face of bracket 111. Thereby, jig support arm 113 can stand by in jig positioning area Y1, with link 115 and intermediary link 116 arranged substantially linearly.

More specifically described as below: As is seen in FIG. 38, a shaft line L1 through an axial center (rotary center of link 115 and cam follower lever 117) of synchronous shaft 114 is herein defined as a reference. A pin 124 coupling link 115 and intermediary link 116 and a pin 125 coupling intermediary link 116 and jig support arm 113 are shifted from shaft line L1 toward a rotary center (hinge pin 112) of jig support arm 113 by a predetermined distance a, thereby causing a state of what is called being over dead point. With the thus caused "over dead point" state, at least jig support arm 113 can be prevented from pivoting toward escape area Y2, even if full weight of front body side upper section locator jig 10 is applied to jig support arm 113. With this, jig catcher 110 can secure the state shown in FIG. 38 (self locking).

Contrary to the above, FIG. 39 shows a state where an operator cam 134 of a lock mechanism 131 (to be described afterward) presses downward cam follower lever 117 fitted with cam follower roller 118. With this, jig support arm 113 can be pivoted to escape area Y2 and stay at escape area Y2, as is depicted by the imaginary lines in FIG. 38 (self locking).

On the other hand, there is provided an auxiliary frame 130 which is disposed in such a manner as to stride over beam 80, beam 81 and beam 82, as is seen in FIG. 14, FIG. 15 and FIG. 31. As is seen in FIG. 36 to FIG. 38, auxiliary frame 130 is fitted with lock mechanisms 131 each of which allows jig support arm 113 of jig catcher 110 to move from jig positioning area Y1 to escape area Y2 and stay in escape area Y2 (locking state). As is seen in FIG. 36, lock mechanism 131 is constituted of a bracket 132, a drive cylinder 133 and operator cam 134. Drive cylinder 133 is shaped substantially into a clevis, and fitted to bracket 132 in such a manner as to posture vertical. Operator cam 134 is shaped substantially into a Japanese katakana character "コ" and disposed below drive cylinder 133 in such a manner as to connect to a piston of drive cylinder 133. Moreover, operator cam 134 can move upward and downward together with the piston of drive cylinder 133. As is seen in FIG. 36, hook 65 disposed on front body side upper section locator jig 10 mates into hook rail 152 of front jig changer 44 disposed on front lifter 13. Simultaneously with this, cam follower roller 118 at the peak end of cam follower lever 117 of each of jig catchers 110 can mate into operator cam 134 (space defined by the "コ"). Then, pressing cam follower lever 117 downward by lowering operator cam 134 as is seen in FIG. 38 and FIG. 39, when front body side upper section locator jig 10 is supported by front lifter 13, will allow jig support arm 113 of each of jig catchers 110 to move from jig positioning area Y1 to escape area Y2. Thereby, front body side upper section locator jig 10 can be released from each of jig support arms 113—to be described afterward.

Herein, lock mechanism 131 and the like of front conveyer 36 are substantially the same in construction as their counterparts of rear conveyer 37. Moreover, front conveyer 36 itself is substantially the same in construction as rear conveyer 37.

FIG. 40 to FIG. 43 show details of front lifter 13 which acts as the final jig replacing means (one of the three jig replacing means) for replacing front body side upper section locator jig 10 between soon-to-be replaced position Qn and operating position Q1. In other words, FIG. 40 to FIG. 43 show details of front lifter 13 that is shown in FIG. 2, FIG. 12 and FIG. 16.

Figure 40:
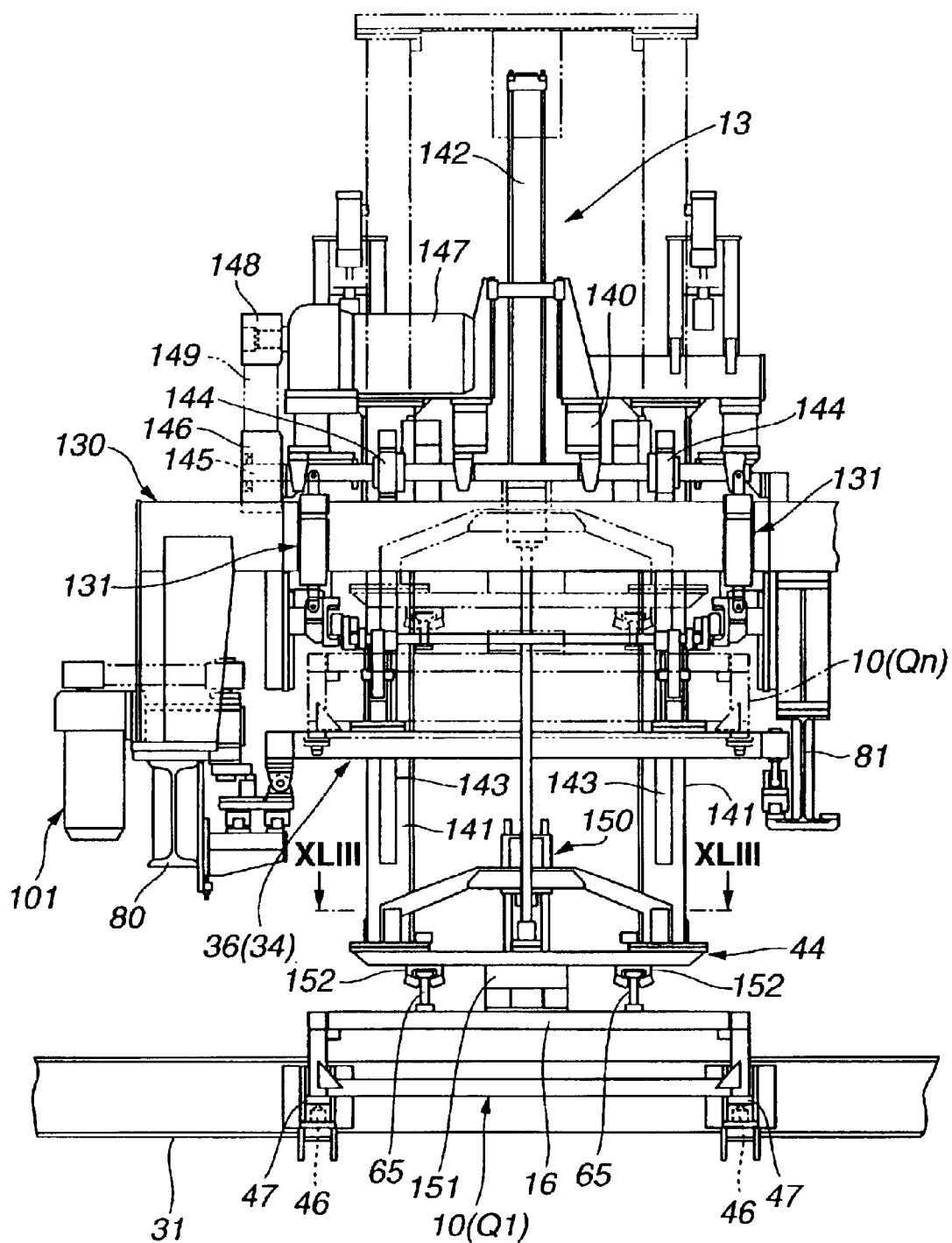
FIG. 40 is an enlarged view of a front lifter 13 shown in FIG. 12.
Figure 41:
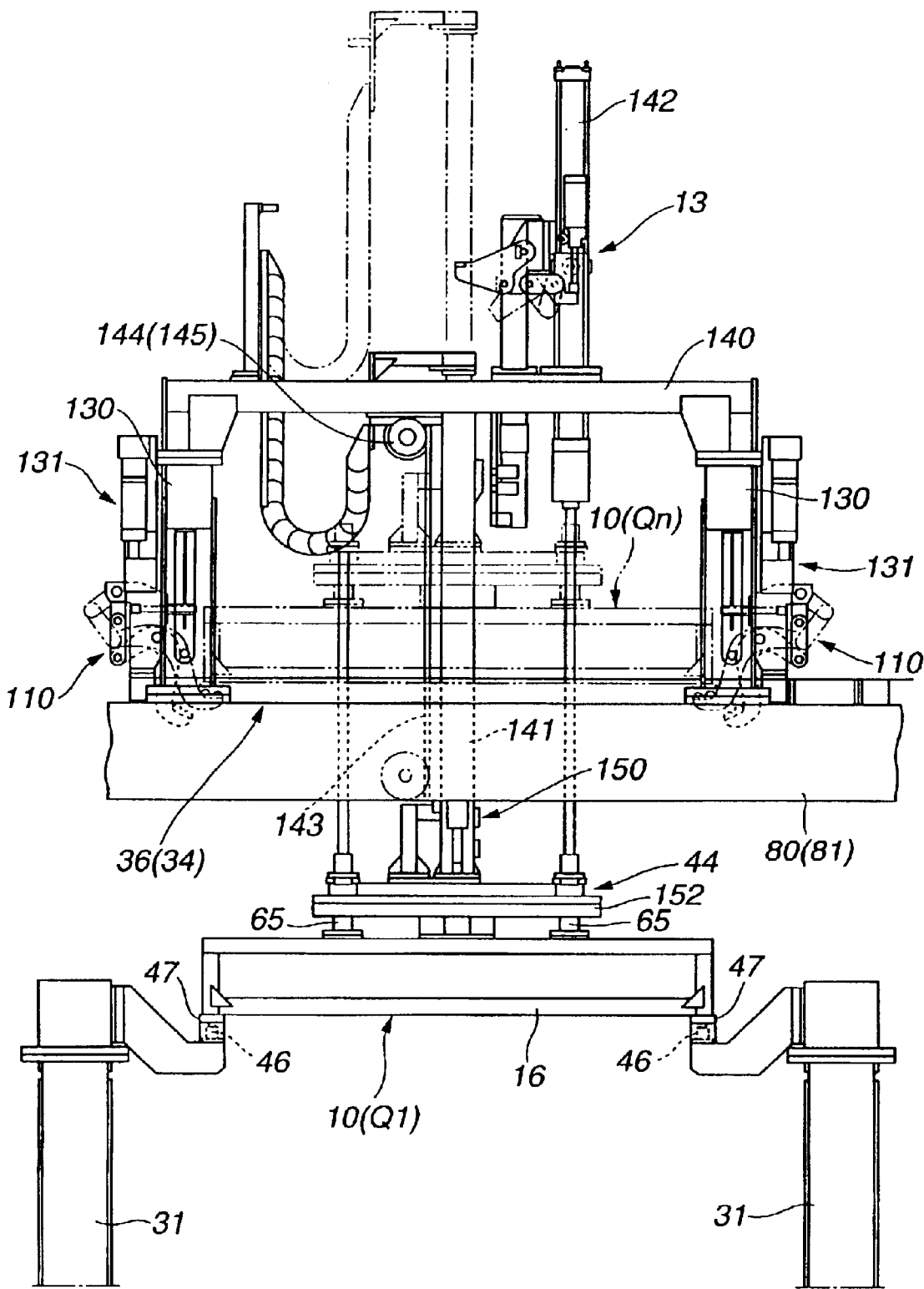
FIG. 41 is a side view of front lifter 13 shown in FIG. 40.
Figure 42:
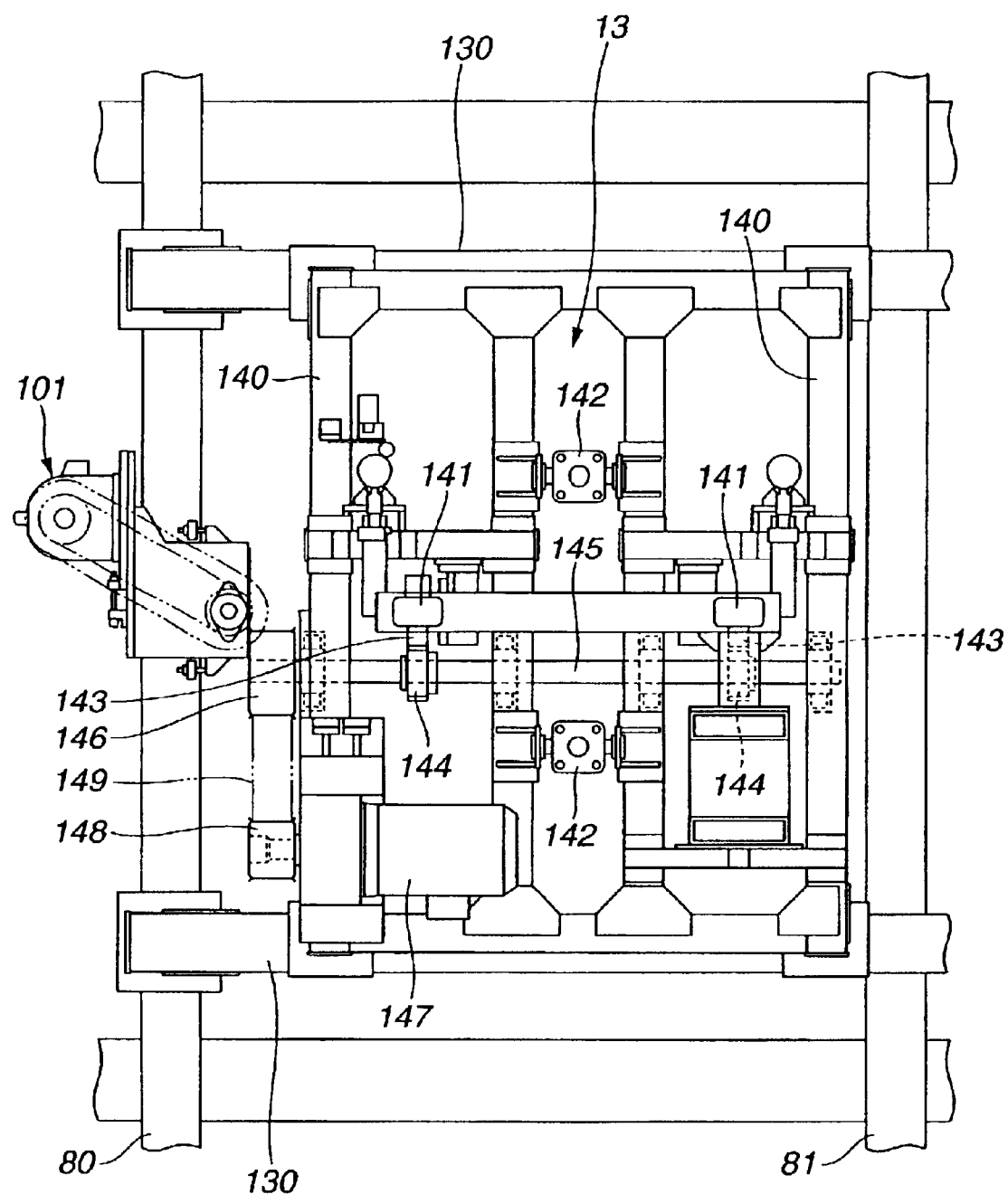
FIG. 42 is a plan view of front lifter 13 shown in FIG. 41.
Figure 43:
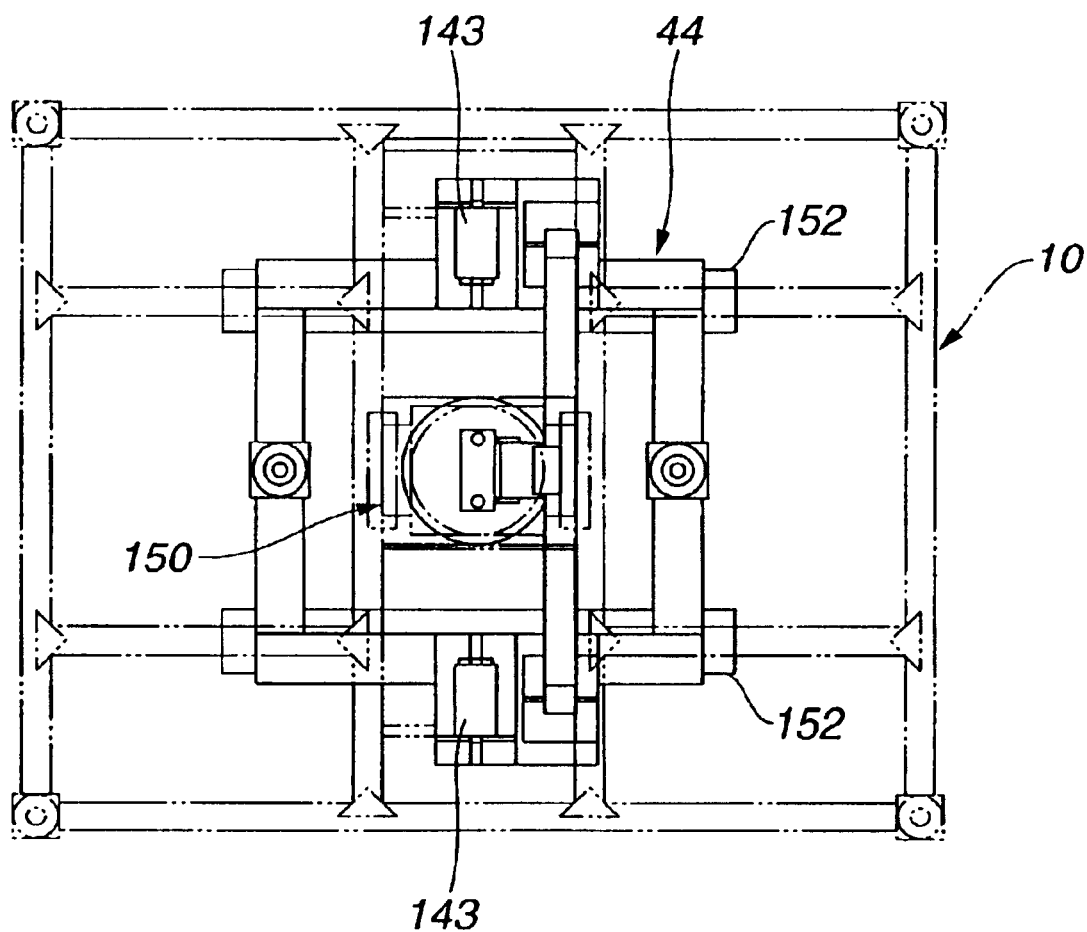
FIG. 43 is a cross section taken along lines XLIII—XLIII in FIG. 40.

As is seen in FIG. 40 to FIG. 43, front lifter 13 is mounted to auxiliary frame 130 by way of a cross beam 140. Front lifter 13 has the peak end (lower end) fitted with front jig changer 44 as the jig gripping means (or a jig gripper). Front jig changer 44 is shaped substantially into a rectangle. Moreover, front jig changer 44 is suspended to the peak end (lower end) of front lifter 13 by way of a pair of guide posts 141 and a pair of assistant cylinders 142 (such as air cylinder) in such a manner as to move upward and downward. Hereinabove, shown in FIG. 41 is only one of the pair of assistant cylinders 142. During jig replacement when front conveyer 36 travels between front standby position Q12 and soon-to-be replaced position Qn, front jig changer 44 may keep standing by in a position as high as soon-to-be replaced position Qn (uppermost).

A rack 143 is fixed to each of guide posts 141 in a lengthwise direction. Moreover, a pinion 144 meshing with rack 143 is coaxially united with a drive shaft 145. Drive shaft 145 is rotatably born with a plurality of bearings. A driven pulley 146 is fixed to a first end of drive shaft 145, while a drive pulley 148 is fixed to a revolution shaft of a drive motor 147. A timing belt 149 winds in an area between drive pulley 148 and driven pulley 146. With the construction described above, drive motor 147 allows pinion 144 to make forward and reverse rotations, to thereby extend and compress assistant cylinder 142. In accordance the extension and compression of assistant cylinder 142, front jig changer 44 can move upward and downward between soon-to-be replaced position Qn (uppermost) and operating position Q1 (lowermost).

Figure 45:
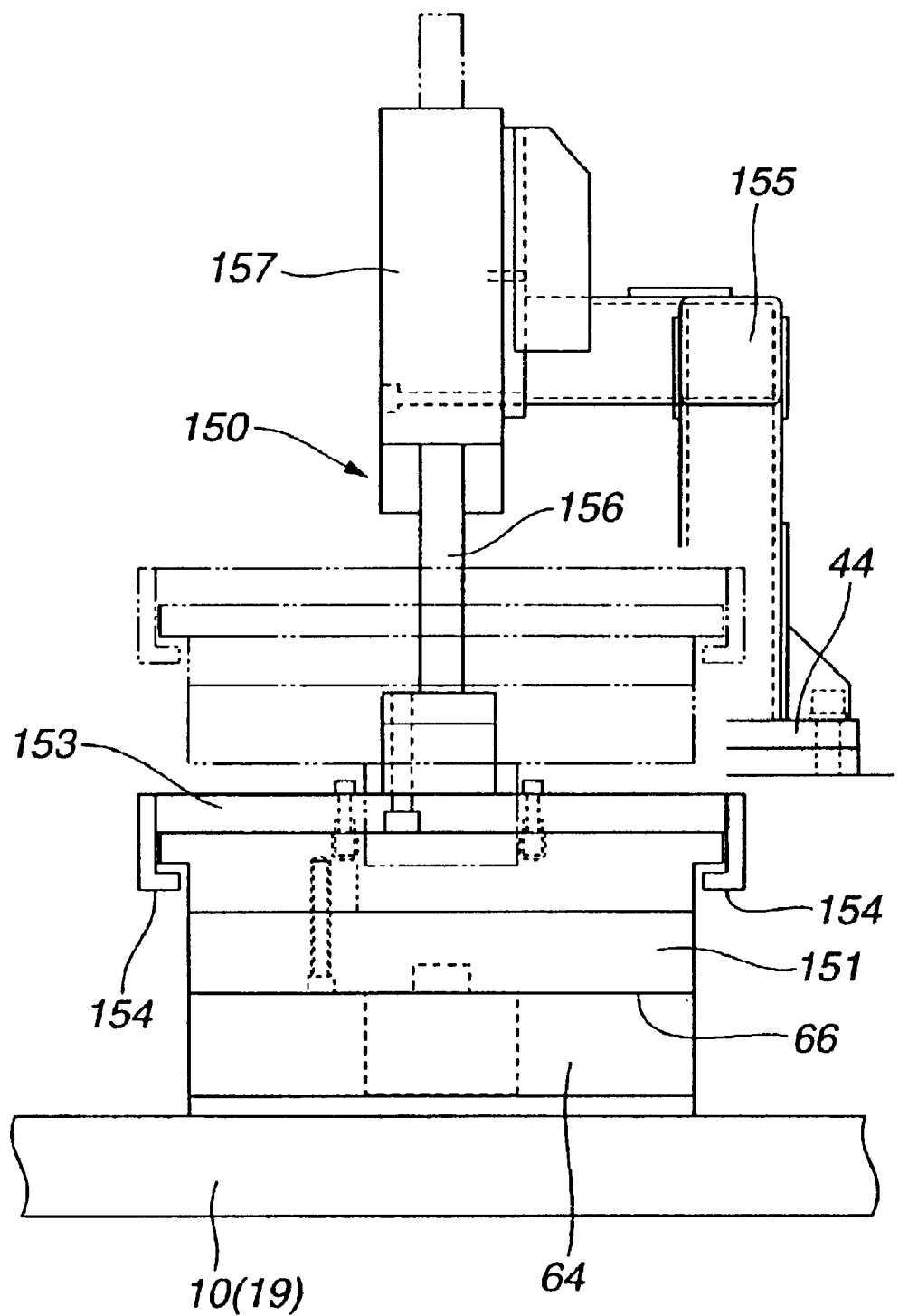
FIG. 45 is a side view of FIG. 44.

As is seen in FIG. 40, in the middle on a lower face of front jig changer 44, there is provided coupler 151 (circular) which is supported by a coupler attaching-removing mechanism 150. On a first side and a second side of coupler 151, there are provide hook rails 152 extending comparatively long in the direction along front conveyer 36's travel. As described above, coupler 151 is an aggregation of connectors supplying compressed air (hydraulic energy) to the actuators of locator pin unit 17, clamp device 18 and the like (see FIG. 16 and FIG. 17) of front body side upper section locator jig 10. Coupler 151 is also an aggregation of connectors which supply electric power to various pieces of electronic equipment attached to front jig body 16 and which receive signals from various sensors. As is seen in FIG. 44 to FIG. 46, coupler 151 is fitted to a nail section 154 of a circular chuck 153 of coupler attaching-removing mechanism 150 with predetermined radial clearance and upper-and-lower clearance, in such a manner as to float (featuring floatability).

Coupler attaching-removing mechanism 150 is provided with an attaching-removing cylinder 157 (having a guide rod 156) which is fitted to a frame 155 (in a form of an arch [see FIG. 44]) disposed on front jig changer 44. As is seen in FIG. 44, chuck 153 is coupled with peak ends (lower) of piston rod 158 and guide rod 156 of coupler attaching-removing mechanism 150.

As is seen in FIG. 40 and FIG. 41, front body side upper section locator jig 10 (to be conveyed to operating position Q1) on front conveyer 36 is properly positioned in soon-to-be replaced position Qn. In other words, hook 65 of front body side upper section locator jig 10 is guided and carried by hook rail 152. Lowering chuck 153 (see FIG. 44 to FIG. 46) in the above state allows coupler 64 of front body side upper section locator jig 10 to couple with coupler 151 of front jig changer 44 by way of coupler mating face 66. With this, the above connectors (supplying compressed air [hydraulic energy]) and connectors (supplying electric power) can be coupled with each other, thereby supplying compressed air and electric power to front body side upper section locator jig 10.

Even when hook 65 of front body side upper section locator jig 10 is guided and carried by hook rail 152 of front jig changer 44, as is seen in FIG. 44, a predetermined play (upward-downward clearance and rightward-leftward clearance) can be secured between hook 65 and hook rail 152, unless jig catcher 110 of front conveyer 36 releases front body side upper section locator jig 10, as described above.

Thereafter, lock mechanism 136 shown in FIG. 36 and FIG. 40 may operate, to thereby pivot jig support arm 113 (see FIG. 38) of each of jig catchers 110 to escape area Y2 for locking at escape area Y2. At this point in time (and for the first time), front body side upper section locator jig 10 can be released from jig catcher 110. With this, front body side upper section locator jig 10 is supported only by engagement between hook 65 and hook rail 152 of front jig changer 44. Then, lowering front jig changer 44 of front lifter 13 in a predetermined stroke may allow locator sleeves 47 disposed in four corners of front jig body 16 to fit over locator pins 46 disposed in operating position Q1 on frame 31, as is seen in FIG. 40 and FIG. 41. Hereinabove, locator pin 46 is the reference member for locating front body side upper section locator jig 10 in operating position Q1.

Herein, the following floatability is set in advance:

With front body side upper section locator jig 10 located in operating position Q1 with reference to locator pins 46 as is seen in FIG. 44, hook rail 152 still stays engaged with hook 65. In spite of the engagement, the predetermined clearance can be secured between hook rail 152 and hook 65, causing the floatability.

With the above floatability set in advance, front body side upper section locator jig 10 can be insensitive to any influence which may be caused by front lifter 13, thereby achieving accurate positioning (mechanical positioning) of front body side upper section locator jig 10 in operating position Q1 referring to locator pins 46.

The above construction of front lifter 13 is substantially the same as that of rear lifter 14.

With the above described construction of the apparatus of assembling the vehicular body, the following operations can be taken:

Temporarily assembled body main Bm which is positioned and carried on pallet P as is seen in FIG. 7 and FIG. 8 is conveyed to the site for body main pre-tack welding operation S from the previous operation. Then, pallet positioning apparatus 1 may operate, thus positioning pallet P. With pallet P thus positioned, clamp device 4 and the like attached to pallet P can unclamp body main Bm.

Thereafter, the plurality of three-dimension general locator jigs 5 (see FIG. 9) standing on the right side and the left side of the pallet positioning apparatus 1 may lift the entire part of body main Bm, with floor main Fm as supporting section. With this, the entire part of body main Bm can be positioned and supported at a predetermined height. As a result, body main Bm can be temporarily separated from pallet P. Then, three-dimension general locator jigs 5 may clamp body main Bm by clamping function incorporated in locator pin unit 7.

Moreover, right and left three-dimension general locator jigs 8 for body side Bs may operate to position lower section of body side Bs itself by means of the plurality of gauges and clamp devices, and also make relative positioning between lower section of body side Bs and floor main Fm.

Simultaneously with the above, the plurality of locator pin units 17, locator pin units 49, clamp devices 18 and clamp devices 50 (see FIG. 16 and FIG. 17) which are attached to front body side upper section locator jig 10 positioned in operating position Q1 may operate to position the upper section of body side Bs itself, and make relative positioning between the upper section of body side Bs, the plurality of roof rails R and the like, while the plurality of clamp devices 20 (see FIG. 26 and FIG. 27) which are attached to rear body side upper section locator jig 11 positioned in operating position Q1 may also operate to position the upper section of body side Bs itself, and make relative positioning between the upper section of body side Bs, the plurality of roof rails R and the like.

Herein, in the process of positioning body side Bs by means of front body side upper section locator jig 10 and rear body side upper section locator jig 11, the following operations can be observed:

Replacement of front body side upper section locator jig 10 (used) with front body side upper section locator jig 10 (to be used) is carried out between front jig receiver 23 (front storage area W) and front standby position Q12, while replacement of rear body side upper section locator jig 11 (used) with rear body side upper section locator jig 11 (to be used) is carried out between rear jig receiver 24 (rear storage area W) and rear standby position Q22.

With this, relative positioning between body main components (including floor main Fm, right body side Bs and left body side Bs) can be thus completed. Then, the plurality of welding robots 9 standing by outside three-dimension general locator jigs 8 may operate. More specifically, a spot welding gun at a peak end of a robot arm comes from between three-dimension general locator jigs 8 and approaches body side Bs, so as to implement spot welding (for the number of spots as required) as pre-tack welding operation S to the junction between body main components. After completing the spot welding with the required number of spots, body main Bm can be secured in accuracy.

Thereafter, each of front body side upper section locator jig 10, rear body side upper section locator jig 11 and three-dimension general locator jigs 8 may release body main Bm, and escape from body main Bm.

Thereafter, three-dimension general locator jig 5 for floor main Fm is unclamped. Lowering body main Bm at reduced speed can allow body main Bm to be positioned again on pallet P which is standing by below body main Bm. With the body main Bm after pre-tack welding operation S thus positioned on pallet P, clamp devices and the like of pallet P may operate to position and clamp body main Bm again.

With the body main Bm thus positioned and clamped on pallet P, the pallet P is conveyed to the next operation (additional welding operation). In the additional welding operation, pallet P carrying body main Bm is positioned by means of a pallet positioning apparatus substantially the same as pallet positioning apparatus 1 described above. Then, body main Bm can be subjected to the additional welding operation without being separated from pallet P for the number of spots required. The additional welding operation having a large number of spots (known) is usually divided into several sub-operations.

As described in the former paragraph, the additional welding operation is carried out without separating body main Bm from pallet P, thus eliminating needs for attaching high-performance three-dimension general locator jigs as those (three-dimension general locator jig 5 and three-dimension general locator jig 8) used for body main pre-tack welding operation S.

Although the present invention has been described above by reference to a certain embodiment, the present invention is not limited to the embodiment described above. Modifications and variations of the embodiments described above will occur to those skilled in the art, in light of the above teachings.

The entire contents of basic Japanese Patent Application No. P2001-292800 (filed on Sep. 26, 2001 in Japan) and basic Japanese Patent Application No. P2002-134937 (filed on May 10, 2002 in Japan) are incorporated herein by reference.

The scope of the present invention is defined with reference to the following claims.

What is claimed is:

1. A method of assembling a vehicular body wherein a pre-tack welding operation is carried out by positioning each of a floor main, a right body side, a left body side and a roof rail which constitute a body main component of a vehicle while by making a relative positioning between the floor main, the right body side, the left body side and the roof rail, the method comprising the following operations:

positioning the floor main and making the relative positioning between the floor main and the body side's lower section, by using a three-dimension general locator device standing on a floor, and positioning each of the right body side, the left body side and the roof rail and making the relative positioning between the body side's upper section and the roof rail, by using a front body side upper section locator jig and a rear body side upper section locator jig which are disposed on a ceiling and independent of each other in a forward-and-rearward direction of the vehicular body, and each of which is replaceable in accordance with a type of the vehicle.

2. The method of assembling the vehicular body as claimed in claim 1, wherein the front body side upper section locator jig and the rear body side upper section locator jig are for a single type vehicle or a plural types of vehicles, each of the front body side upper section locator jig and the rear body side upper section locator jig for the type of the vehicle is stored in a storage area in a vicinity of an actual operating position, and each of the front body side upper section locator jig and the rear body side upper section locator jig is replaceable between the operating position and the storage area, in accordance with the type of the vehicle to be assembled.

3. The method of assembling the vehicular body as claimed in claim 2, wherein the front body side upper section locator jig locates a front section of the vehicular body, the rear body side upper section locator jig locates a rear section of the vehicular body, the rear section being more likely to vary in molding shape than the front section with a difference in the type of the vehicle, and the front body side upper section locator jig is smaller in total number than the rear body side upper section locator jig.

4. A method of assembling a vehicular body, comprising the following operations:

a temporary assembling operation of temporarily making a relative positioning between a floor main, a right body side, a left body side and a roof rail which constitute a body main component of a vehicle, a pre-tack welding operation by positioning each of the floor main, the right body side, the left body side and the roof rail while by making the relative positioning between the floor main, the right body side, the left body side and the roof rail, and an additional welding operation of the body main after the pre-tack welding operation, wherein the body main component is conveyed between the operations in such a manner that the body main component is carried on a pallet having such a function as to position and clamp the floor main, in the pre-tack welding operation, a three-dimension general locator device standing on a floor lifts up the body main component including the floor main and makes the positioning, thereby implementing the pre-tack welding operation with the body main component separated from the pallet, and in the additional welding operation, the pallet is positioned in a pallet positioning apparatus, and the body main which is positioned and clamped by the pallet is subjected to the additional welding operation.

5. The method of assembling the vehicular body as claimed in claim 4, wherein the pre-tack welding operation is carried out on a rear parcel shelf and the like.

* * * * *